(12) United States Patent
Hirano

(10) Patent No.: US 11,994,747 B2
(45) Date of Patent: *May 28, 2024

(54) IMAGING LENS WITH POSITIVE-NEGATIVE-NEGATIVE-POSITIVE REFRACTIVE POWER LENSES ON OBJECT SIDE

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,890

(22) Filed: Aug. 2, 2021

(65) Prior Publication Data

US 2021/0356701 A1    Nov. 18, 2021

Related U.S. Application Data

(63) Continuation of application No. 16/729,619, filed on Dec. 30, 2019, now Pat. No. 11,619,803.

(30) Foreign Application Priority Data

Jan. 28, 2019  (JP) .................................. 2019-12070

(51) Int. Cl.
*G02B 9/64* (2006.01)
*G02B 13/00* (2006.01)
*G02B 15/14* (2006.01)

(52) U.S. Cl.
CPC ............. *G02B 9/64* (2013.01); *G02B 13/002* (2013.01); *G02B 13/005* (2013.01); *G02B 15/14* (2013.01)

(58) Field of Classification Search
CPC .... G02B 9/64; G02B 13/002; G02B 13/0045; G02B 13/06; G02B 13/18; G03B 30/00
See application file for complete search history.

(56) References Cited

U.S. PATENT DOCUMENTS

| 3,972,594 A | * | 8/1976 | Yamashita | G02B 13/06 |
| | | | | 359/749 |
| 2014/0063624 A1 | * | 3/2014 | Morooka | G02B 13/02 |
| | | | | 359/740 |
| 2014/0254029 A1 | * | 9/2014 | Hsu | G02B 13/18 |
| | | | | 359/713 |
| 2017/0010441 A1 | | 1/2017 | Kondo et al. | |

(Continued)

FOREIGN PATENT DOCUMENTS

| JP | H11-149041 A | 6/1999 |
| JP | 2000-162500 A | 6/2000 |
| JP | 2012-242688 A | 12/2012 |

(Continued)

*Primary Examiner* — Alicia M Harrington
(74) *Attorney, Agent, or Firm* — Maine Cernota & Curran

(57) ABSTRACT

An imaging lens includes a first lens having positive refractive power; a second lens having negative refractive power; a third lens having negative refractive power; a fourth lens having positive refractive power; a fifth lens; a sixth lens; a seventh lens; an eighth lens; and a ninth lens having negative refractive power, arranged in this order from an object side to an image plane side. The ninth lens is formed in a shape so that a surface thereof on the image plane side has an aspherical shape having an inflection point.

5 Claims, 39 Drawing Sheets

(56) References Cited

U.S. PATENT DOCUMENTS

2018/0275380 A1    9/2018  Sudoh
2020/0393652 A1   12/2020  Kuo

FOREIGN PATENT DOCUMENTS

| JP | 2015-225246 A | 12/2015 |
| JP | 2017-15909 A  | 1/2017  |
| JP | 2017-21185 A  | 1/2017  |
| JP | 2018-97289 A  | 6/2018  |
| JP | 2018-156011   | 10/2018 |

* cited by examiner

IMAGING LENS WITH POSITIVE-NEGATIVE-NEGATIVE-POSITIVE REFRACTIVE POWER LENSES ON OBJECT SIDE

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device, e.g., a cellular phone and a portable information terminal, a digital still camera, a security camera, an onboard camera, and a network camera.

In case of a lens configuration comprised of nine lenses, since the number of lenses that compose the imaging lens is large, it has higher flexibility in designing and can satisfactorily correct aberrations required for an imaging lens with high resolution. For example, as the conventional imaging lens having such nine-lens configuration, an imaging lens described in Patent Reference has been known.

PATENT REFERENCE

Patent Reference: Japanese Patent Application Publication No. 2018-156011

According to the conventional imaging lens of Patent Reference, it is achievable to relatively satisfactorily correct aberrations. In case of the conventional imaging lens, however, a total track length is long relative to a focal length of the whole lens system, so that it is not suitable to mount in a small-sized camera, such as the one to be built in a smartphone. According to the conventional imaging lens of Patent Reference, it is difficult to satisfactorily correct aberrations further, while downsizing the imaging lens.

In view of the above-described problems in the conventional techniques, an object of the present invention is to provide an imaging lens that can attain both a small size and satisfactorily corrected aberrations in a balanced manner.

Further objects and advantages of the present invention will be apparent from the following description of the invention.

SUMMARY OF THE INVENTION

The imaging lens of the invention forms an image of an object on an imaging element. More specifically, in order to attain the objects described above, according to a first aspect of the present invention, an imaging lens includes a first lens having positive refractive power, a second lens having negative refractive power, a third lens having negative refractive power, a fourth lens having positive refractive power, a fifth lens, a sixth lens, a seventh lens, an eighth lens and a ninth lens having negative refractive power, arranged in the order from an object side to an image plane side. A surface of the ninth lens on the image plane side is formed in an aspheric shape having an inflection point.

According to the imaging lens of the invention, among the nine lenses, the arrangement of refractive power of the four lenses disposed on the object side is in the order of "positive-negative-negative-positive", so that it is suitably achievable to downsize the imaging lens, while satisfactorily correcting the aberrations including a chromatic aberration and a spherical aberration. According to the imaging lens of the invention, among the lenses, the first lens having positive refractive power is disposed to be the closest to the object side, so that it is achievable to downsize the imaging lens. Since the first lens has positive refractive power, by disposing the second lens having negative refractive power on an image plane side of the first lens, it is achievable to satisfactorily correct the chromatic aberration. However, with downsizing of the imaging lens, the negative refractive power of the second lens has been increasing. According to the invention, the third lens disposed on an image plane side of the second lens also has negative refractive power. Therefore, it is achievable to attain a smaller size of the imaging lens as well as wider angle of view of the imaging lens, while restraining the increase of the negative refractive power of the second lens. In addition, on image plane sides of the second lens and the third lens, a fourth lens having positive refractive power is disposed. Therefore, it is achievable to satisfactorily correct the chromatic aberration and the spherical aberration.

According to the imaging lens of the invention, the ninth lens disposed being the closest to the image plane side has negative refractive power. Therefore, it is achievable to secure a back focal length, while satisfactorily correcting the field curvature and the distortion near periphery of an image. In addition, according to the invention, an image plane-side surface of the ninth lens is formed in an aspheric shape having an inflexion point. Therefore, it is achievable to satisfactorily correct paraxial aberrations and aberrations at the periphery thereof, while restraining an incident angle of a light beam emitted from the imaging lens to the image plane of an imaging element within the range of chief ray angle (CRA).

Here, in the invention, "lens" refers to an optical element having refractive power. Accordingly, the "lens" of the invention does not include an optical element such as a prism and a flat plate filter. Those optical elements may be disposed before or after the imaging lens or between lenses as necessary.

When a composite focal length of the first lens, the second lens and the third lens is f123, the imaging lens having the above-described configuration preferably satisfies the following conditional expression (1):

$$0 < f123 \qquad (1)$$

When the imaging lens satisfies this conditional expression (1), it is achievable to reduce a ratio of the total track length to the maximum image height of an image plane, and thereby to suitably attain downsizing of the imaging lens.

When a composite focal length of the fourth lens, the fifth lens and the sixth lens is f456, the imaging lens having the above-described configuration preferably satisfies the following conditional expression (2):

$$0 < f456 \qquad (2)$$

For downsizing of the imaging lens, it is preferred to dispose a lens(es) having a positive refractive power on the object side. However, when the positive refractive powers of those lenses are too strong, it is difficult to correct the aberrations. When the imaging lens satisfies the conditional expression (2), the positive refractive powers of those lenses disposed on the object side are also shared with the fourth lens, the fifth lens and the sixth lens. Therefore, it is achievable to suitably restrain generation of the aberrations.

When a composite focal length of the seventh lens, the eighth lens and the ninth lens is f789, the imaging lens having the above-described configuration preferably satisfies the following conditional expression (3):

$$f789 < 0 \qquad (3)$$

When the imaging lens satisfies the conditional expression (3), the composite refractive power of the three lenses disposed close to the image plane side is negative and thereby the imaging lens can securely have a telephoto function. Therefore, it is achievable to suitably downsize the imaging lens.

When the whole lens system has the focal length f and the first lens has a focal length f1, the imaging lens having the above-described configuration preferably satisfies the following conditional expression (4):

$$0.4 < f1/f < 2.0 \quad (4)$$

When the imaging lens satisfies the conditional expression (4), it is achievable to satisfactorily correct the spherical aberration, while downsizing the imaging lens.

When the first lens has the focal length f1 and the second lens has a focal length f2, the imaging lens having the above-described configuration preferably satisfies the following conditional expression (5):

$$-6 < f2/f1 < -1 \quad (5)$$

When the imaging lens satisfies the conditional expression (5), it is achievable to satisfactorily correct the chromatic aberration and the spherical aberration, while downsizing the imaging lens.

When the whole lens system has the focal length f and the second lens has the focal length f2, the imaging lens having the above-described configuration preferably satisfies the following conditional expression (6):

$$-5 < f2/f < -0.5 \quad (6)$$

When the imaging lens satisfies the conditional expression (6), it is achievable to satisfactorily correct the chromatic aberration, while downsizing the imaging lens.

When the whole lens system has the focal length f and a composite focal length of the second lens and the third lens is f23, the imaging lens having the above-described configuration preferably satisfies the following conditional expression (7):

$$-5 < f23/f < -0.5 \quad (7)$$

When the imaging lens satisfies the conditional expression (7), it is achievable to satisfactorily correct the chromatic aberration, while downsizing the imaging lens.

According to a second aspect of the invention, when the second lens has the focal length f2 and the third lens has a focal length f3, the imaging lens having the above-described configuration preferably satisfies the following conditional expression (8):

$$0.1 < f2/f3 < 1.2 \quad (8)$$

When the imaging lens satisfies the conditional expression (8), it is achievable to satisfactorily correct the chromatic aberration, while downsizing the imaging lens. In addition, when the imaging lens satisfies the conditional expression (8), it is achievable to suitably restrain within a satisfactory range so-called "manufacturing error sensitivity", i.e., sensitivity to deterioration of image-forming performance in decentering, tilting, etc., which occurs in manufacturing of the imaging lens.

When the whole lens system has the focal length f and the third lens has the focal length f3, the imaging lens having the above-described configuration preferably satisfies the following conditional expression (9):

$$-20 < f3/f < -5 \quad (9)$$

According to the imaging lens of the invention, the two lenses, the second lens and the third lens, have negative refractive powers. The third lens functions as an auxiliary lens of the second lens and mainly corrects aberrations. When the imaging lens satisfies the conditional expression (9), it is achievable to restrain the spherical aberration and the chromatic aberration in a balanced manner, within satisfactory ranges.

According to the imaging lens having the above-described configuration, the seventh lens is preferably formed in a shape such that a curvature radius of a surface thereof on the object-side and a curvature radius of a surface thereof on the image plane side are both positive, or such that those curvature radii are both negative, i.e., so as to have a shape of a meniscus lens near the optical axis.

When the seventh lens has strong refractive power, it is often difficult to correct the spherical aberration, field curvature and distortion. When the seventh lens is formed to have a shape of a meniscus lens near the optical axis, it is achievable to satisfactorily correct the spherical aberration, the field curvature and the distortion.

To form the seventh lens to have a shape of a meniscus lens near the optical axis, when a curvature radius of an object-side surface of the seventh lens is R7f and a curvature radius of an image plane-side surface of the seventh lens is R7r, the imaging lens having the above-described configuration preferably satisfies the following conditional expression (10):

$$0.5 < R7f/R7r < 2 \quad (10)$$

When the imaging lens satisfies the conditional expression (10), the seventh lens can have a generally flat shape, i.e., a shape close to the one having less sag amount. Therefore, it is achievable to restrain the manufacturing cost of the imaging lens through improving the workability in the production. In addition, when the imaging lens satisfies the conditional expression (10), it is achievable to satisfactorily correct the field curvature and the distortion.

According to the imaging lens having the above-described configuration, the seventh lens is preferably formed to have a shape of a meniscus lens directing a concave surface thereof to the object side.

When the object-side surface of the seventh lens has a concave shape, it is achievable to keep the incident angle of a light beam to the seventh lens low and to restrain generation of a coma aberration.

When a curvature radius of the object-side surface of the eighth lens is R8f and a curvature radius of the image plane-side surface of the eighth lens is R8r, the imaging lens having the above-described configuration preferably satisfies the following conditional expression (11):

$$0.1 < R8f/R8r < 1.5 \quad (11)$$

When the imaging lens satisfies the conditional expression (11), the eighth lens can have a generally flat shape, so that it is achievable to restrain the manufacturing cost of the imaging lens. In addition, when the imaging lens satisfies the conditional expression (11), it is achievable to satisfactorily correct the field curvature and the distortion.

According to the imaging lens having the above-described configuration, the eighth lens is preferably formed in a shape such that a curvature radius of a surface thereof on the object-side and a curvature radius of a surface thereof on the image plane side are both positive, i.e., so as to have a shape of a meniscus lens directing a convex surface thereof to the object side near the optical axis. In addition, two surfaces of the eighth lens are preferably formed in an aspheric shape having an inflection point. When the eighth lens is formed to have a shape of a meniscus lens near the optical axis, it is achievable to satisfactorily correct the spherical aberration, the field curvature and the distortion. Forming the both surfaces of the eighth lens in aspheric shapes having an inflexion point, it is achievable to suitably restrain an incident angle of a light beam emitted from the imaging lens to the image plane of an imaging element within the range of CRA.

When a thickness of the seventh lens on the optical axis is T7 and the thickness of the eighth lens on the optical axis is T8, the imaging lens having the above-described configuration preferably satisfies the following conditional expression (12):

$$0.5<T8/T7<4 \qquad (12)$$

When the imaging lens satisfies the conditional expression (12), it is achievable to secure the back focal length, while downsizing the imaging lens.

When the distance on the optical axis between the sixth lens and the seventh lens is D67 and the distance on the optical axis between the eighth lens and the ninth lens is D89, the imaging lens having the above-described configuration preferably satisfies the following conditional expression (13):

$$0.1<D67/D89<0.7 \qquad (13)$$

To attain lower profile of the imaging lens, a lens disposed closer to the image plane side tends to have a larger effective diameter. When a plurality of lenses having a large effective diameter is disposed, typically, interference between lenses occur at periphery of the lenses and it is difficult to produce and/or assemble the imaging lens because of the too narrow intervals between the lenses. When the imaging lens satisfies the conditional expression (13), it is achievable to downsize the imaging lens, while securing appropriate intervals on the optical axis among the sixth lens, the seventh lens, the eighth lens and the ninth lens. Moreover, when the imaging lens satisfies the conditional expression (13), it is achievable to satisfactorily correct the chromatic aberration of magnification and the field curvature.

According to a third aspect of the invention, when the whole lens system has the focal length f and a distance on the optical axis between the eighth lens and the ninth lens is D89, the imaging lens having the above-described configuration preferably satisfies the following conditional expression (14):

$$0.05<D89/f<0.15 \qquad (14)$$

When the imaging lens satisfies the conditional expression (14), it is achievable to satisfactorily correct the field curvature, the astigmatism and the distortion in a well-balanced manner, while securing the back focal length.

When the composite focal length of the eighth lens and the ninth lens is f89, the imaging lens having the above-described configuration preferably satisfies the following conditional expression (15):

$$-5<f89/f<-0.3 \qquad (15)$$

When the imaging lens satisfies the conditional expression (15), it is achievable to satisfactorily correct the field curvature and the distortion, while securing the back focal length. In addition, it is also achievable to suitably restrain an incident angle of a light beam emitted from the imaging lens to an image plane of an imaging element within the range of CRA.

According to a fourth aspect of the invention, when the whole lens system has the focal length f and a paraxial curvature radius of an image plane-side surface of the ninth lens is R9r, the imaging lens having the above-described configuration preferably satisfies the following conditional expression (16):

$$0.2<R9r/f<0.6 \qquad (16)$$

The image plane-side surface of the ninth lens is a surface positioned closest to the image plane side in the imaging lens. Difficulty of correcting the astigmatism, the coma aberration and the distortion varies depending on the magnitude of the refractive power of the image plane-side surface of the ninth lens. When the imaging lens satisfies the conditional expression (16), it is achievable to secure the back focal length, while downsizing the imaging lens. When the imaging lens satisfies the conditional expression (16), it is achievable to restrain the astigmatism, the coma aberration and the distortion in a well-balanced manner within satisfactory ranges.

According to a fifth aspect of the invention, when the whole lens system has the focal length f and the ninth lens has a focal length f9, the imaging lens having the above-described configuration preferably satisfies the following conditional expression (17):

$$-2<f9/f<-0.2 \qquad (17)$$

When the imaging lens satisfies the conditional expression (17), it is achievable to satisfactorily correct the field curvature and the distortion, while securing the back focal length. In addition, it is also achievable to suitably restrain the incident angle of a light beam emitted from the imaging lens to an image plane of an imaging element within the range of CRA.

To satisfactorily correct the axial chromatic aberration and the chromatic aberration of magnification, when the first lens has Abbe's number vd1 and the second lens has Abbe's number vd2, the imaging lens having the above-described configuration preferably satisfies the following conditional expressions (18) and (19):

$$35<vd1<75 \qquad (18)$$

$$15<vd2<35 \qquad (19)$$

To satisfactorily correct the chromatic aberration of magnification, when the ninth lens has Abbe's number vd9, the imaging lens having the above-described configuration preferably satisfies the following conditional expression (20):

$$35<vd9<75 \qquad (20)$$

When the whole lens system has the focal length f and a distance on the optical axis from an object-side surface of the first lens to the image plane is TL, the imaging lens having the above-described configuration preferably satisfies the following conditional expression (21). When the imaging lens satisfies the conditional expression (21), it is achievable to suitably downsize the imaging lens.

$$1.0<TL/f<1.4 \qquad (21)$$

Here, between the imaging lens and the image plane, typically, there is disposed an insert such as an infrared cut-off filter and cover glass. In this specification, for the distance on the optical axis of those inserts, a distance in the air is employed.

In these years, as smartphones, etc. to mount an imaging lens are smaller, the imaging lens has been increasingly required to attain both a smaller size and wider angle of view in a balanced manner than before. Especially, in case of an imaging lens to be mounted in a thin portable device, such as smartphones, it is necessary to hold the imaging lens within a limited space. Therefore, there is a strict limitation in the total length of the imaging lens in the optical axis relative to a size of the imaging element. When the distance on the optical axis from the object-side surface of the first lens to the image plane is TL and the maximum image height is Hmax, the imaging lens of the present invention preferably satisfies the following conditional expression (22):

$$1.0 < TL/Hmax < 1.8 \quad (22)$$

In case that the sixth lens has positive refractive power, when the whole lens system has the focal length f and the sixth lens has a focal length f6, the imaging lens having the above-described configuration preferably satisfies the following conditional expression (23):

$$1 < f6/f < 3 \quad (23)$$

When the imaging lens satisfies the conditional expression (23), it is achievable to satisfactorily correct the field curvature, the distortion and the chromatic aberration, while downsizing the imaging lens.

In case that the seventh lens has positive refractive power, when the whole lens system has the focal length f and the seventh lens has a focal length f7, the imaging lens having the above-described configuration preferably satisfies the following conditional expression (24):

$$1 < f7/f < 6 \quad (24)$$

When the imaging lens satisfies the conditional expression (24), it is achievable to satisfactorily correct the field curvature, the distortion and the chromatic aberration, while downsizing the imaging lens.

In case that both of the sixth lens and the seventh lens have negative refractive powers, when the whole lens system has the focal length f and a composite focal length of the sixth lens and the seventh lens is f67, the imaging lens having the above-described configuration preferably satisfies the following conditional expression (25):

$$-10 < f67/f < -5 \quad (25)$$

When the imaging lens satisfies the conditional expression (25), it is achievable to satisfactorily correct the field curvature, the distortion and the chromatic aberration, while downsizing the imaging lens.

In case that the eighth lens has positive refractive power, when the whole lens system has the focal length f and the eighth lens has a focal length f8, the imaging lens having the above-described configuration preferably satisfies the following conditional expression (26):

$$1 < f8/f < 5 \quad (26)$$

When the imaging lens satisfies the conditional expression (26), it is achievable to satisfactorily restrain the field curvature, the distortion and the chromatic aberration, within satisfactory ranges in a well-balanced manner.

According to the invention, the respective lenses from the first lens to the ninth lens are preferably arranged with certain air intervals. When the respective lenses are arranged at certain air intervals, the imaging lens of the invention can have a lens configuration that does not contain any cemented lens. In such lens configuration like this, since it is easy to form all of the nine lenses that compose the imaging lens from plastic materials, it is achievable to suitably restrain the manufacturing cost of the imaging lens.

According to the imaging lens of the invention, it is preferred to form both surfaces of each of the first through the ninth lenses in aspheric shapes. Forming the both surfaces of each lens in aspheric surfaces, it is achievable to more satisfactorily correct aberrations from proximity of the optical axis of the lens to the periphery thereof. Especially, it is achievable to satisfactorily correct aberrations at periphery of the lens(es).

According to the imaging lens having the above-described configuration, the first lens is preferably formed in a shape directing a convex surface thereof to the object side. When the first lens is formed in such a shape, it is achievable to suitably downsize the imaging lens.

According to the imaging lens having the above-described configuration, in the eighth lens and the ninth lens, at least two surfaces thereof are preferably formed in an aspheric shape having an inflection point. In addition to the image plane-side surface of the ninth lens, when one or more surfaces are further formed in aspheric shapes having an inflection point, it is achievable to more satisfactorily correct aberrations at periphery of an image, while suitably restraining an incident angle of a light beam emitted from the imaging lens to the image plane within the range of CRA.

According to the invention, when the imaging lens has an angle of view $2\omega$, the imaging lens preferably satisfies $65° \leq 2\omega$. When the imaging lens satisfies this conditional expression, it is possible to attain a wide angle of the imaging lens, and thereby to suitably attain both downsizing and wider angle of the imaging lens in a balanced manner.

In case of an imaging element with a high pixel count, a light-receiving area of each pixel decreases, so that an image tends to be dark. As a method of correcting such darkness of the image, there is a method of improving light-receiving sensitivity of the imaging element by using an electrical circuit. However, when the light-receiving sensitivity increases, a noise component, which does not directly contribute to formation of an image, is also amplified. Accordingly, in order to obtain fully bright image without such electrical circuit, when the whole lens system has the focal length f and the imaging lens has a diameter of entrance pupil Dep, the imaging lens having the above-described configuration preferably satisfies the following conditional expression (27):

$$f/Dep < 2.4 \quad (27)$$

Here, according to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface has a convex shape. "An object-side surface having a negative curvature radius" means the object side surface has a concave shape. In addition, "an image plane-side surface having a positive curvature radius" means the image plane-side surface has a concave shape. "An image plane-side surface having a negative curvature radius" means the image plane-side surface has a convex shape. Here, a curvature radius used herein refers to a paraxial curvature radius, and may not fit to general shapes of the lenses in their sectional views all the time.

According to the imaging lens of the invention, it is achievable to provide an imaging lens having a small size, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, 16, 19, 22, 25, 28, 31, 34 and 37 are schematic sectional views of the imaging lenses in Numerical Data Examples 1 to 13 according to the embodiment, respectively. Since the imaging lenses in those Numerical Data Examples have the same basic configuration, the lens configuration of the embodiment will be described with reference to the sectional view of Numerical Data Example 1.

Figure 1:
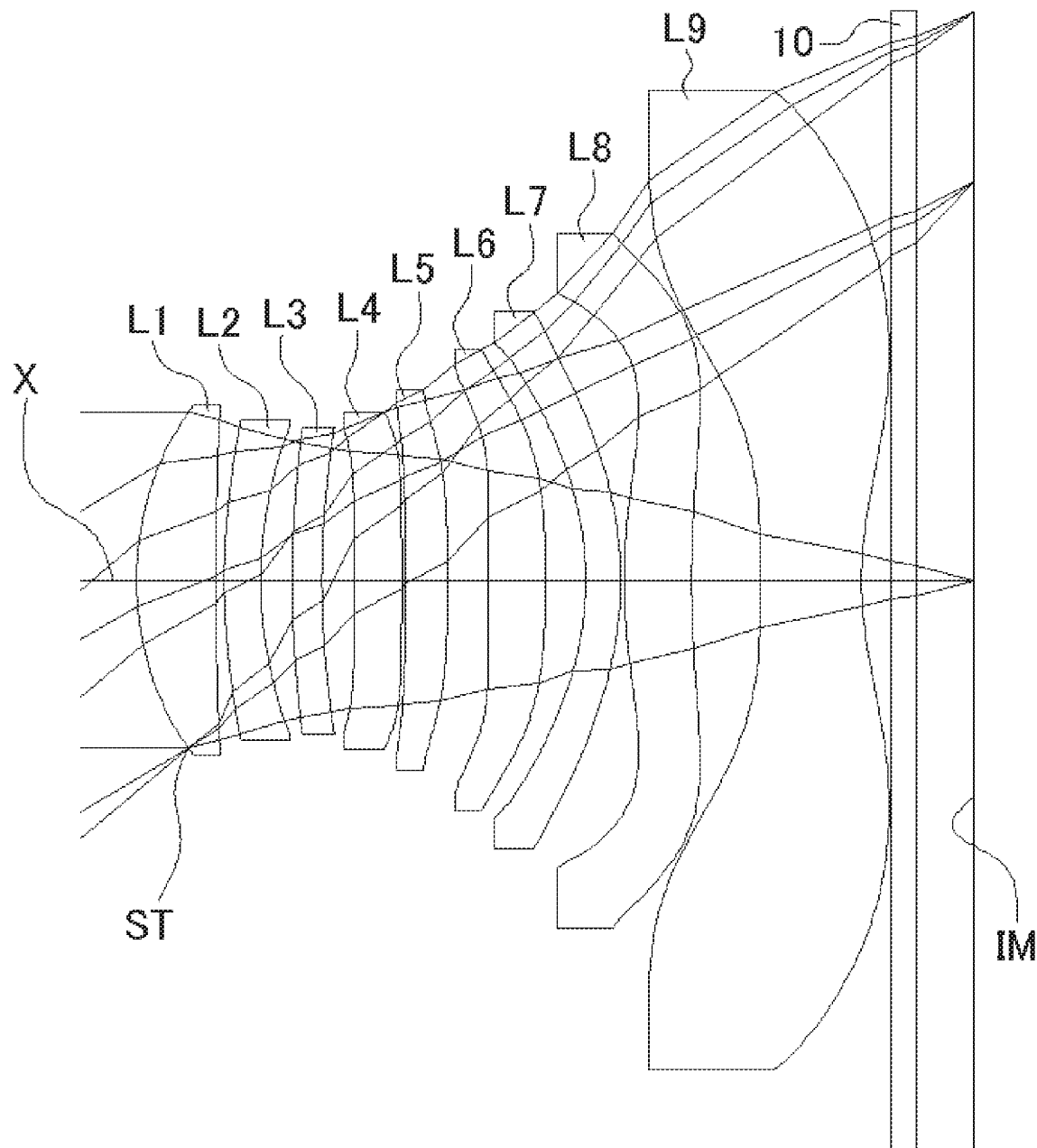
FIG. 1 shows a sectional view of a schematic configuration of an imaging lens in Numerical Data Example 1 of the present invention.

As shown in FIG. 1, the imaging lens of the embodiment includes a first lens L1 having positive refractive power; a second lens L2 having negative refractive power; a third lens L3 having negative refractive power; a fourth lens L4 having positive refractive power; a fifth lens L5; a sixth lens L6; a seventh lens L7; an eighth lens L8; and a ninth lens L9 having negative refractive power, arranged in the order from an object side to an image plane side. In addition, between the ninth lens L9 and an image plane IM of an imaging element, there is provided a filter 10. Here, the filter 10 is omissible.

The first lens L1 is formed in a shape such that a curvature radius r1 of a surface thereof on the object-side and a curvature radius r2 of a surface thereof on the image plane side are both positive. The first lens L1 has a shape of a meniscus lens directing a convex surface thereof to the object side near the optical axis. The shape of the first lens L1 may not be limited to the one in Numerical Data Example 1. The first lens L1 can be formed in any shape as long as the refractive power thereof is positive. In addition to the shape in Numerical Data Example 1, the first lens L1 can be formed in a shape such that the curvature radius r1 and the curvature radius r2 are both negative, or such that the curvature radius r1 is positive and the curvature radius r2 is negative. In the former case, the first lens is formed to have a shape of a meniscus lens directing a concave surface thereof to the object side near the optical axis. In the latter case, the first lens is formed to have a shape of a biconvex lens near the optical axis. In view of downsizing the imaging lens, the first lens L1 may be preferably formed in a shape such that the curvature radius r1 is positive.

According to Numerical Data Example 1, there is provided an aperture stop ST on the object-side surface of the first lens L1. Here, the position of the aperture stop ST may not be limited to the one in Numerical Data Example 1. The aperture stop ST can be provided closer to the object-side than the first lens L1. Alternatively, the aperture stop ST can be provided between the first lens L1 and the second lens L2; between the second lens L2 and the third lens L3; between the third lens L3 and the fourth lens L4; or the like.

The second lens L2 is formed in a shape such that a curvature radius r3 of a surface thereof on the object-side and a curvature radius r4 of a surface thereof on the image plane side are both positive. The second lens L2 has a shape of a meniscus lens directing a convex surface thereof to the object side near the optical axis. The shape of the second lens L2 may not be limited to the one in Numerical Data Example 1. The second lens L2 can be formed in any shape as long as the refractive power thereof is negative. In addition to the shape in Numerical Data Example 1, the second lens L2 can be formed in a shape such that the curvature radius r3 and the curvature radius r4 are both negative, or such that the curvature radius r3 is negative and the curvature radius r4 is positive. The first of the above-described shapes is a shape of a meniscus lens directing a concave surface thereof to the object side near the optical axis, and the latter one is a shape of a biconcave lens near the optical axis. In view of downsizing the imaging lens, the second lens L2 may be preferably formed in a shape such that the curvature radius r3 is positive.

The third lens L3 is formed in a shape such that a curvature radius r5 of a surface thereof on the object-side and a curvature radius r6 of a surface thereof on the image plane side are both positive. The third lens L3 has a shape of a meniscus lens directing a convex surface thereof to the object side near the optical axis. The shape of the third lens L3 may not be limited to the one in Numerical Data Example 1. The Numerical Data Examples 2 and 10 are examples of a shape, in which the curvature radius r5 is negative and the curvature radius r6 is positive, so as to have a shape of a biconcave lens near the optical axis. Numerical Data Examples 4 through 6, 12 and 13 are examples of a shape, in which the curvature radii r5 and r6 are both negative, i.e., a shape of a meniscus lens directing a concave surface thereof to the object side near the optical axis. The third lens L3 can be formed in any shape as long as the refractive power thereof is negative.

The fourth lens L4 is formed in a shape such that a curvature radius r7 of a surface thereof on the object-side is positive and a curvature radius r8 of a surface thereof on the image plane side is negative. The fourth lens L4 has a shape of a biconvex lens near the optical axis. The shape of the fourth lens L4 may not be limited to the one in Numerical Data Example 1. Numerical Data Examples 2 is an example of a shape, in which the curvature radii r7 and r8 are both positive, i.e., a shape of a meniscus lens directing a convex surface thereof to the object side near the optical axis.

The fifth lens L5 has positive refractive power. The refractive power of the fifth lens L5 is not limited to positive refractive power. Numerical Data Examples 7 through 13 are examples of lens configurations, in which the fifth lens L5 has negative refractive power.

The fifth lens L5 is formed in a shape, such that a curvature radius r9 of a surface thereof on the object-side and a curvature radius r10 of a surface thereof on the image plane side are both negative. The fifth lens L5 has a shape of a meniscus lens directing a concave surface thereof to the object side near the optical axis. The shape of the fifth lens L5 may not be limited to the one in Numerical Data Example 1. The Numerical Data Examples 3 and 5 are examples of a shape, in which the curvature radius r9 is positive and the curvature radius r10 is negative, so as to have a shape of a biconvex lens near the optical axis. The Numerical Data Examples 9 and 11 are examples of a shape, in which the curvature radius r9 is negative and the curvature radius r10 is positive, so as to have a shape of a biconcave lens near the optical axis. Numerical Data Examples 13 is an example of a shape, in which the curvature radii r9 and r10 are both positive, i.e., a shape of a meniscus lens directing a convex surface thereof to the object side near the optical axis.

The sixth lens L6 has positive refractive power. The refractive power of the sixth lens L6 is not limited to positive refractive power. Numerical Data Examples 3 through 6 and 11 through 13 are examples of lens configurations, in which the sixth lens L6 has negative refractive power.

The sixth lens L6 is formed in a shape such that a curvature radius r11 of a surface thereof on the object-side is positive and a curvature radius r12 of a surface thereof on the image plane side is negative. The sixth lens L6 has a shape of a biconvex lens near the optical axis. The shape of the sixth lens L6 may not be limited to the one in Numerical Data Example 1. Numerical Data Examples 3 through 6 and 11 through 13 are examples of a shape, in which the curvature radii r11 and r12 are both negative, i.e., a shape of a meniscus lens directing a concave surface thereof to the object side near the optical axis.

The seventh lens L7 has negative refractive power. The refractive power of the seventh lens L7 is not limited to negative refractive power. Numerical Data Examples 3, 4, 7, 8, 11 and 12 are examples of lens configurations, in which the seventh lens L7 has positive refractive power.

The seventh lens L7 is formed in a shape, such that a curvature radius r13 of a surface thereof on the object-side (=R7f) and a curvature radius r14 of a surface thereof on the image plane side (=R7r) are both negative. The seventh lens L7 has a shape of a meniscus lens directing a concave surface thereof to the object side near the optical axis. The shape of the seventh lens L7 may not be limited to the one in Numerical Data Example 1. For example, the seventh lens L7 can be formed in a shape such that the curvature radii r13 and r14 are both positive, so as to have a shape of a meniscus lens directing a convex surface thereof to the object side near an optical axis. In addition to the shapes described above, the seventh lens L7 can be formed in a shape such that the curvature radius r13 is positive and the curvature radius r14 is negative, or such that the curvature radius r13 is negative and the curvature radius r14 is positive.

The eighth lens L8 has positive refractive power. The refractive power of the eighth lens L8 is not limited to positive refractive power. Numerical Data Examples 2, 4, 6, 8, 10 and 12 are examples of lens configurations, in which the eighth lens L8 has negative refractive power.

The eighth lens L8 is formed in a shape such that a curvature radius r15 of a surface thereof on the object-side (=R8f) and a curvature radius r16 of a surface thereof on the image plane side (=R8r) are both positive. The eighth lens L8 has a shape of a meniscus lens directing a convex surface thereof to the object side near the optical axis. The shape of the eighth lens L8 may not be limited to the one in Numerical Data Example 1. For example, the eighth lens L8 can be formed in a shape such that the curvature radius r15 and the curvature radius r16 are both negative, so as to have a shape of a meniscus lens directing a concave surface thereof to the concave near an optical axis. In addition to the shapes described above, the eighth lens L8 can be formed in a shape such that the curvature radius r15 is positive and the curvature radius r16 is negative, or such that the curvature radius r15 is negative and the curvature radius r16 is positive.

The ninth lens L9 is formed in a shape such that a curvature radius r17 of a surface thereof on the object-side is negative and a curvature radius r18 of a surface thereof on the image plane side (=R9r) is positive. The ninth lens L9 has a shape of a biconcave lens near the optical axis. The shape of the ninth lens L9 may not be limited to the one in Numerical Data Example 1. Numerical Data Examples 2, 4, 6, 8, 10 and 12 are examples of a shape, in which the curvature radii r17 and r18 are both positive, i.e., a shape of a meniscus lens directing a convex surface thereof to the object side near the optical axis. In addition to the shapes described above, the ninth lens L9 can be formed in a shape such that the curvature radius r17 and the curvature radius r18 are both negative. The ninth lens L9 can be formed in any shape as long as the refractive power thereof is negative.

The ninth lens L9 is formed in a shape such that a surface thereof on the image plane side has an aspheric shape having an inflection point. Here, the "inflection point" means a point where the positive/negative sign of a curvature changes on the curve, i.e., a point where a direction of curving of the curve on the lens surface changes. According to the imaging lens of the embodiment, the image plane-side surface of the ninth lens L9 is formed as an aspheric shape having a pole. With such shape of the ninth lens L9, it is achievable to satisfactorily correct an off-axis chromatic aberration of magnification as well as an axial chromatic aberration, and to suitably restrain the incident angle of a light beam emitted from the imaging lens to the image plane IM within the range of CRA. According to the imaging lens of Numerical Data Example 1, both surfaces of the eighth lens L8 and the ninth lens L9 are formed as aspheric shapes having an inflection point. For this reason, it is achievable to more satisfactorily correct aberrations at periphery of the image, while restraining the incident angle of a light beam emitted from the imaging lens within the range of CRA. Here, depending on the required optical performance and downsizing of the imaging lens, among lens surfaces of the eighth lens L8 and the ninth lens L9, lens surfaces other than the image plane-side surface of the ninth lens L9 can be formed as an aspheric shape without an inflection point.

According to the embodiment, the imaging lens satisfies the following conditional expressions (1) through (22) and (27):

$$0 < f123 \quad (1)$$
$$0 < f456 \quad (2)$$
$$f789 < 0 \quad (3)$$
$$0.4 < f1/f < 2.0 \quad (4)$$
$$-6 < f2/f1 < -1 \quad (5)$$
$$-5 < f2/f < -0.5 \quad (6)$$
$$-5 < f23/f < -0.5 \quad (7)$$
$$0.1 < f2/f3 < 1.2 \quad (8)$$
$$-20 < f3/f < -5 \quad (9)$$
$$0.5 < R7f/R7r < 2 \quad (10)$$
$$0.1 < R8f/R8r < 1.5 \quad (11)$$
$$0.5 < T8/17 < 4 \quad (12)$$
$$0.1 < D67/D89 < 0.7 \quad (13)$$
$$0.05 < D89/f < 0.15 \quad (14)$$
$$-5 < f89/f < -0.3 \quad (15)$$
$$0.2 < R9r/f < 0.6 \quad (16)$$
$$-2 < f9/f < -0.2 \quad (17)$$
$$35 < vd1 < 75 \quad (18)$$
$$15 < vd2 < 35 \quad (19)$$
$$35 < vd9 < 75 \quad (20)$$
$$1.0 < TL/f < 1.4 \quad (21)$$
$$1.0 < TL/Hmax < 1.8 \quad (22)$$
$$f/Dep < 2.4 \quad (27)$$

In the above conditional expression,
f: Focal length of the whole lens system
f1: Focal length of the first lens L1
f2: Focal length of the second lens L2
f3: Focal length of the third lens L3
f9: Focal length of the ninth lens L9
f23: Composite focal length of the second lens L2 and the third lens L3
f89: Composite focal length of the eighth lens L8 and the ninth lens L9
f123: Composite focal length of the first lens L1, the second lens L2 and the third lens L3
f456: Composite focal length of the fourth lens L4, the fifth lens L5 and the sixth lens L6
f789: Composite focal length of the seventh lens L7, the eighth lens L8 and the ninth lens L9
T7: Thickness of the seventh lens L7 on an optical axis
T8: Thickness of the eighth lens L8 on an optical axis
vd1: Abbe's number of the first lens L1
vd2: Abbe's number of the second lens L2
vd9: Abbe's number of the ninth lens L9

R7f: Paraxial curvature radius of an object-side surface of the seventh lens L7

R7r: Paraxial curvature radius of an image plane-side surface of the seventh lens L7

R8f: Paraxial curvature radius of an object-side surface of the eighth lens L8

R8r: Paraxial curvature radius of an image plane-side surface of the eighth lens L8

R9r: Paraxial curvature radius of an image plane-side surface of the ninth lens L9

D67: Distance along the optical axis X between the sixth lens L6 and the seventh lens L7

D89: Distance on the optical axis X between the eighth lens L8 and the ninth lens L9

Hmax: Maximum image height

TL: Distance on an optical axis X from the object-side surface of the first lens L1 to the image plane IM (the filter 10 is a distance in the air)

Dep: Diameter of entrance pupil

When the sixth lens L6 has positive refractive power as in the lens configurations of Numerical Data Examples 1, 2 and 7 through 10, the imaging lens further satisfies the following conditional expression (23):

$$1 < f6/f < 3 \quad (23)$$

In the above conditional expression, f6: Focal length of the sixth lens L6

When the seventh lens L7 has positive refractive power as in the lens configurations of Numerical Data Examples 3, 4, 7, 8, 11 and 12, the imaging lens further satisfies the following conditional expression (24):

$$1 < f7/f < 6 \quad (24)$$

In the above conditional expression, f7: Focal length of the seventh lens L7

When both of the sixth lens L6 and the seventh lens L7 have negative refractive power as in the lens configurations in Numerical Data Examples 5, 6 and 13, the imaging lens further satisfies the following conditional expression (25):

$$-10 < f67/f < -5 \quad (25)$$

In the above conditional expression, f67: Composite focal length of the sixth lens L6 and the seventh lens L7

When the eighth lens L8 has positive refractive power as in the lens configurations of Numerical Data Examples 1, 3, 5, 7, 9, 11 and 13, the imaging lens further satisfies the following conditional expression (26):

$$1 < f8/f < 5 \quad (26)$$

In the above conditional expression, f8: Focal length of the eighth lens L8

Here, it is not necessary to satisfy all of the conditional expressions, and it is achievable to obtain an effect corresponding to the respective conditional expression when any single one of the conditional expressions is individually satisfied.

According to the embodiment, lens surfaces of the respective lenses are formed as aspheric surfaces. An equation that expresses those aspheric surfaces is shown below:

$$Z = \frac{C \cdot H^2}{1 + \sqrt{1 - (1+k) \cdot C^2 \cdot H^2}} + \sum (An \cdot H^n) \quad \text{[Equation 1]}$$

In the above conditional expression,

Z: Distance in a direction of the optical axis

H: Distance from the optical axis in a direction perpendicular to the optical axis C: Paraxial curvature (=1/r, r: paraxial curvature radius)

k: Conic constant

An: The nth aspheric coefficient

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a paraxial curvature radius, d represents a distance on the optical axis between lens surfaces (surface spacing), nd represents a refractive index at a reference wavelength of 588 nm, and vd represents an Abbe's number at the reference wavelength, respectively. Here, surfaces indicated with surface numbers i affixed with * (asterisk) are aspheric surfaces.

Numerical Data Example 1

Basic Lens Data

TABLE 1 f = 5.59 mm Fno = 2.0 ω = 40.1°

| | i | r | d | nd | vd | [mm] |
|---|---|---|---|---|---|---|
| | | ∞ | ∞ | | | |
| L1 | 1*(ST) | 2.567 | 0.667 | 1.5443 | 55.9 | f1 = 5.243 |
| | 2* | 23.255 | 0.070 | | | |
| L2 | 3* | 4.802 | 0.306 | 1.6707 | 19.2 | f2 = −14.188 |
| | 4* | 3.110 | 0.268 | | | |
| L3 | 5* | 8.687 | 0.250 | 1.6707 | 19.2 | f3 = −90.906 |
| | 6* | 7.516 | 0.270 | | | |
| L4 | 7* | 65.796 | 0.402 | 1.5443 | 55.9 | f4 = 83.667 |
| | 8* | −147.605 | 0.030 | | | |
| L5 | 9* | −226.728 | 0.354 | 1.5443 | 55.9 | f5 = 100.319 |
| | 10* | −44.030 | 0.337 | | | |
| L6 | 11* | 13.848 | 0.488 | 1.5443 | 55.9 | f6 = 12.089 |
| | 12* | −12.382 | 0.338 | | | |
| L7 | 13* | −2.844 | 0.296 | 1.6707 | 19.2 | f7 = −100.447 |
| | 14* | −3.093 | 0.030 | | | |
| L8 | 15* | 4.723 | 0.568 | 1.5443 | 55.9 | f8 = 16.158 |
| | 16* | 9.768 | 0.576 | | | |
| L9 | 17* | −49.779 | 0.853 | 1.5443 | 55.9 | f9 = −4.594 |
| | 18* | 2.649 | 0.250 | | | |
| | 19 | ∞ | 0.210 | 1.5168 | 64.2 | |
| | 20 | ∞ | 0.482 | | | |
| (IM) | | ∞ | | | | | f123=7.801 mm f456=9.683 mm f789=−6.635 mm f23=−12.143 mm f89=−7.588 mm

T7=0.296 mm

T8=0.568 mm

D67=0.338 mm

D89=0.576 mm

TL=6.973 mm

Hmax=4.7 mm

Dep=2.825 mm

TABLE 2

Aspherical surface data

| i | k | A4 | A6 | A8 | A10 | A12 | A14 | A16 |
|---|---|---|---|---|---|---|---|---|
| 1 | 2.671E−01 | 9.649E−05 | −2.400E−04 | 6.228E−04 | −5.361E−04 | 2.207E−04 | −1.079E−05 | −1.329E−05 |
| 2 | 0.000E+00 | −1.766E−02 | 2.265E−02 | −1.417E−02 | 4.946E−03 | −7.561E−04 | −4.444E−05 | 1.791E−05 |
| 3 | −1.787E+01 | −2.223E−02 | 2.355E−02 | −1.367E−02 | 4.928E−03 | −9.022E−04 | 1.830E−04 | −3.072E−05 |
| 4 | −1.170E+01 | 2.053E−02 | −1.420E−02 | 1.186E−02 | −5.527E−03 | 1.953E−03 | −3.777E−04 | 2.320E−04 |
| 5 | 0.000E+00 | −4.891E−03 | −1.686E−03 | 2.449E−04 | 1.847E−03 | 8.099E−05 | 1.092E−04 | 1.672E−05 |
| 6 | 0.000E+00 | −4.165E−03 | −3.237E−04 | 4.579E−04 | 2.143E−04 | 6.892E−05 | 7.539E−06 | −1.172E−05 |
| 7 | 0.000E+00 | −2.036E−02 | −1.027E−02 | −1.846E−04 | −5.634E−04 | 2.687E−04 | 1.431E−04 | 1.041E−05 |
| 8 | 0.000E+00 | −7.143E−03 | −1.221E−02 | −1.575E−03 | 1.795E−04 | 1.804E−04 | 7.668E−05 | −7.487E−05 |
| 9 | 0.000E+00 | −1.572E−02 | −2.628E−03 | 1.586E−03 | 9.067E−05 | 4.757E−05 | 6.583E−07 | −2.671E−05 |
| 10 | 0.000E+00 | −4.584E−02 | 3.664E−04 | 1.576E−03 | 4.963E−04 | 5.646E−05 | −3.661E−05 | 5.720E−06 |
| 11 | 0.000E+00 | −4.046E−02 | −2.058E−04 | −2.545E−03 | 3.691E−06 | 3.194E−04 | 4.174E−05 | −1.703E−05 |
| 12 | 0.000E+00 | −5.179E−02 | 1.038E−02 | −2.135E−03 | −1.284E−03 | 1.129E−03 | −2.683E−04 | 2.127E−05 |
| 13 | 6.425E−01 | −1.026E−02 | 2.166E−02 | −1.218E−02 | 4.166E−03 | −6.787E−04 | 2.930E−05 | 2.197E−06 |
| 14 | −4.424E+00 | −1.782E−02 | 1.533E−02 | −8.556E−03 | 2.351E−03 | −3.048E−04 | 1.710E−05 | −3.994E−07 |
| 15 | 0.000E+00 | −2.083E−02 | 1.006E−04 | −1.273E−03 | 3.229E−04 | −5.554E−05 | 5.482E−06 | −2.371E−07 |
| 16 | 0.000E+00 | −4.940E−03 | −9.342E−04 | −5.409E−04 | 1.130E−04 | −7.970E−06 | −1.691E−08 | 2.544E−08 |
| 17 | 0.000E+00 | −6.864E−02 | 1.529E−02 | −1.782E−03 | 1.446E−04 | −8.475E−06 | 3.132E−07 | −5.354E−09 |
| 18 | −4.616E+00 | −4.403E−02 | 1.153E−02 | −2.092E−03 | 2.371E−04 | −1.594E−05 | 5.789E−07 | −8.717E−09 |

The values of the respective conditional expressions are as follows:

f1/f=0.94
f2/f1=−2.71
f2/f=−2.54
f23/f=−2.17
f2/f3=0.16
f3/f=−16.25
R7f/R7r=0.92
R8f/R8r=0.48
T8/T7=1.92
D67/D89=0.59
D89/f=0.10
f89/f=−1.36
R9r/f=0.47
f9/f=−0.82
TL/f=1.25
TL/Hmax=1.48
f/Dep=1.98
f6/f=2.16
f8/f=2.89

Accordingly, the imaging lens of Numerical Data Example 1 satisfies the above-described conditional expressions.

Figure 2:
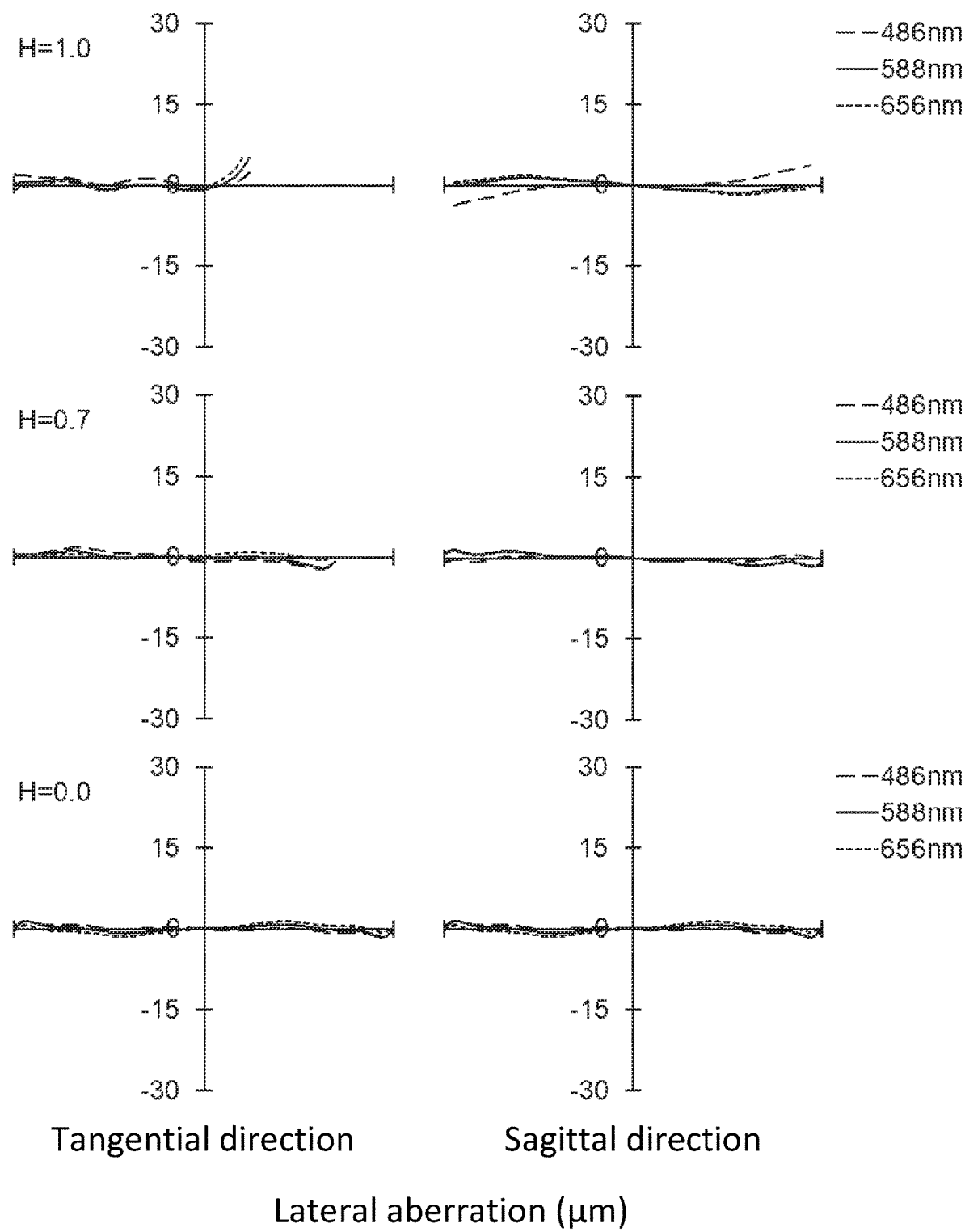
FIG. 2 is an aberration diagram showing a lateral aberration of the imaging lens of FIG. 1.
Figure 3:
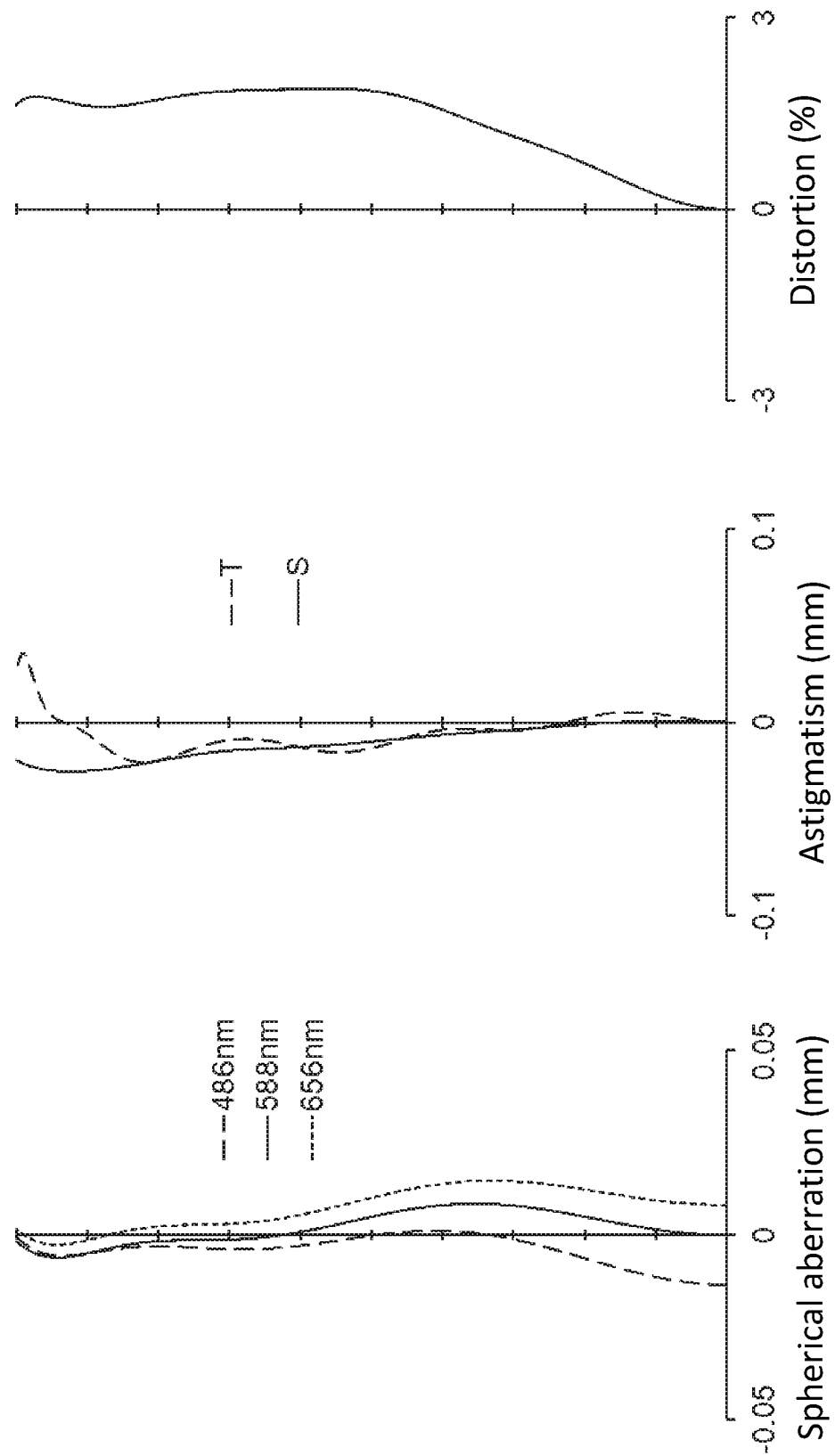
FIG. 3 is an aberration diagram showing a spherical aberration, astigmatism, and a distortion of the imaging lens of FIG. 1.
Figure 4:
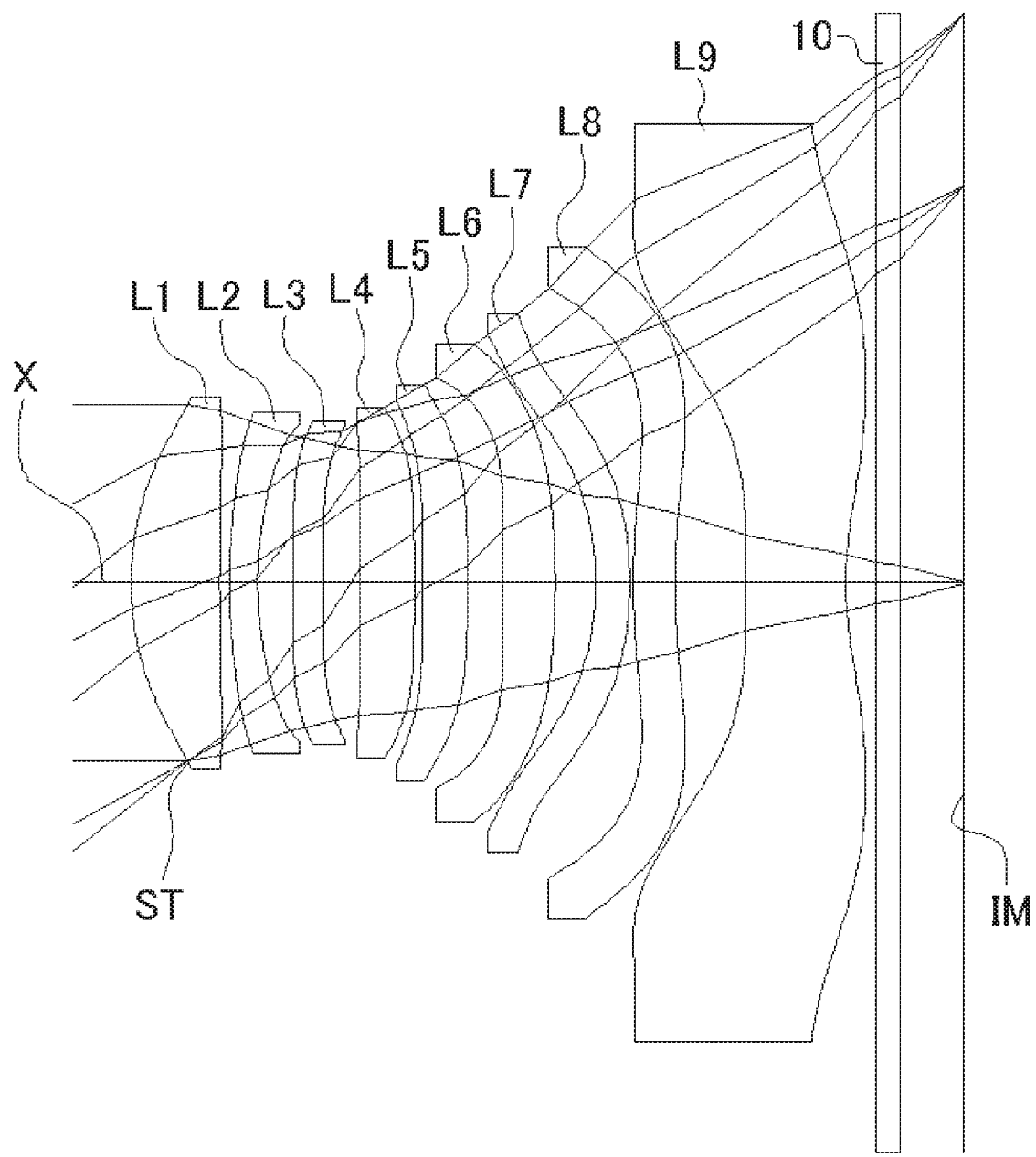
FIG. 4 shows a sectional view of a schematic configuration of an imaging lens in Numerical Data Example 2 of the present invention.

FIG. 2 shows a lateral aberration that corresponds to a ratio H of each image height to the maximum image height Hmax (hereinafter referred to as "image height ratio H"), which is divided into a tangential direction and a sagittal direction (The same is true for FIGS. 5, 8, 11, 14, 17, 20, 23, 26, 29, 32, 35 and 38). FIG. 3 shows a spherical aberration (mm), astigmatism (mm), and a distortion (%), respectively. The aberration diagrams of the astigmatism and the distortion show aberrations at a reference wavelength (588 nm). Furthermore, in the aberration diagrams of the astigmatism shows sagittal image surfaces (S) and tangential image surfaces (T), respectively (The same is true for FIGS. 6, 9, 12, 15, 18, 21, 24, 27, 30, 33, 36 and 39). As shown in FIGS. 2 and 3, according to the imaging lens of Numerical Data Example 1, the aberrations can be satisfactorily corrected.

Numerical Data Example 2

Basic Lens Data

TABLE 3 f = 5.92 mm Fno = 2.0 ω = 38.5°

|  | i | r | d | nd | vd | [mm] |
|---|---|---|---|---|---|---|
|  |  | ∞ | ∞ |  |  |  |
| L1 | 1*(ST) | 2.418 | 0.748 | 1.5443 | 55.9 | f1 = 4.998 |
|  | 2* | 19.418 | 0.079 |  |  |  |
| L2 | 3* | 4.161 | 0.240 | 1.6707 | 19.2 | f2 = −15.718 |
|  | 4* | 2.914 | 0.304 |  |  |  |
| L3 | 5* | −36.658 | 0.250 | 1.6707 | 19.2 | f3 = −54.548 |
|  | 6* | 18365.648 | 0.308 |  |  |  |
| L4 | 7* | 19.936 | 0.455 | 1.5443 | 55.9 | f4 = 45.572 |
|  | 8* | 100.749 | 0.075 |  |  |  |
| L5 | 9* | −55.127 | 0.376 | 1.5443 | 55.9 | f5 = 100.327 |
|  | 10* | −27.499 | 0.294 |  |  |  |
| L6 | 11* | 20.083 | 0.443 | 1.5443 | 55.9 | f6 = 11.183 |
|  | 12* | −8.666 | 0.341 |  |  |  |
| L7 | 13* | −2.862 | 0.288 | 1.6707 | 19.2 | f7 = −95.877 |
|  | 14* | −3.116 | 0.030 |  |  |  |
| L8 | 15* | 5.824 | 0.350 | 1.5443 | 55.9 | f8 = −88.662 |
|  | 16* | 5.087 | 0.595 |  |  |  |
| L9 | 17* | 33.032 | 0.845 | 1.5443 | 55.9 | f9 = −5.706 |
|  | 18* | 2.813 | 0.250 |  |  |  |
|  | 19 | ∞ | 0.210 | 1.5168 | 64.2 |  |
|  | 20 | ∞ | 0.536 |  |  |  |
| (IM) |  | ∞ |  |  |  |  | f123=7.315 mm
f456=8.432 mm
f789=−4.852 mm
f23=−12.212 mm
f89=−5.400 mm
T7=0.288 mm
T8=0.350 mm
D67=0.341 mm
D89=0.595 mm
TL=6.946 mm
Hmax=4.7 mm
Dep=2.991 mm

TABLE 4

Aspherical surface data

| i | k | A4 | A6 | A8 | A10 | A12 | A14 | A16 |
|---|---|---|---|---|---|---|---|---|
| 1 | 1.612E−01 | −1.198E−03 | −2.415E−03 | 9.840E−04 | −9.269E−04 | −9.624E−05 | 1.947E−04 | −5.885E−05 |
| 2 | 0.000E+00 | −3.015E−02 | 3.737E−02 | −3.048E−02 | 1.608E−02 | −5.319E−03 | 8.720E−04 | −5.793E−05 |
| 3 | −2.191E+01 | −3.232E−02 | 3.055E−02 | −8.972E−03 | 4.674E−03 | −1.665E−03 | 4.756E−05 | 5.205E−05 |
| 4 | −9.150E+00 | −7.265E−04 | −6.763E−04 | 2.037E−02 | −4.123E−03 | 4.185E−03 | −1.162E−03 | 4.462E−04 |
| 5 | 0.000E+00 | 4.625E−02 | −6.547E−03 | 9.769E−03 | 3.955E−03 | −3.889E−03 | −4.194E−04 | 4.599E−04 |
| 6 | 0.000E+00 | 5.106E−02 | −7.237E−04 | 4.238E−03 | 2.113E−03 | 1.397E−03 | −3.443E−03 | 1.016E−03 |
| 7 | 0.000E+00 | −2.483E−02 | −5.508E−03 | 4.523E−03 | −1.145E−03 | 2.113E−04 | 4.110E−04 | −1.181E−04 |
| 8 | 0.000E+00 | −3.724E−02 | −1.177E−02 | −4.633E−03 | 3.558E−03 | 2.682E−05 | −3.303E−05 | −5.181E−05 |
| 9 | 0.000E+00 | −2.841E−02 | −1.050E−02 | 1.620E−03 | 3.199E−05 | 3.953E−04 | 1.779E−04 | −9.933E−05 |
| 10 | 0.000E+00 | −4.947E−02 | −3.506E−03 | 3.256E−03 | 1.686E−04 | −2.276E−04 | −3.713E−05 | 2.119E−05 |
| 11 | 0.000E+00 | −3.706E−02 | −5.465E−03 | −4.718E−03 | 2.477E−04 | 6.192E−04 | 3.207E−05 | −5.453E−05 |
| 12 | 0.000E+00 | −2.872E−02 | 7.806E−03 | −4.366E−03 | −6.353E−04 | 1.118E−03 | −2.947E−04 | 2.341E−05 |
| 13 | 6.879E−01 | −6.141E−02 | 2.736E−02 | −9.952E−03 | 4.134E−03 | −7.289E−04 | 2.832E−05 | 2.960E−06 |
| 14 | −1.968E+00 | −4.658E−02 | 1.115E−02 | −5.939E−03 | 2.518E−03 | −3.785E−04 | 1.614E−05 | 1.515E−07 |
| 15 | 0.000E+00 | −2.156E−02 | −4.637E−03 | 8.477E−04 | 1.075E−04 | −7.186E−05 | 8.672E−06 | −2.502E−07 |
| 16 | 0.000E+00 | −3.449E−02 | 4.171E−03 | −7.246E−04 | 5.920E−05 | −4.158E−06 | 2.659E−07 | 1.454E−09 |
| 17 | 0.000E+00 | −8.483E−02 | 1.706E−02 | −1.786E−03 | 1.417E−04 | −8.673E−06 | 3.105E−07 | −4.152E−09 |
| 18 | −8.357E+00 | −4.187E−02 | 1.125E−02 | −2.064E−03 | 2.358E−04 | −1.585E−05 | 5.738E−07 | −8.599E−09 |

The values of the respective conditional expressions are as follows:

f1/f=0.84
f2/f1=−3.14
f2/f=−2.65
f23/f=−2.06
f2/f3=0.29
f3/f=−9.21
R7f/R7r=0.92
R8f/R8r=1.14
T8/T7=1.21
D67/D89=0.57
D89/f=0.10
f89/f=−0.91
R9r/f=0.48
f9/f=−0.96
TL/f=1.17
TL/Hmax=1.48
f/Dep=1.98
f6/f=1.89

Accordingly, the imaging lens of Numerical Data Example 2 satisfies the above-described conditional expressions.

Figure 5:
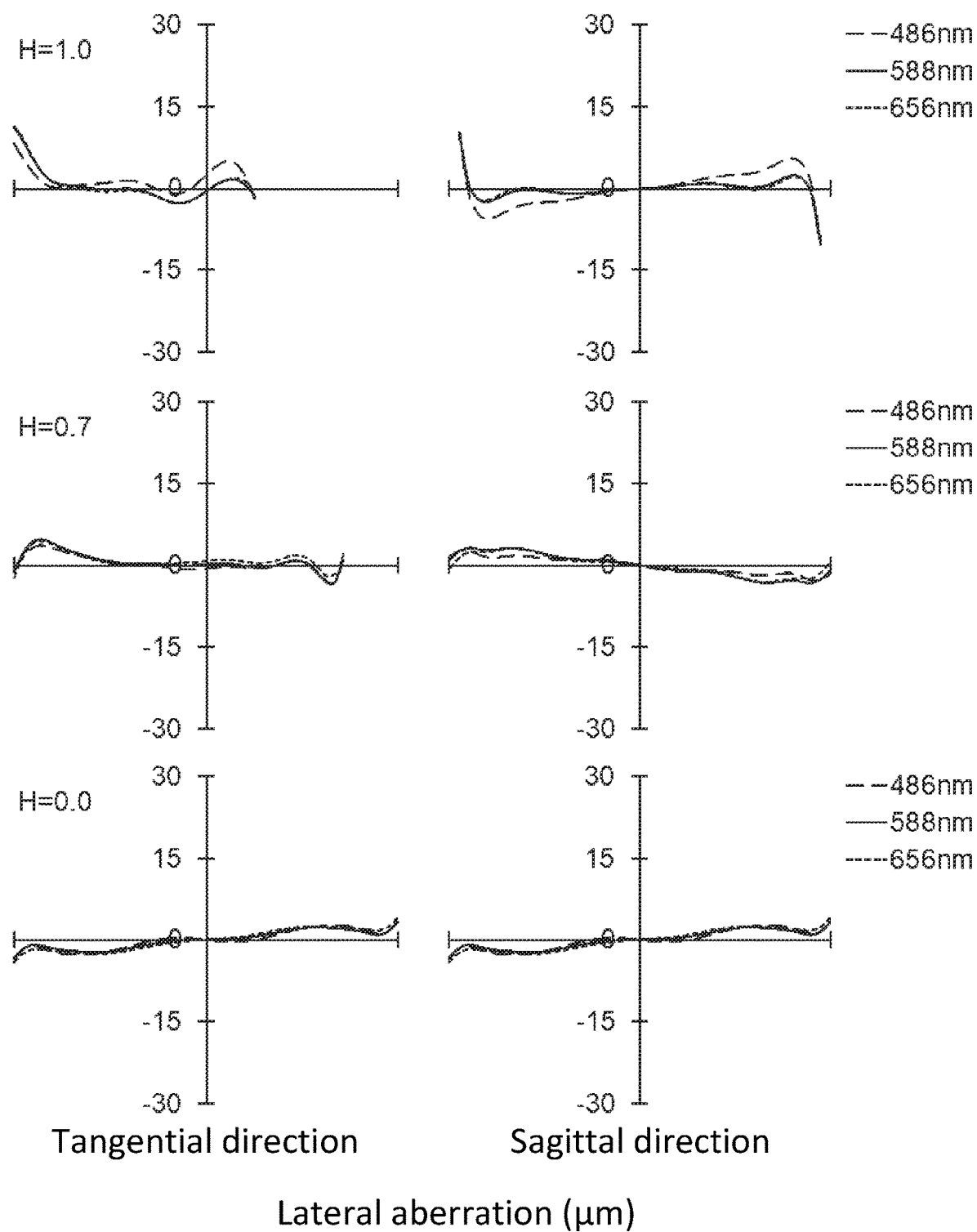
FIG. 5 is an aberration diagram showing a lateral aberration of the imaging lens of FIG. 4.
Figure 6:
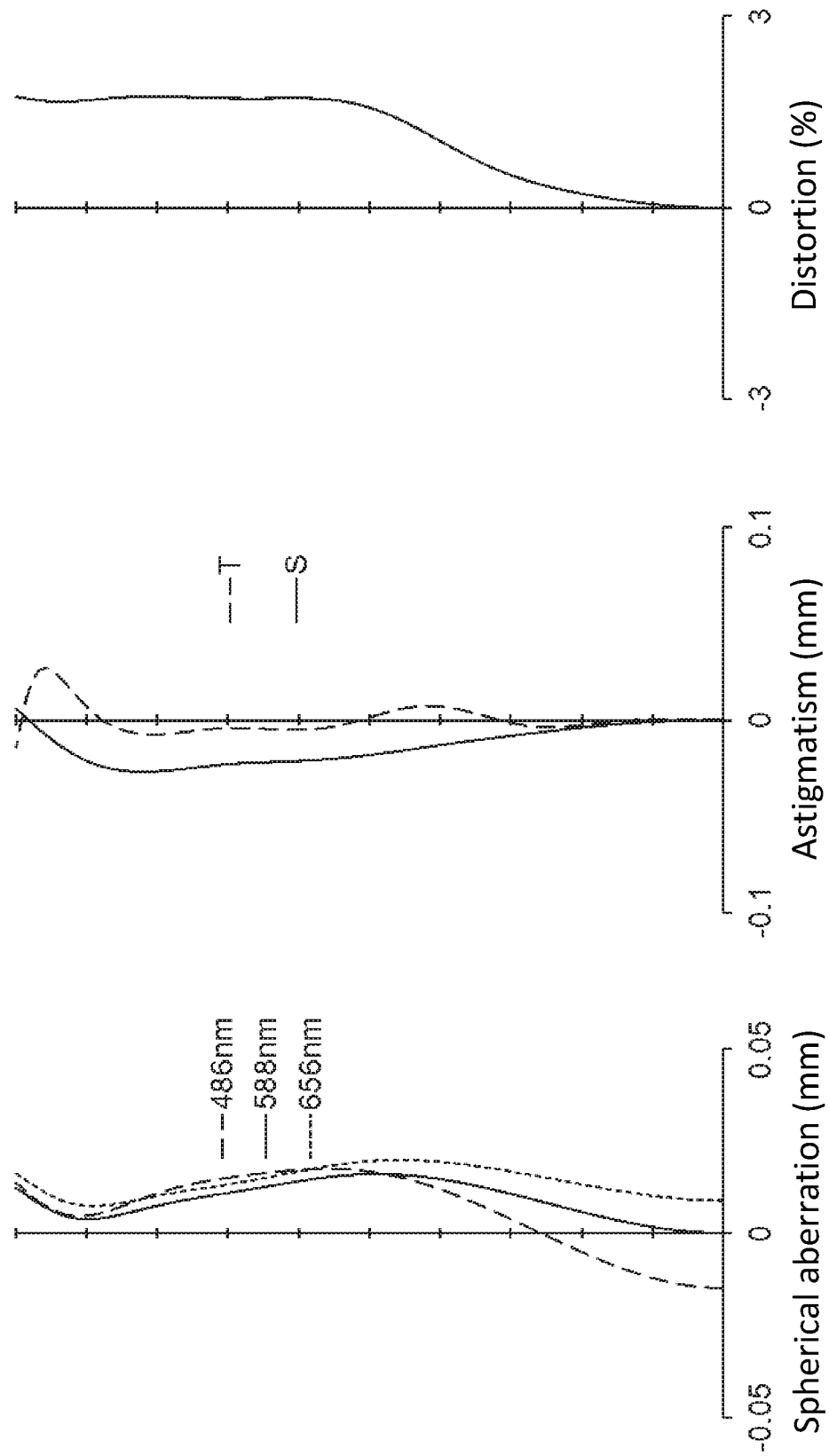
FIG. 6 is an aberration diagram showing a spherical aberration, astigmatism, and a distortion of the imaging lens of FIG. 4.
Figure 7:
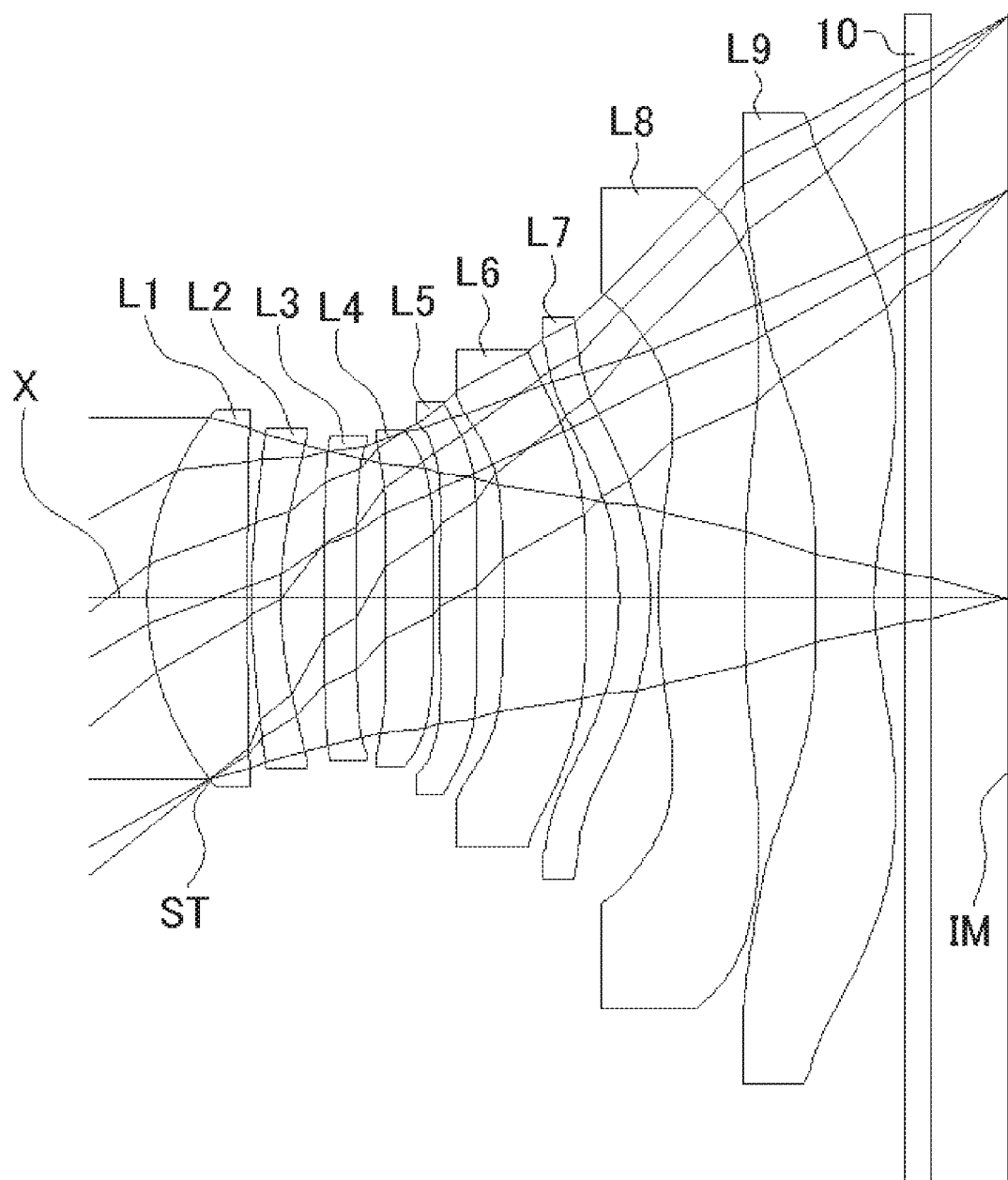
FIG. 7 shows a sectional view of a schematic configuration of an imaging lens in Numerical Data Example 3 of the present invention.

FIG. 5 shows a lateral aberration that corresponds to an image height H and FIG. 6 shows a spherical aberration (mm), astigmatism (mm), and a distortion (%), respectively. As shown in FIGS. 5 and 6, according to the imaging lens of Numerical Data Example 2, the aberrations can be also satisfactorily corrected.

Numerical Data Example 3

Basic Lens Data

TABLE 5 f = 5.88 mm Fno = 2.0 ω = 38.7°

| | i | r | d | nd | vd | [mm] |
|---|---|---|---|---|---|---|
| L1 | 1*(ST) | ∞ | ∞ | | | |
| | 2* | 2.374 | 0.817 | 1.5443 | 55.9 | f1 = 4.861 |
| L2 | 3* | 20.346 | 0.034 | | | |
| | 4* | 4.679 | 0.242 | 1.6707 | 19.2 | f2 = −14.780 |
| | | 3.113 | 0.356 | | | |

TABLE 5-continued f = 5.88 mm Fno = 2.0 ω = 38.7°

| | i | r | d | nd | vd | [mm] |
|---|---|---|---|---|---|---|
| L3 | 5* | 509.089 | 0.262 | 1.6707 | 19.2 | f3 = −64.436 |
| | 6* | 39.827 | 0.244 | | | |
| L4 | 7* | 22.485 | 0.391 | 1.5443 | 55.9 | f4 = 34.033 |
| | 8* | −104.518 | 0.054 | | | |
| L5 | 9* | 131.577 | 0.299 | 1.5443 | 55.9 | f5 = 100.331 |
| | 10* | −93.282 | 0.223 | | | |
| L6 | 11* | −24.211 | 0.676 | 1.5443 | 55.9 | f6 = −63.624 |
| | 12* | −81.259 | 0.270 | | | |
| L7 | 13* | −3.080 | 0.255 | 1.6707 | 19.2 | f7 = 27.690 |
| | 14* | −2.730 | 0.068 | | | |
| L8 | 15* | 4.807 | 0.705 | 1.5443 | 55.9 | f8 = 13.875 |
| | 16* | 12.538 | 0.585 | | | |
| L9 | 17* | −80.842 | 0.481 | 1.5443 | 55.9 | f9 = −4.778 |
| | 18* | 2.693 | 0.250 | | | |
| | 19 | ∞ | 0.210 | 1.5168 | 64.2 | |
| | 20 | ∞ | 0.637 | | | |
| (IM) | | ∞ | | | | | f123=7.061 mm
f456=42.073 mm
f789=−14.413 mm
f23=−11.989 mm
f89=−8.848 mm
T7=0.255 mm
T8=0.705 mm
D67=0.270 mm
D89=0.585 mm
TL=6.989 mm
Hmax=4.7 mm
Dep=2.969 mm

TABLE 6

Aspherical surface data

| i | k | A4 | A6 | A8 | A10 | A12 | A14 | A16 |
|---|---|---|---|---|---|---|---|---|
| 1 | −2.314E−01 | 1.734E−03 | 1.107E−03 | −2.207E−03 | 2.233E−03 | −1.285E−03 | 3.962E−04 | −5.287E−05 |
| 2 | 0.000E+00 | −4.014E−02 | 5.756E−02 | −5.923E−02 | 4.377E−02 | −2.069E−02 | 5.444E−03 | −6.046E−04 |
| 3 | −8.896E+00 | −4.060E−02 | 2.627E−02 | −1.464E−02 | 8.716E−03 | −4.475E−03 | 1.357E−03 | −1.583E−04 |
| 4 | −8.968E+00 | 1.965E−02 | −3.661E−02 | 3.775E−02 | −3.132E−02 | 1.673E−02 | −4.895E−03 | 6.422E−04 |
| 5 | 0.000E+00 | 1.815E−02 | −7.427E−02 | −3.723E−03 | 2.930E−03 | 5.495E−03 | −3.959E−03 | 6.654E−04 |
| 6 | 0.000E+00 | 1.175E−02 | −3.274E−03 | 4.353E−03 | −6.775E−03 | 1.210E−02 | −4.757E−03 | 3.163E−04 |
| 7 | 0.000E+00 | −5.019E−02 | 3.050E−02 | −5.065E−02 | 3.736E−02 | −1.655E−02 | 6.524E−03 | −1.455E−03 |
| 8 | 0.000E+00 | −1.849E−02 | −2.175E−02 | −1.689E−02 | 1.274E−02 | 2.154E−04 | −1.460E−03 | 9.461E−05 |
| 9 | 0.000E+00 | 4.206E−02 | −7.631E−02 | 2.362E−02 | −1.327E−02 | 3.673E−03 | −5.538E−04 | −4.085E−05 |
| 10 | 0.000E+00 | 2.095E−02 | −4.816E−02 | 8.479E−03 | 1.117E−03 | 2.000E−04 | −5.802E−04 | 1.587E−04 |
| 11 | 0.000E+00 | −3.297E−02 | 4.470E−03 | −1.375E−02 | 1.746E−04 | 1.360E−03 | 3.856E−04 | −1.395E−04 |
| 12 | 0.000E+00 | −9.233E−02 | 4.256E−02 | −1.177E−02 | −5.878E−04 | 1.414E−03 | −3.500E−04 | 2.853E−05 |
| 13 | 9.966E−02 | −5.585E−02 | 3.385E−02 | −9.825E−03 | 2.769E−03 | −5.119E−04 | 4.908E−05 | −2.245E−06 |
| 14 | −2.828E+00 | −1.637E−02 | 2.509E−03 | −2.270E−03 | 1.792E−03 | −3.559E−04 | 1.895E−05 | 3.049E−07 |
| 15 | 0.000E+00 | −8.773E−03 | −1.242E−02 | 3.731E−03 | −7.358E−04 | 5.821E−05 | 5.047E−06 | −7.753E−07 |
| 16 | 0.000E+00 | 8.733E−03 | −4.311E−03 | 2.440E−04 | 7.847E−05 | −1.499E−05 | 9.943E−07 | −2.398E−08 |
| 17 | 0.000E+00 | −6.431E−02 | 1.744E−02 | −1.969E−03 | 8.485E−05 | 1.575E−06 | −2.449E−07 | 5.554E−09 |
| 18 | −9.489E+00 | −3.812E−02 | 9.942E−03 | −1.856E−03 | 2.171E−04 | −1.523E−05 | 5.898E−07 | −9.629E−09 |

The values of the respective conditional expressions are as follows:

f1/f=0.83
f2/f1=−3.04
f2/f=−2.51
f23/f=−2.04
f2/f3=0.23
f3/f=−10.96
R7f/R7r=1.13
R8f/R8r=0.38
T8/T7=2.77
D67/D89=0.46
D89/f=0.10
f89/f=−1.51
R9r/f=0.46
f9/f=−0.81
TL/f=1.19
TL/Hmax=1.49
f/Dep=1.98
f7/f=4.71
f8/f=2.36

Accordingly, the imaging lens of Numerical Data Example 3 satisfies the above-described conditional expressions.

Figure 8:
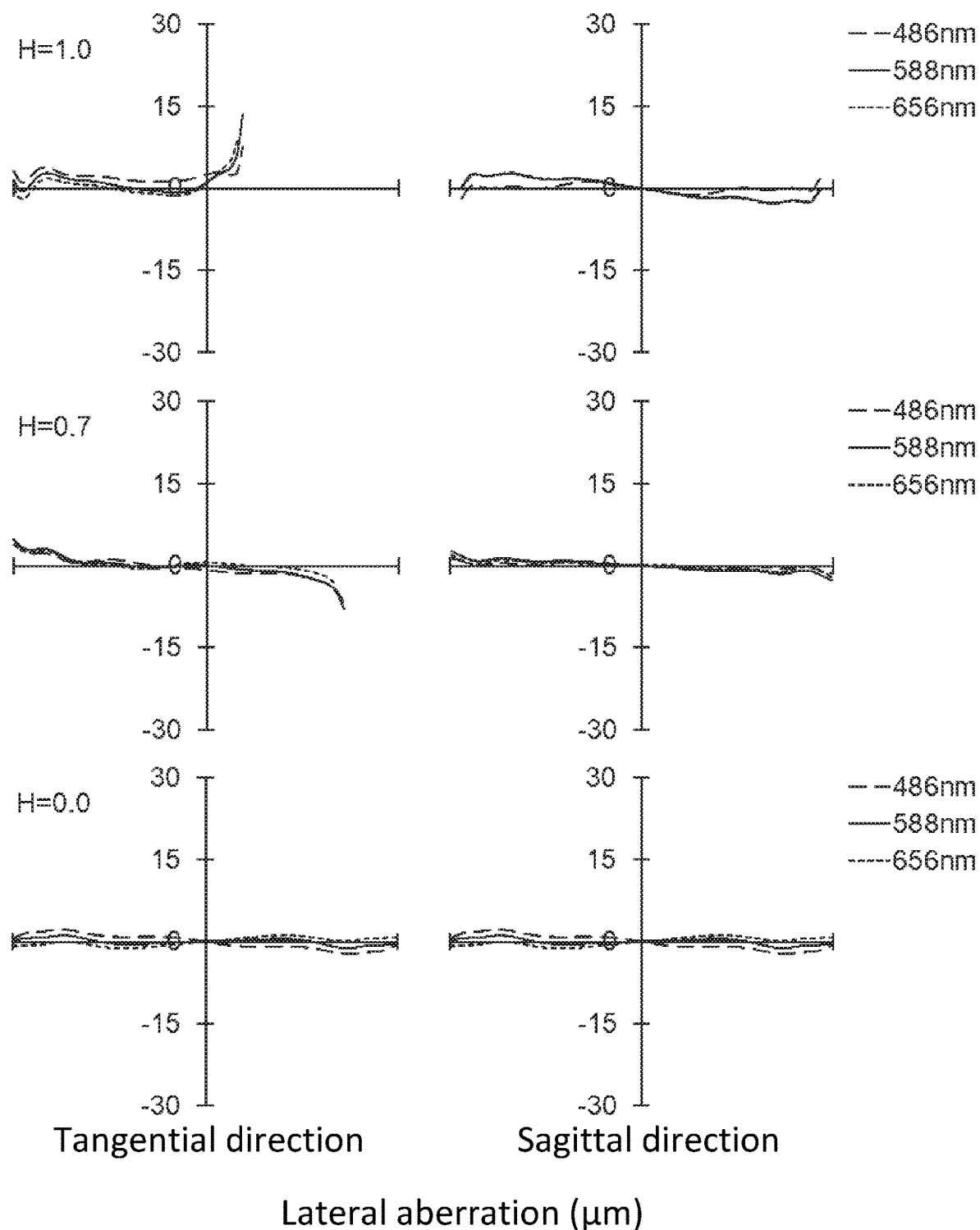
FIG. 8 is an aberration diagram showing a lateral aberration of the imaging lens of FIG. 7.
Figure 9:
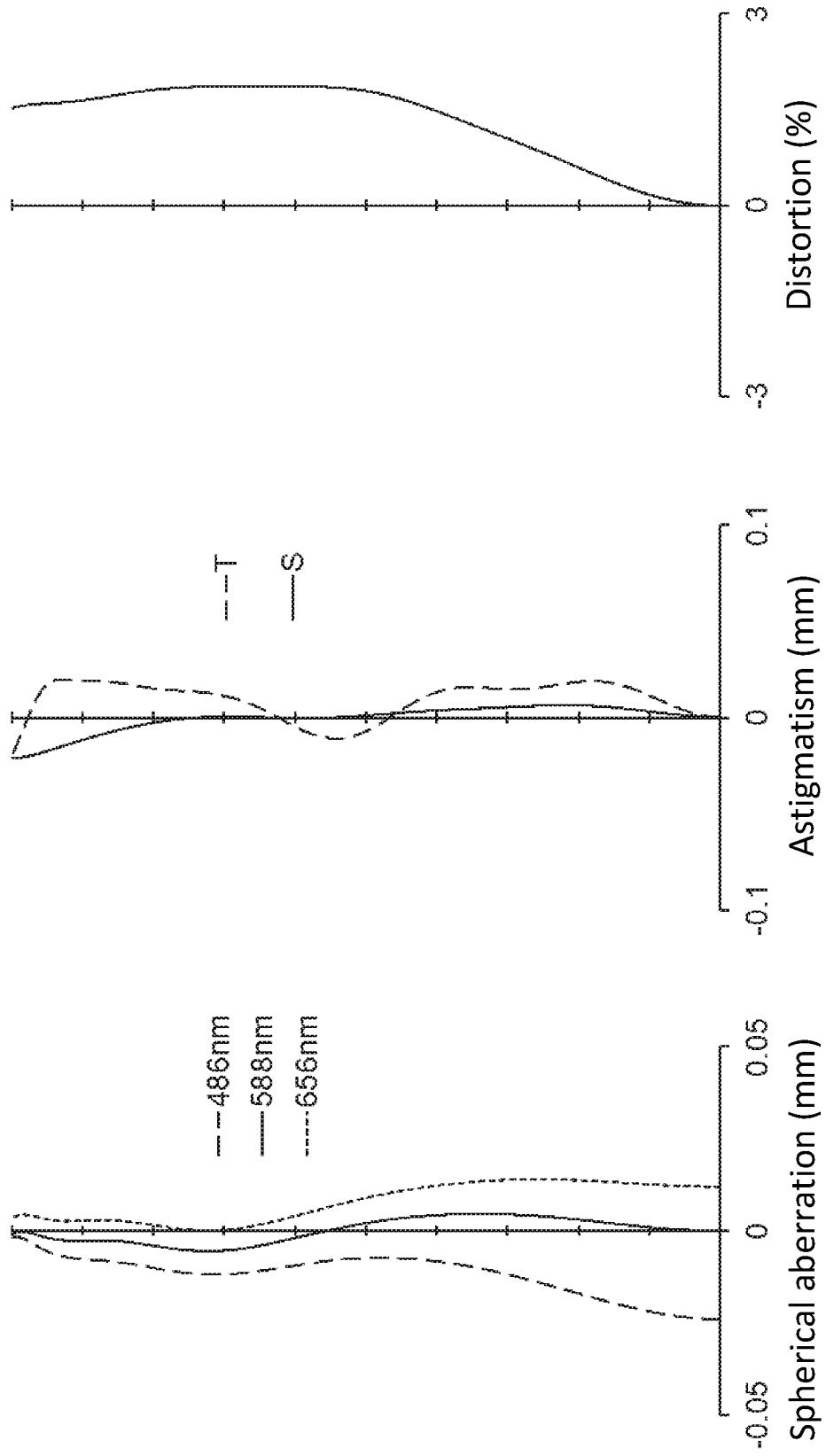
FIG. 9 is an aberration diagram showing a spherical aberration, astigmatism, and a distortion of the imaging lens of FIG. 7.
Figure 10:
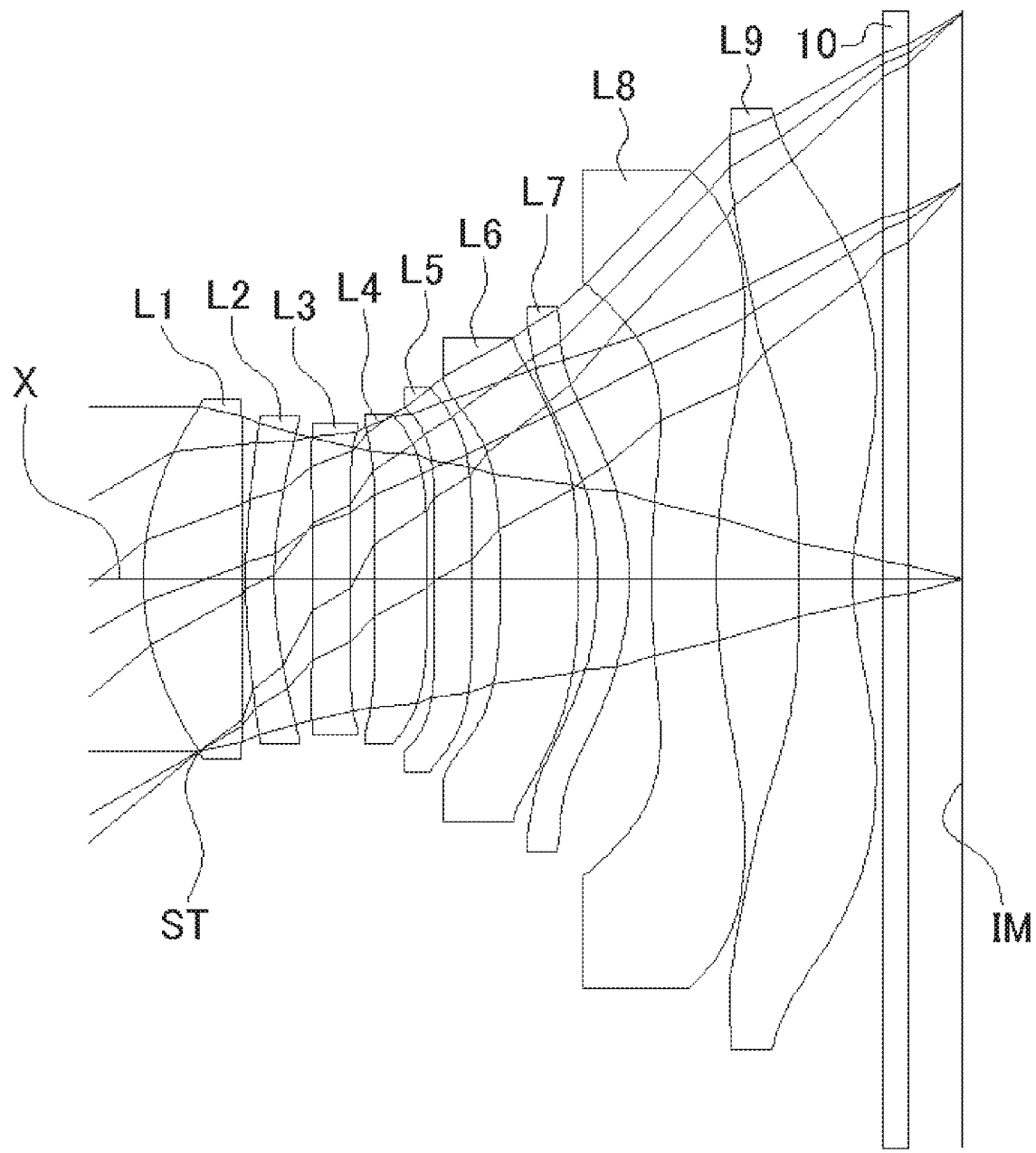
FIG. 10 shows a sectional view of a schematic configuration of an imaging lens in Numerical Data Example 4 of the present invention.

FIG. 8 shows a lateral aberration that corresponds to an image height H and FIG. 9 shows a spherical aberration (mm), astigmatism (mm), and a distortion (%), respectively. As shown in FIGS. 8 and 9, according to the imaging lens of Numerical Data Example 3, the aberrations can be also satisfactorily corrected.

Numerical Data Example 4

Basic Lens Data

TABLE 7 f = 5.75 mm Fno = 2.0 ω = 39.3°

| | i | r | d | nd | vd | [mm] |
|---|---|---|---|---|---|---|
| L1 | 1*(ST) | ∞ | ∞ | | | |
| | | 2.345 | 0.828 | 1.5443 | 55.9 | f1 = 4.750 |
| | 2* | 22.067 | 0.033 | | | |
| L2 | 3* | 5.012 | 0.243 | 1.6707 | 19.2 | f2 = −15.750 |
| | 4* | 3.333 | 0.327 | | | |
| L3 | 5* | −23.963 | 0.314 | 1.6707 | 19.2 | f3 = −50.669 |
| | 6* | −81.689 | 0.204 | | | |
| L4 | 7* | 25.476 | 0.445 | 1.5443 | 55.9 | f4 = 24.672 |
| | 8* | −28.223 | 0.059 | | | |
| L5 | 9* | −156.156 | 0.318 | 1.5443 | 55.9 | f5 = 82.360 |
| | 10* | −34.855 | 0.241 | | | |
| L6 | 11* | −10.808 | 0.655 | 1.5443 | 55.9 | f6 = −100.094 |
| | 12* | −13.771 | 0.166 | | | |
| L7 | 13* | −3.250 | 0.266 | 1.6707 | 19.2 | f7 = 12.896 |
| | 14* | −2.440 | 0.187 | | | |
| L8 | 15* | 7.710 | 0.549 | 1.5443 | 55.9 | f8 = −100.320 |
| | 16* | 6.586 | 0.689 | | | |
| L9 | 17* | 52.942 | 0.462 | 1.5443 | 55.9 | f9 = −4.794 |
| | 18* | 2.479 | 0.250 | | | |
| | 19 | ∞ | 0.210 | 1.5168 | 64.2 | |
| | 20 | ∞ | 0.462 | | | |
| (IM) | | ∞ | | | | | f123=6.843 mm
f456=23.891 mm
f789=−8.542 mm
f23=−12.026 mm
f89=−4.643 mm
T7=0.266 mm
T8=0.549 mm
D67=0.166 mm
D89=0.689 mm
TL=6.836 mm
Hmax=4.7 mm
Dep=2.903 mm

TABLE 8

Aspherical surface data

| i | k | A4 | A6 | A8 | A10 | A12 | A14 | A16 |
|---|---|---|---|---|---|---|---|---|
| 1 | −2.838E−01 | 1.283E−03 | 5.884E−04 | −2.405E−03 | 2.152E−03 | −1.315E−03 | 3.870E−04 | −5.540E−05 |
| 2 | 0.000E+00 | −4.213E−02 | 5.698E−02 | −5.942E−02 | 4.369E−02 | −2.071E−02 | 5.445E−03 | −6.032E−04 |
| 3 | −6.917E+00 | −3.939E−02 | 2.678E−02 | −1.436E−02 | 8.812E−03 | −4.467E−03 | 1.351E−03 | −1.512E−04 |
| 4 | −9.354E+00 | 1.990E−02 | −3.649E−02 | 3.764E−02 | −3.134E−02 | 1.678E−02 | −4.859E−03 | 6.295E−04 |
| 5 | 0.000E+00 | 1.656E−02 | −7.680E−03 | −3.707E−03 | 2.869E−03 | 5.435E−03 | −3.992E−03 | 6.593E−04 |
| 6 | 0.000E+00 | 1.359E−02 | −2.215E−03 | 4.719E−03 | −6.638E−03 | 1.213E−02 | −4.794E−03 | 2.621E−04 |
| 7 | 0.000E+00 | −4.597E−02 | 3.066E−02 | −5.076E−02 | 3.734E−02 | −1.655E−02 | 6.497E−03 | −1.492E−03 |
| 8 | 0.000E+00 | −2.187E−02 | −2.208E−02 | −1.721E−02 | 1.256E−02 | 1.546E−04 | −1.470E−03 | 9.673E−05 |
| 9 | 0.000E+00 | 3.834E−02 | −7.834E−02 | 2.357E−02 | −1.238E−03 | 3.675E−04 | −5.793E−04 | −6.211E−05 |
| 10 | 0.000E+00 | 1.849E−02 | −4.768E−02 | 8.352E−03 | 1.024E−03 | 1.664E−04 | −5.894E−04 | 1.562E−04 |
| 11 | 0.000E+00 | −3.604E−02 | 4.063E−03 | −1.369E−02 | 1.967E−04 | 1.365E−03 | 3.866E−04 | −1.393E−04 |
| 12 | 0.000E+00 | −8.850E−02 | 4.272E−02 | −1.185E−02 | −6.052E−04 | 1.413E−03 | −3.496E−04 | 2.876E−05 |
| 13 | 1.618E−01 | −5.698E−02 | 3.379E−02 | −9.800E−03 | 2.774E−03 | −5.119E−04 | 4.890E−05 | −2.280E−06 |
| 14 | −3.419E+00 | −1.471E−02 | 2.609E−03 | −2.289E−03 | 1.788E−03 | −3.565E−04 | 1.896E−05 | 3.153E−07 |
| 15 | 0.000E+00 | 2.321E−03 | −1.315E−02 | 3.640E−03 | −7.456E−04 | 5.809E−05 | 5.223E−06 | −7.367E−07 |
| 16 | 0.000E+00 | 5.579E−03 | −4.187E−03 | 2.420E−04 | 7.809E−05 | −1.497E−05 | 9.969E−07 | −2.387E−08 |
| 17 | 0.000E+00 | −6.550E−02 | 1.742E−02 | −1.968E−03 | 8.482E−05 | 1.574E−06 | −2.448E−07 | 5.601E−09 |
| 18 | −8.167E+00 | −3.928E−02 | 9.918E−03 | −1.857E−03 | 2.171E−04 | −1.523E−05 | 5.900E−07 | −9.628E−09 |

The values of the respective conditional expressions are as follows:

f1/f=0.83
f2/f1=−3.32
f2/f=−2.74
f23/f=−2.09
f2/f3=0.31
f3/f=−8.81
R7f/R7r=1.33
R8f/R8r=1.17
T8/T7=2.07
D67/D89=0.24
D89/f=0.12
f89/f=−0.81
R9r/f=0.43
f9/f=−0.83
TL/f=1.19
TL/Hmax=1.45
f/Dep=1.98
f7/f=2.24

Accordingly, the imaging lens of Numerical Data Example 4 satisfies the above-described conditional expressions.

Figure 11:
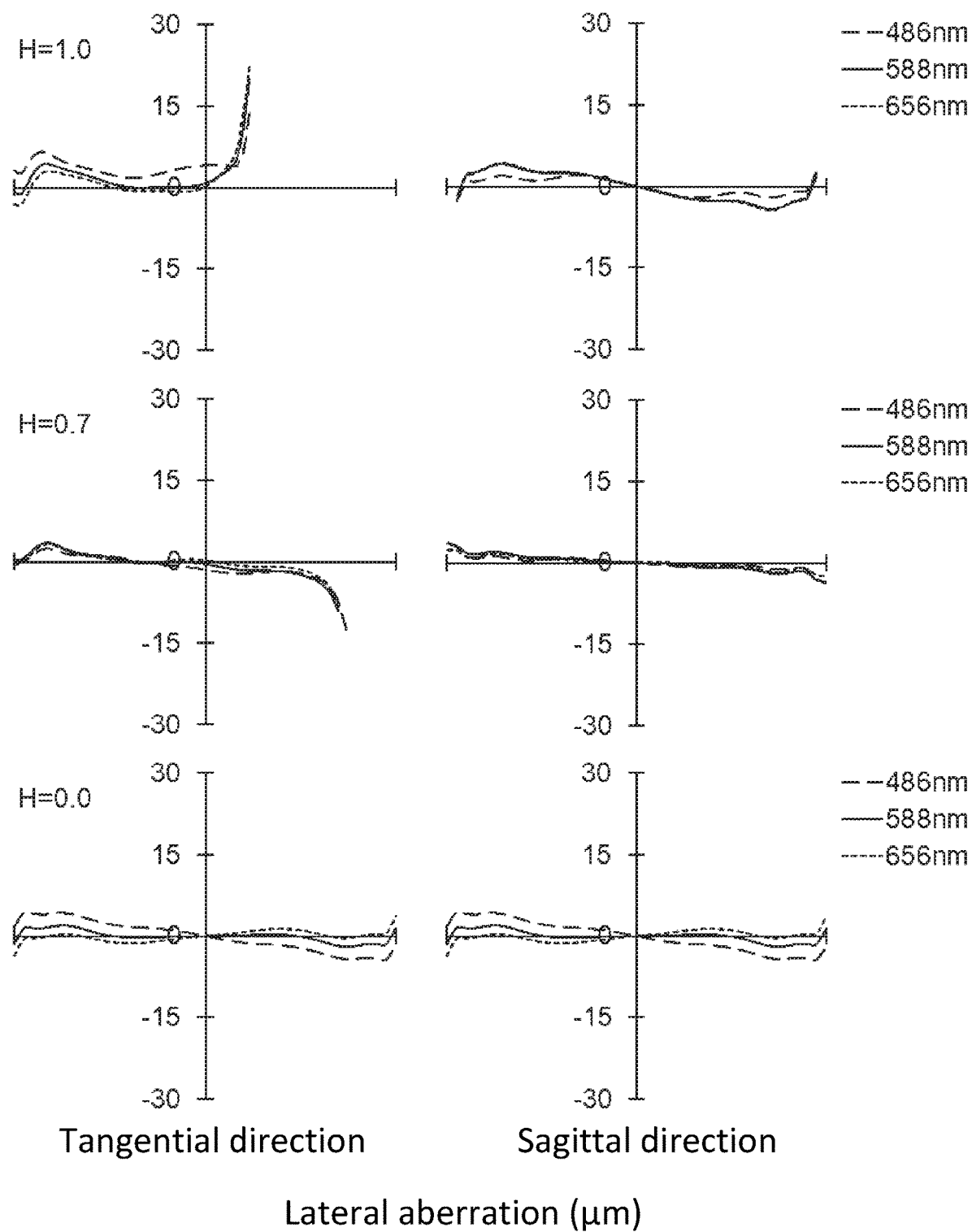
FIG. 11 is an aberration diagram showing a lateral aberration of the imaging lens of FIG. 10.
Figure 12:
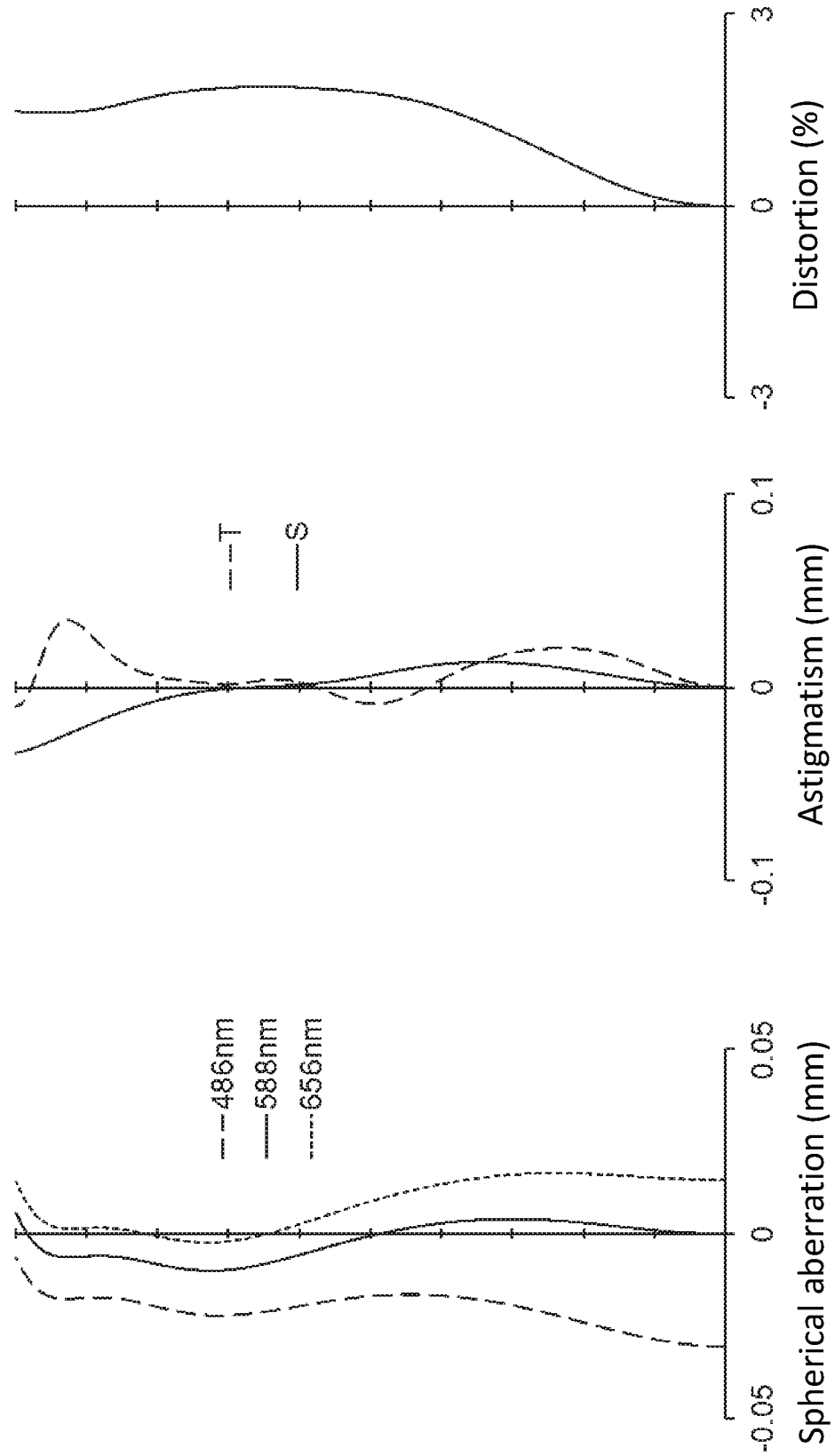
FIG. 12 is an aberration diagram showing a spherical aberration, astigmatism, and a distortion of the imaging lens of FIG. 10.
Figure 13:
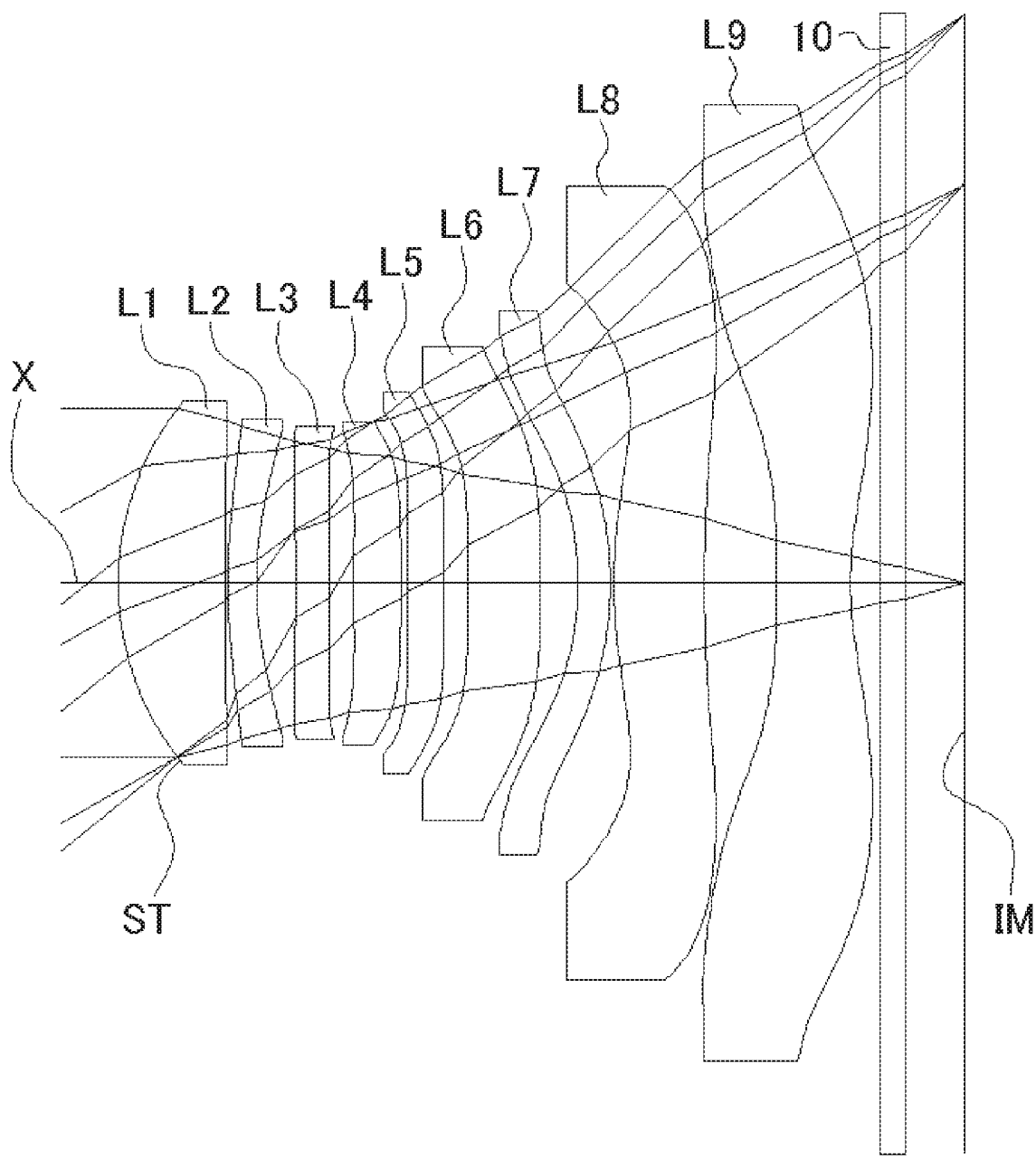
FIG. 13 shows a sectional view of a schematic configuration of an imaging lens in Numerical Data Example 5 of the present invention.

FIG. 11 shows a lateral aberration that corresponds to an image height H and FIG. 12 shows a spherical aberration (mm), astigmatism (mm), and a distortion (%), respectively. As shown in FIGS. 11 and 12, according to the imaging lens of Numerical Data Example 4, the aberrations can be also satisfactorily corrected.

Numerical Data Example 5

Basic Lens Data

TABLE 9 f = 5.80 mm Fno = 2.0 ω = 39.0°

| | i | r | d | nd | vd | [mm] |
|---|---|---|---|---|---|---|
| L1 | 1*(ST) | ∞ | ∞ | | | |
| | 2* | 2.376 | 0.894 | 1.5443 | 55.9 | f1 = 4.837 |
| L2 | 3* | 21.072 | 0.026 | | | |
| | 4* | 4.648 | 0.240 | 1.6707 | 19.2 | f2 = −13.516 |
| | | 3.009 | 0.331 | | | |

TABLE 9-continued f = 5.80 mm Fno = 2.0 ω = 39.0°

| | i | r | d | nd | vd | [mm] |
|---|---|---|---|---|---|---|
| L3 | 5* | −20.724 | 0.285 | 1.6707 | 19.2 | f3 = −100.931 |
| | 6* | −30.033 | 0.204 | | | |
| L4 | 7* | 23.284 | 0.396 | 1.5443 | 55.9 | f4 = 26.953 |
| | 8* | −39.420 | 0.052 | | | |
| L5 | 9* | 186.291 | 0.305 | 1.5443 | 55.9 | f5 = 100.328 |
| | 10* | −77.210 | 0.208 | | | |
| L6 | 11* | −29.267 | 0.609 | 1.5443 | 55.9 | f6 = −100.331 |
| | 12* | −63.526 | 0.313 | | | |
| L7 | 13* | −2.869 | 0.272 | 1.6707 | 19.2 | f7 = −100.476 |
| | 14* | −3.110 | 0.030 | | | |
| L8 | 15* | 4.211 | 0.762 | 1.5443 | 55.9 | f8 = 10.027 |
| | 16* | 17.250 | 0.605 | | | |
| L9 | 17* | −29.143 | 0.621 | 1.5443 | 55.9 | f9 = −4.794 |
| | 18* | 2.887 | 0.250 | | | |
| | 19 | ∞ | 0.210 | 1.5168 | 64.2 | |
| | 20 | ∞ | 0.501 | | | |
| (IM) | | ∞ | | | | | f123=7.071 mm
f456=26.977 mm
f789=−10.931 mm
f23=−11.954 mm
f67=−50.829 mm
f89=−13.260 mm
T7=0.272 mm
T8=0.762 mm
D67=0.313 mm
D89=0.605 mm
TL=7.043 mm
Hmax=4.7 mm
Dep=2.932 mm

TABLE 10

Aspherical surface data

| i | k | A4 | A6 | A8 | A10 | A12 | A14 | A16 |
|---|---|---|---|---|---|---|---|---|
| 1 | −2.139E−01 | 1.896E−03 | 1.345E−03 | −2.231E−03 | 2.217E−03 | −1.290E−03 | 3.957E−04 | −5.205E−05 |
| 2 | 0.000E+00 | −3.838E−02 | 5.770E−02 | −5.943E−02 | 4.365E−02 | −2.067E−02 | 5.478E−03 | −6.131E−04 |
| 3 | −9.577E+00 | −4.008E−02 | 2.670E−02 | −1.465E−02 | 8.830E−03 | −4.478E−03 | 1.299E−03 | −1.385E−04 |
| 4 | −8.286E+00 | 2.022E−02 | −3.621E−02 | 3.826E−02 | −3.147E−02 | 1.652E−02 | −4.867E−03 | 6.550E−04 |
| 5 | 0.000E+00 | 1.971E−02 | −8.833E−03 | −3.708E−03 | 2.848E−03 | 5.628E−03 | −3.985E−03 | 6.434E−04 |
| 6 | 0.000E+00 | 1.015E−02 | −4.151E−03 | 4.021E−03 | −6.698E−03 | 1.217E−02 | −4.743E−03 | 2.927E−04 |
| 7 | 0.000E+00 | −5.000E−02 | 2.974E−02 | −5.079E−02 | 3.738E−02 | −1.662E−02 | 6.468E−03 | −1.440E−03 |
| 8 | 0.000E+00 | −1.886E−02 | −2.164E−02 | −1.675E−02 | 1.258E−02 | 1.292E−04 | −1.462E−03 | 1.198E−04 |
| 9 | 0.000E+00 | 3.862E−02 | −7.587E−02 | 2.352E−02 | −1.397E−02 | 3.078E−02 | −5.621E−04 | −1.958E−05 |
| 10 | 0.000E+00 | 1.881E−02 | −4.837E−02 | 8.386E−03 | 1.072E−03 | 2.336E−04 | −5.757E−04 | 1.583E−04 |
| 11 | 0.000E+00 | −3.641E−02 | 4.784E−03 | −1.351E−02 | 2.128E−04 | 1.341E−03 | 3.787E−04 | −1.376E−04 |
| 12 | 0.000E+00 | −9.316E−02 | 4.231E−02 | −1.185E−02 | −5.963E−04 | 1.415E−03 | −3.492E−04 | 2.898E−05 |
| 13 | 4.494E−02 | −5.364E−02 | 3.344E−02 | −9.758E−03 | 2.784E−03 | −5.116E−04 | 4.862E−05 | −2.274E−06 |
| 14 | −1.667E+00 | −1.719E−02 | 2.771E−03 | −2.257E−03 | 1.792E−03 | −3.560E−04 | 1.894E−05 | 3.067E−07 |
| 15 | 0.000E+00 | −1.390E−02 | −1.132E−02 | 3.617E−03 | −7.342E−04 | 5.954E−05 | 4.973E−06 | −7.760E−07 |
| 16 | 0.000E+00 | 1.010E−02 | −4.360E−03 | 2.456E−04 | 7.851E−05 | −1.493E−05 | 9.982E−07 | −2.467E−08 |
| 17 | 0.000E+00 | −6.385E−02 | 1.750E−02 | −1.970E−03 | 8.474E−05 | 1.576E−06 | −2.445E−07 | 5.531E−09 |
| 18 | −9.090E+00 | −3.632E−02 | 9.946E−03 | −1.861E−03 | 2.168E−04 | −1.524E−05 | 5.901E−07 | −9.552E−09 |

The values of the respective conditional expressions are as follows:

f1/f=0.83
f2/f1=−2.79
f2/f=−2.33
f23/f=−2.06
f2/f3=0.13
f3/f=−17.39
R7f/R7r=0.92
R8f/R8r=0.24
T8/T7=2.80
D67/D89=0.52
D89/f=0.10
f89/f=−2.28
R9r/f=0.50
f9/f=−0.83
TL/f=1.21
TL/Hmax=1.50
f/Dep=1.98
f67/f=−8.76
f8/f=1.73

Accordingly, the imaging lens of Numerical Data Example 5 satisfies the above-described conditional expressions.

Figure 14:
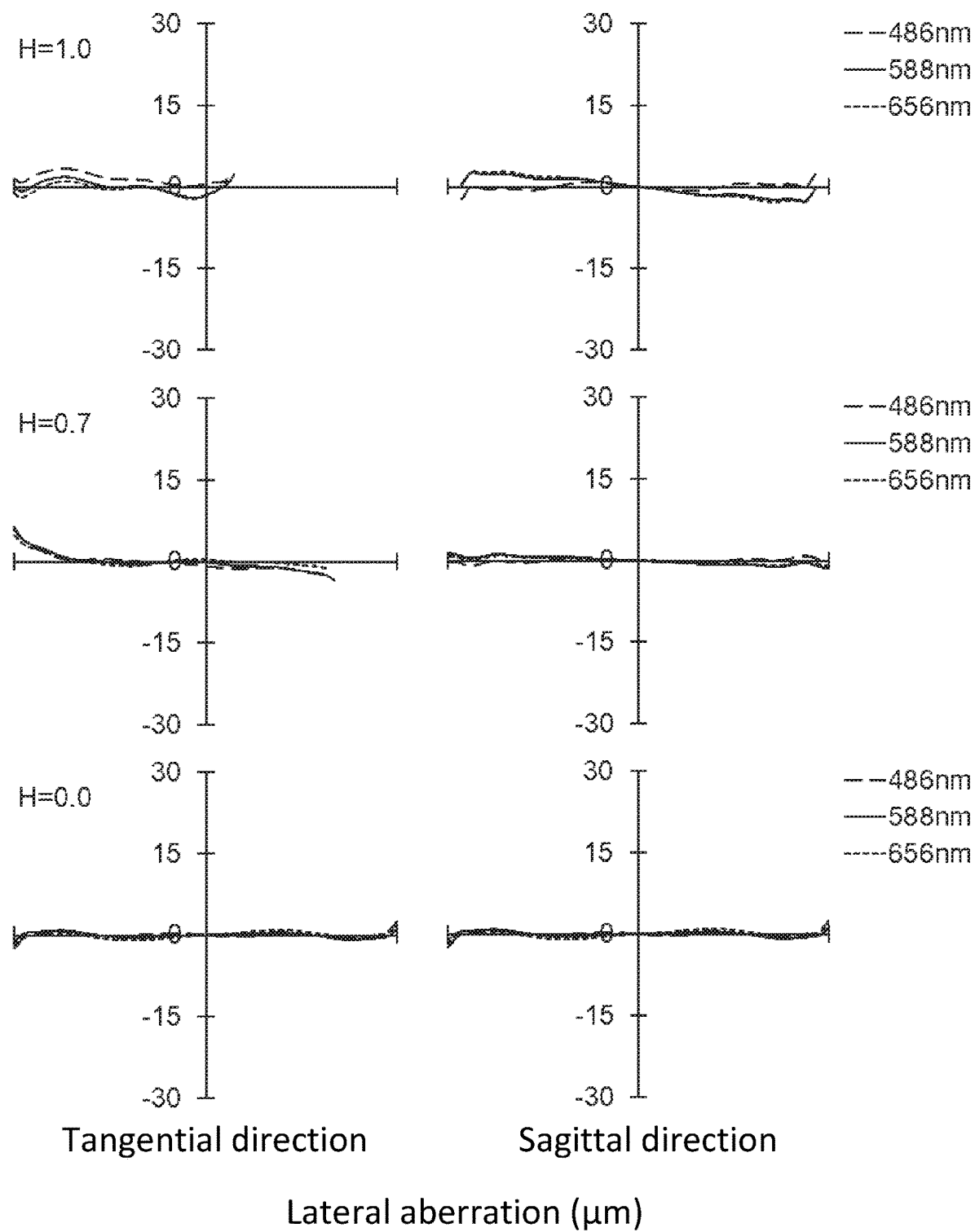
FIG. 14 is an aberration diagram showing a lateral aberration of the imaging lens of FIG. 13.
Figure 15:
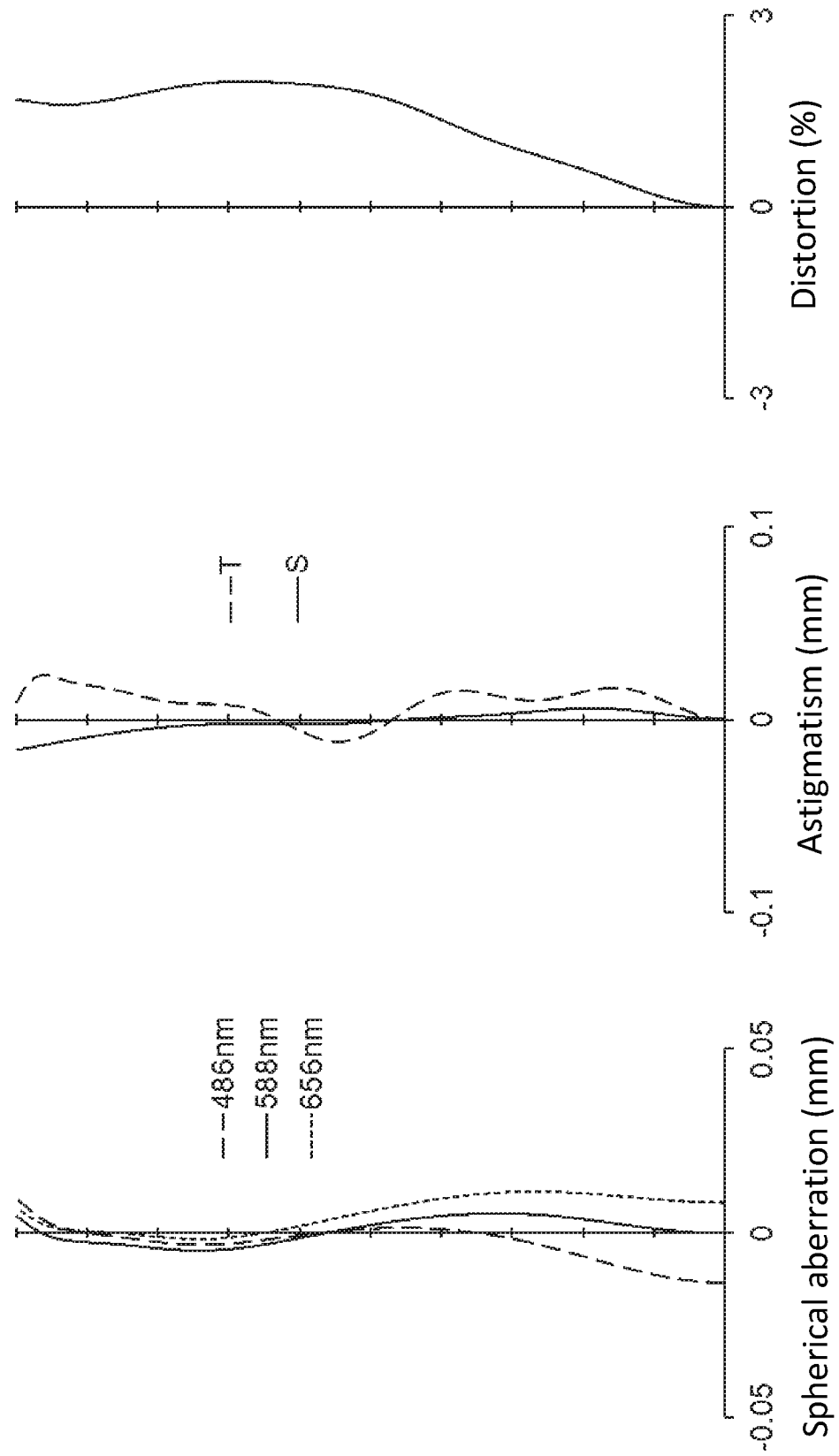
FIG. 15 is an aberration diagram showing a spherical aberration, astigmatism, and a distortion of the imaging lens of FIG. 13.
Figure 16:
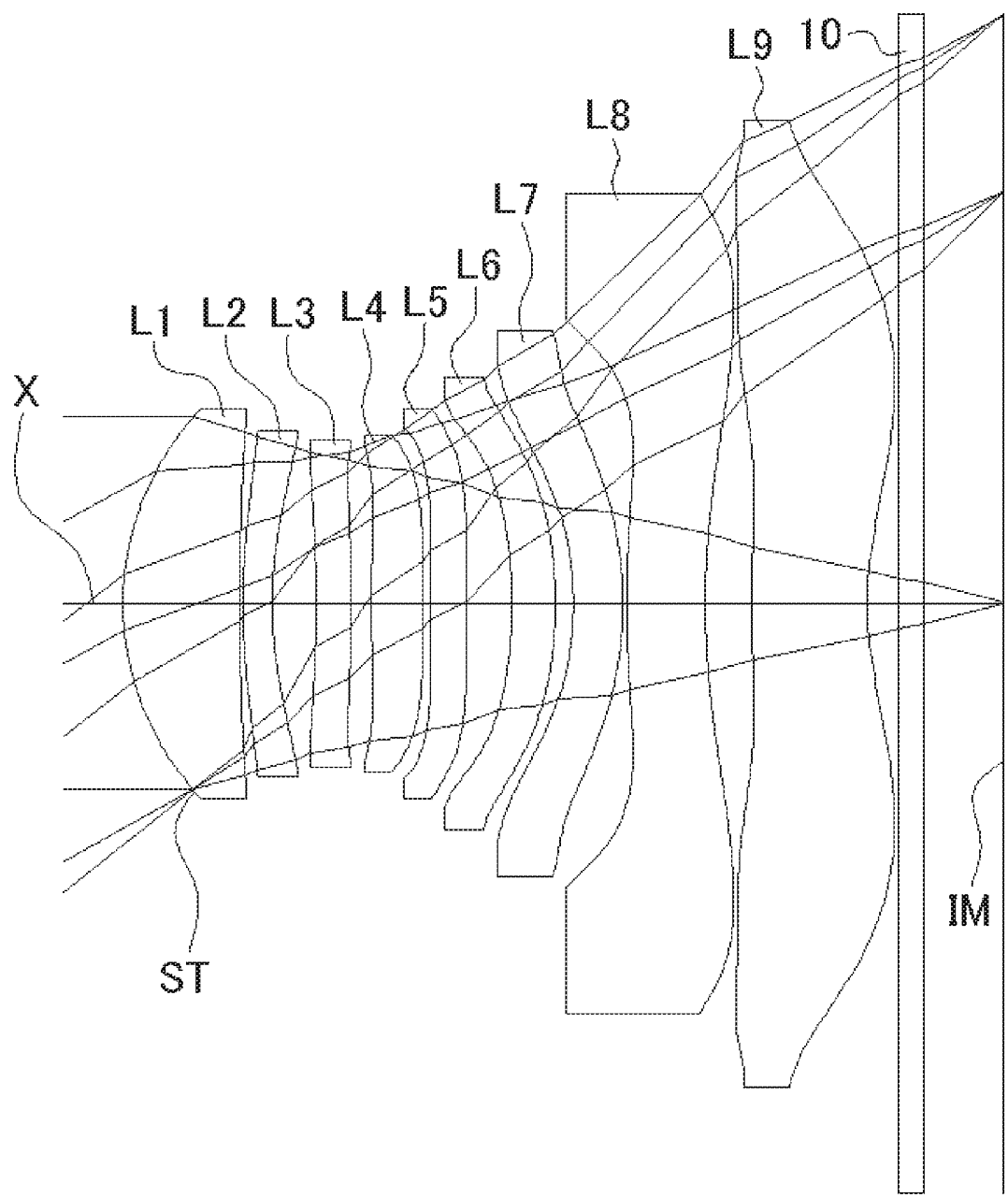
FIG. 16 shows a sectional view of a schematic configuration of an imaging lens in Numerical Data Example 6 of the present invention.

FIG. 14 shows a lateral aberration that corresponds to an image height H and FIG. 15 shows a spherical aberration (mm), astigmatism (mm), and a distortion (%), respectively. As shown in FIGS. 14 and 15, according to the imaging lens of Numerical Data Example 5, the aberrations can be also satisfactorily corrected.

Numerical Data Example 6

Basic Lens Data

TABLE 11 f = 6.01 mm Fno = 2.0 ω = 38.1°

| | i | r | d | nd | vd | [mm] |
|---|---|---|---|---|---|---|
| L1 | 1*(ST) | ∞ | ∞ | | | |
| | | 2.284 | 0.946 | 1.5443 | 55.9 | f1 = 4.901 |
| | 2* | 13.555 | 0.026 | | | |
| L2 | 3* | 4.707 | 0.240 | 1.6707 | 19.2 | f2 = −16.698 |
| | 4* | 3.246 | 0.359 | | | |

TABLE 11-continued f = 6.01 mm Fno = 2.0 ω = 38.1°

| | i | r | d | nd | vd | [mm] |
|---|---|---|---|---|---|---|
| L3 | 5* | −8.974 | 0.283 | 1.6707 | 19.2 | f3 = −53.501 |
| | 6* | −12.118 | 0.162 | | | |
| L4 | 7* | 10.055 | 0.421 | 1.5443 | 55.9 | f4 = 14.219 |
| | 8* | −33.109 | 0.061 | | | |
| L5 | 9* | −60.783 | 0.296 | 1.6142 | 25.6 | f5 = 53.354 |
| | 10* | −21.331 | 0.364 | | | |
| L6 | 11* | −4.202 | 0.350 | 1.5443 | 55.9 | f6 = −100.260 |
| | 12* | −4.687 | 0.150 | | | |
| L7 | 13* | −2.877 | 0.402 | 1.6707 | 19.2 | f7 = −100.361 |
| | 14* | −3.174 | 0.030 | | | |
| L8 | 15* | 8.049 | 0.639 | 1.5443 | 55.9 | f8 = −100.381 |
| | 16* | 6.819 | 0.374 | | | |
| L9 | 17* | 6.956 | 0.941 | 1.5443 | 55.9 | f9 = −8.055 |
| | 18* | 2.561 | 0.250 | | | |
| | 19 | ∞ | 0.210 | 1.5168 | 64.2 | |
| | 20 | ∞ | 0.645 | | | |
| (IM) | | ∞ | | | | | f123=6.952 mm
f456=13.044 mm
f789=−6.559 mm
f23=−12.814 mm
f67=−50.662 mm
f89=−7.554 mm
T7=0.402 mm
T8=0.639 mm
D67=0.150 mm
D89=0.374 mm
TL=7.080 mm
Hmax=4.7 mm
Dep=3.034 mm

TABLE 12

Aspherical surface data

| i | k | A4 | A6 | A8 | A10 | A12 | A14 | A16 |
|---|---|---|---|---|---|---|---|---|
| 1 | −2.021E−01 | 1.950E−03 | 1.461E−03 | −2.186E−03 | 2.225E−03 | −1.289E−03 | 3.945E−04 | −5.076E−05 |
| 2 | 0.000E+00 | −4.006E−02 | 5.789E−02 | −5.920E−02 | 4.371E−02 | −2.068E−02 | 5.451E−03 | −6.093E−04 |
| 3 | −7.661E+00 | −3.992E−02 | 2.634E−02 | −1.461E−02 | 8.802E−03 | −4.525E−03 | 1.322E−03 | −1.558E−04 |
| 4 | −1.008E+01 | 2.090E−02 | −3.575E−02 | 3.730E−02 | −3.169E−02 | 1.669E−02 | −4.873E−03 | 6.239E−04 |
| 5 | 0.000E+00 | 2.000E−02 | −8.235E−03 | −3.809E−03 | 2.936E−03 | 5.535E−03 | −3.912E−03 | 6.466E−04 |
| 6 | 0.000E+00 | 1.091E−02 | −3.288E−03 | 4.265E−03 | −6.964E−03 | 1.199E−02 | −4.794E−03 | 4.250E−04 |
| 7 | 0.000E+00 | −5.107E−02 | 3.087E−02 | −5.122E−02 | 3.654E−02 | −1.691E−02 | 6.491E−03 | −1.386E−03 |
| 8 | 0.000E+00 | −2.000E−02 | −2.154E−02 | −1.653E−02 | 1.246E−02 | 3.139E−05 | −1.503E−03 | 1.267E−04 |
| 9 | 0.000E+00 | 3.827E−02 | −7.645E−02 | 2.349E−02 | −1.071E−02 | 4.438E−04 | −5.938E−04 | −7.794E−05 |
| 10 | 0.000E+00 | 2.521E−02 | −4.740E−02 | 8.717E−03 | 1.173E−03 | 1.887E−04 | −6.015E−04 | 1.452E−04 |
| 11 | 0.000E+00 | −2.381E−02 | 6.263E−03 | −1.329E−02 | 2.170E−04 | 1.317E−03 | 3.720E−04 | −1.352E−04 |
| 12 | 0.000E+00 | −8.458E−02 | 4.313E−02 | −1.179E−02 | −5.871E−04 | 1.423E−03 | −3.455E−04 | 3.046E−05 |
| 13 | 5.131E−02 | −5.643E−02 | 3.375E−02 | −9.586E−03 | 2.820E−03 | −5.097E−04 | 4.710E−05 | −3.060E−06 |
| 14 | −2.071E+00 | −1.245E−02 | 2.716E−03 | −2.379E−03 | 1.774E−03 | −3.579E−04 | 1.896E−05 | 3.985E−07 |
| 15 | 0.000E+00 | −4.426E−03 | −1.284E−02 | 3.735E−03 | −7.670E−04 | 5.601E−05 | 5.478E−06 | −6.553E−07 |
| 16 | 0.000E+00 | 2.069E−03 | −3.306E−03 | 2.390E−04 | 7.305E−05 | −1.516E−05 | 1.008E−06 | −2.231E−08 |
| 17 | 0.000E+00 | −6.769E−02 | 1.739E−02 | −1.967E−03 | 8.486E−05 | 1.575E−06 | −2.449E−07 | 5.613E−09 |
| 18 | −5.543E+00 | −4.031E−02 | 9.921E−03 | −1.855E−03 | 2.171E−04 | −1.523E−05 | 5.900E−07 | −9.610E−09 |

The values of the respective conditional expressions are as follows:

f1/f=0.82
f2/f1=−3.41
f2/f=−2.78
f23/f=−2.13
f2/f3=0.31
f3/f=−8.91
R7f/R7r=0.91
R8f/R8r=1.18
T8/T7=1.59
D67/D89=0.40
D89/f=0.06
f89/f=−1.26
R9r/f=0.43
f9/f=−1.34
TL/f=1.18
TL/Hmax=1.50
f/Dep=1.98
f67/f=−8.43

Accordingly, the imaging lens of Numerical Data Example 6 satisfies the above-described conditional expressions.

Figure 17:
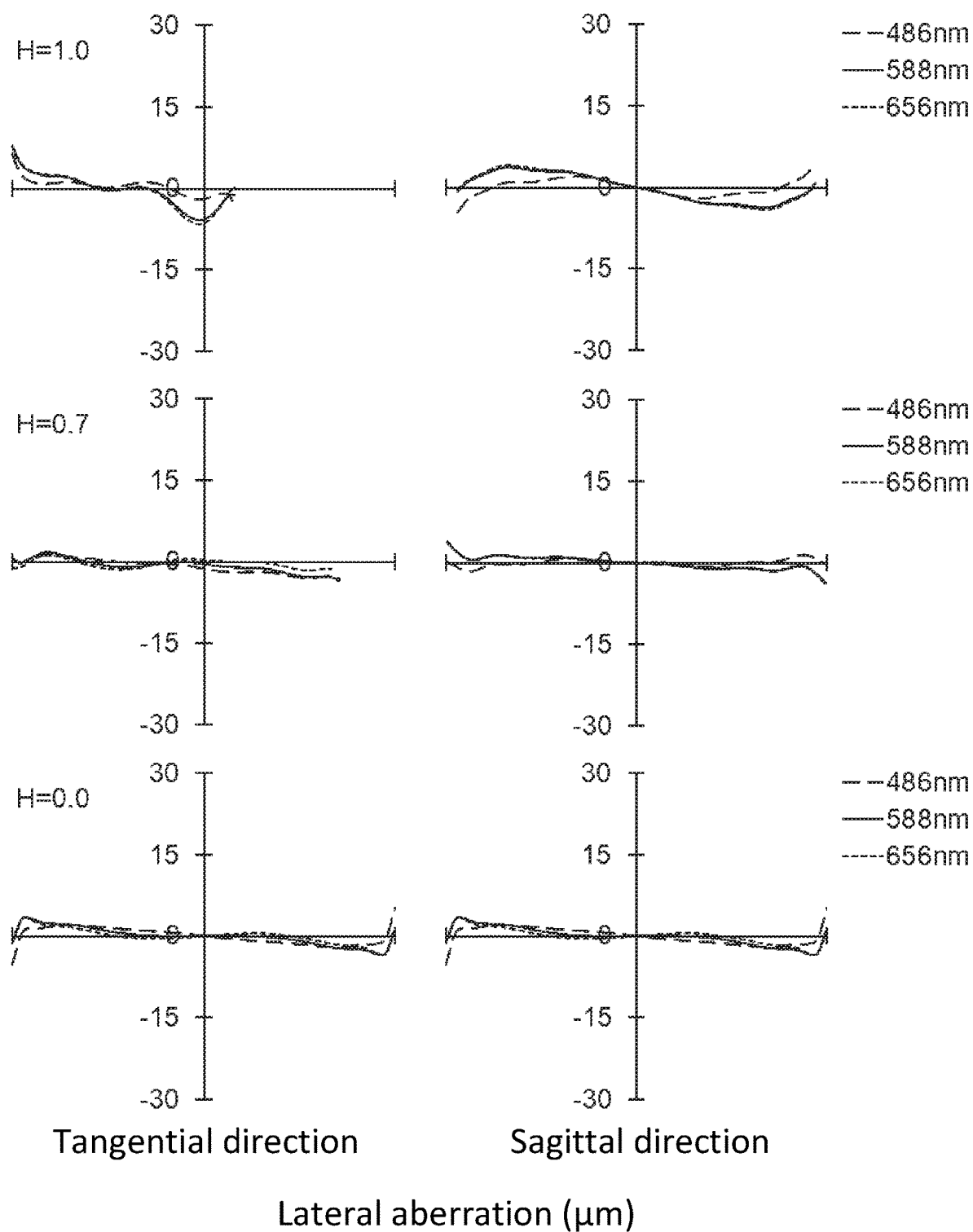
FIG. 17 is an aberration diagram showing a lateral aberration of the imaging lens of FIG. 16.
Figure 18:
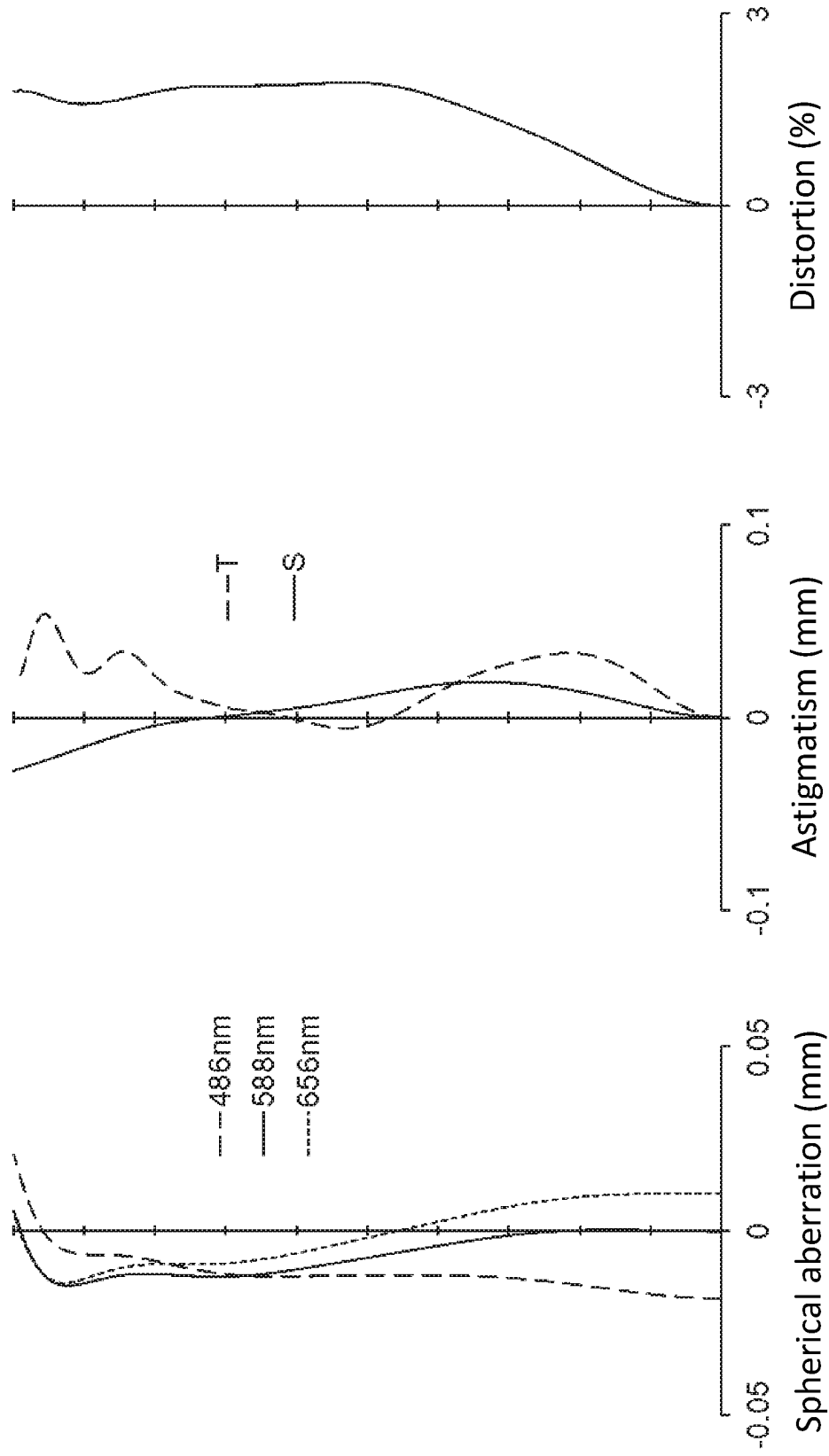
FIG. 18 is an aberration diagram showing a spherical aberration, astigmatism, and a distortion of the imaging lens of FIG. 16.
Figure 19:
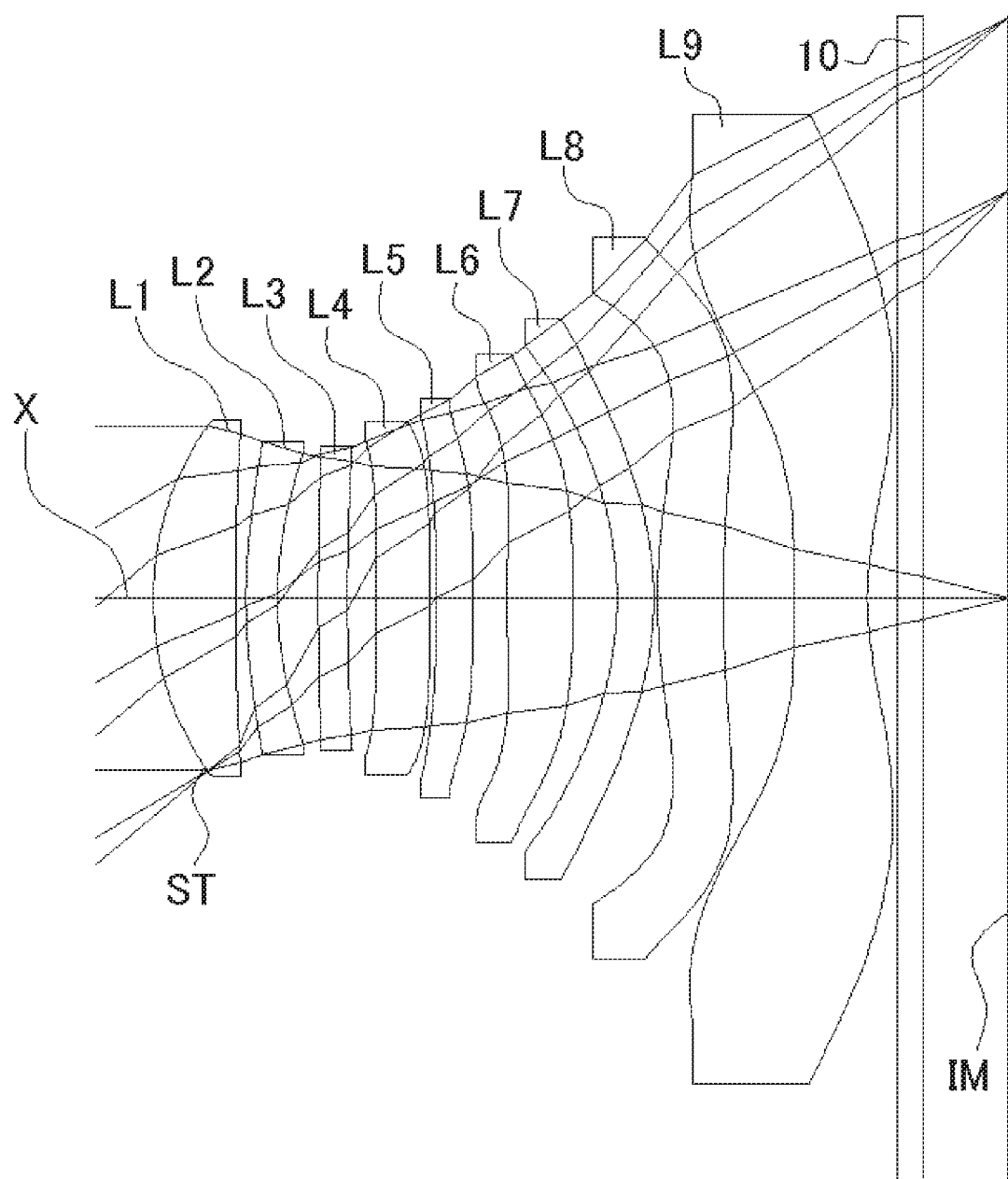
FIG. 19 shows a sectional view of a schematic configuration of an imaging lens in Numerical Data Example 7 of the present invention.

FIG. 17 shows a lateral aberration that corresponds to an image height H and FIG. 18 shows a spherical aberration (mm), astigmatism (mm), and a distortion (%), respectively. As shown in FIGS. 17 and 18, according to the imaging lens of Numerical Data Example 6, the aberrations can be also satisfactorily corrected.

Numerical Data Example 7

Basic Lens Data

TABLE 13 f = 5.62 mm Fno = 2.0 ω = 39.9°

| | i | r | d | nd | vd | [mm] |
|---|---|---|---|---|---|---|
| L1 | 1*(ST) | ∞ 2.522 | ∞ 0.673 | 1.5443 | 55.9 | f1 = 5.250 |
| | 2* | 19.459 | 0.087 | | | |
| L2 | 3* | 4.268 | 0.258 | 1.6707 | 19.2 | f2 = −14.441 |
| | 4* | 2.891 | 0.335 | | | |

TABLE 13-continued f = 5.62 mm Fno = 2.0 ω = 39.9°

| | i | r | d | nd | vd | [mm] |
|---|---|---|---|---|---|---|
| L3 | 5* | 23.760 | 0.239 | 1.6707 | 19.2 | f3 = −105.777 |
| | 6* | 17.727 | 0.232 | | | |
| L4 | 7* | 43.426 | 0.447 | 1.5443 | 55.9 | f4 = 36.947 |
| | 8* | −37.320 | 0.052 | | | |
| L5 | 9* | −19.832 | 0.298 | 1.5443 | 55.9 | f5 = −41.723 |
| | 10* | −157.351 | 0.281 | | | |
| L6 | 11* | 12.522 | 0.542 | 1.5443 | 55.9 | f6 = 12.859 |
| | 12* | −15.626 | 0.359 | | | |
| L7 | 13* | −3.098 | 0.304 | 1.6707 | 19.2 | f7 = 28.123 |
| | 14* | −2.766 | 0.029 | | | |
| L8 | 15* | 4.911 | 0.538 | 1.5443 | 55.9 | f8 = 17.392 |
| | 16* | 9.810 | 0.583 | | | |
| L9 | 17* | −80.620 | 0.600 | 1.5443 | 55.9 | f9 = −4.504 |
| | 18* | 2.535 | 0.250 | | | |
| | 19 | ∞ | 0.210 | 1.5168 | 64.2 | |
| | 20 | ∞ | 0.696 | | | |
| (IM) | | ∞ | | | | | f123=7.755 mm
f456=12.427 mm
f789=−9.754 mm
f23=−12.648 mm
f89=−6.958 mm
T7=0.304 mm
T8=0.538 mm
D67=0.359 mm
D89=0.583 mm
TL=6.942 mm
Hmax=4.7 mm
Dep=2.836 mm

TABLE 14

Aspherical surface data

| i | k | A4 | A6 | A8 | A10 | A12 | A14 | A16 |
|---|---|---|---|---|---|---|---|---|
| 1 | 2.667E−01 | 9.264E−06 | −1.923E−04 | 6.247E−04 | −5.346E−04 | 2.242E−04 | −8.682E−06 | −1.263E−05 |
| 2 | 0.000E+00 | −1.775E−02 | 2.262E−02 | −1.415E−02 | 4.962E−03 | −7.481E−04 | −4.293E−05 | 1.552E−05 |
| 3 | −1.910E+01 | −2.233E−02 | 2.358E−02 | −1.368E−02 | 4.926E−03 | −9.059E−04 | 1.790E−04 | −2.916E−05 |
| 4 | −1.167E+01 | 2.017E−02 | −1.440E−02 | 1.179E−02 | −5.609E−03 | 1.880E−03 | −4.125E−04 | 2.287E−04 |
| 5 | 0.000E+00 | −4.592E−03 | −1.464E−03 | 9.476E−05 | 4.595E−05 | 2.649E−05 | 1.024E−04 | 2.457E−05 |
| 6 | 0.000E+00 | −3.933E−03 | −3.531E−04 | 5.162E−04 | 2.531E−04 | 8.080E−05 | 1.135E−05 | −5.714E−06 |
| 7 | 0.000E+00 | −2.029E−02 | −9.821E−03 | −1.560E−07 | −5.334E−04 | 2.655E−04 | 1.363E−04 | 4.184E−06 |
| 8 | 0.000E+00 | −5.746E−03 | −1.210E−02 | −1.551E−03 | 1.947E−04 | 1.879E−04 | 8.057E−05 | −7.215E−05 |
| 9 | 0.000E+00 | −1.547E−02 | −2.387E−03 | 1.665E−03 | 1.115E−04 | 5.112E−05 | 1.175E−07 | −2.914E−05 |
| 10 | 0.000E+00 | −4.704E−03 | 2.004E−04 | 1.582E−03 | 4.968E−04 | 5.461E−05 | −3.719E−05 | 5.990E−06 |
| 11 | 0.000E+00 | −3.937E−02 | −2.606E−05 | −2.581E−03 | −7.517E−06 | 3.183E−04 | 4.157E−05 | −1.706E−05 |
| 12 | 0.000E+00 | −5.071E−02 | 1.065E−02 | −2.090E−03 | −1.280E−03 | 1.128E−03 | −2.688E−04 | 2.116E−05 |
| 13 | 6.915E−01 | −1.320E−02 | 2.120E−02 | −1.220E−02 | 4.167E−03 | −6.779E−04 | 2.944E−05 | 2.267E−06 |
| 14 | −4.818E+00 | −1.640E−02 | 1.530E−02 | −8.588E−03 | 2.347E−03 | −3.049E−04 | 1.721E−05 | −3.562E−07 |
| 15 | 0.000E+00 | −1.634E−02 | −5.712E−04 | −1.181E−03 | 3.331E−04 | −5.570E−05 | 5.420E−06 | −2.145E−07 |
| 16 | 0.000E+00 | −4.474E−03 | −7.343E−04 | −5.448E−04 | 1.124E−04 | −8.026E−06 | −2.252E−08 | 2.510E−08 |
| 17 | 0.000E+00 | −6.849E−02 | 1.529E−02 | −1.782E−03 | 1.446E−04 | −8.474E−06 | 3.137E−07 | −5.282E−09 |
| 18 | −5.903E+00 | −4.457E−02 | 1.156E−02 | −2.089E−03 | 2.372E−04 | −1.594E−05 | 5.788E−07 | −8.726E−09 |

The values of the respective conditional expressions are as follows:

f1/f=0.93
f2/f1=−2.75
f2/f=−2.57
f23/f=−2.25
f2/f3=0.14
f3/f=−18.84
R7f/R7r=1.12
R8f/R8r=0.50
T8/T7=1.77
D67/D89=0.62
D89/f=0.10
f89/f=−1.24
R9r/f=0.45
f9/f=−0.80
TL/f=1.24
TL/Hmax=1.48
f/Dep=1.98
f6/f=2.29
f7/f=5.01
f8/f=3.10

Accordingly, the imaging lens of Numerical Data Example 7 satisfies the above-described conditional expressions.

Figure 20:
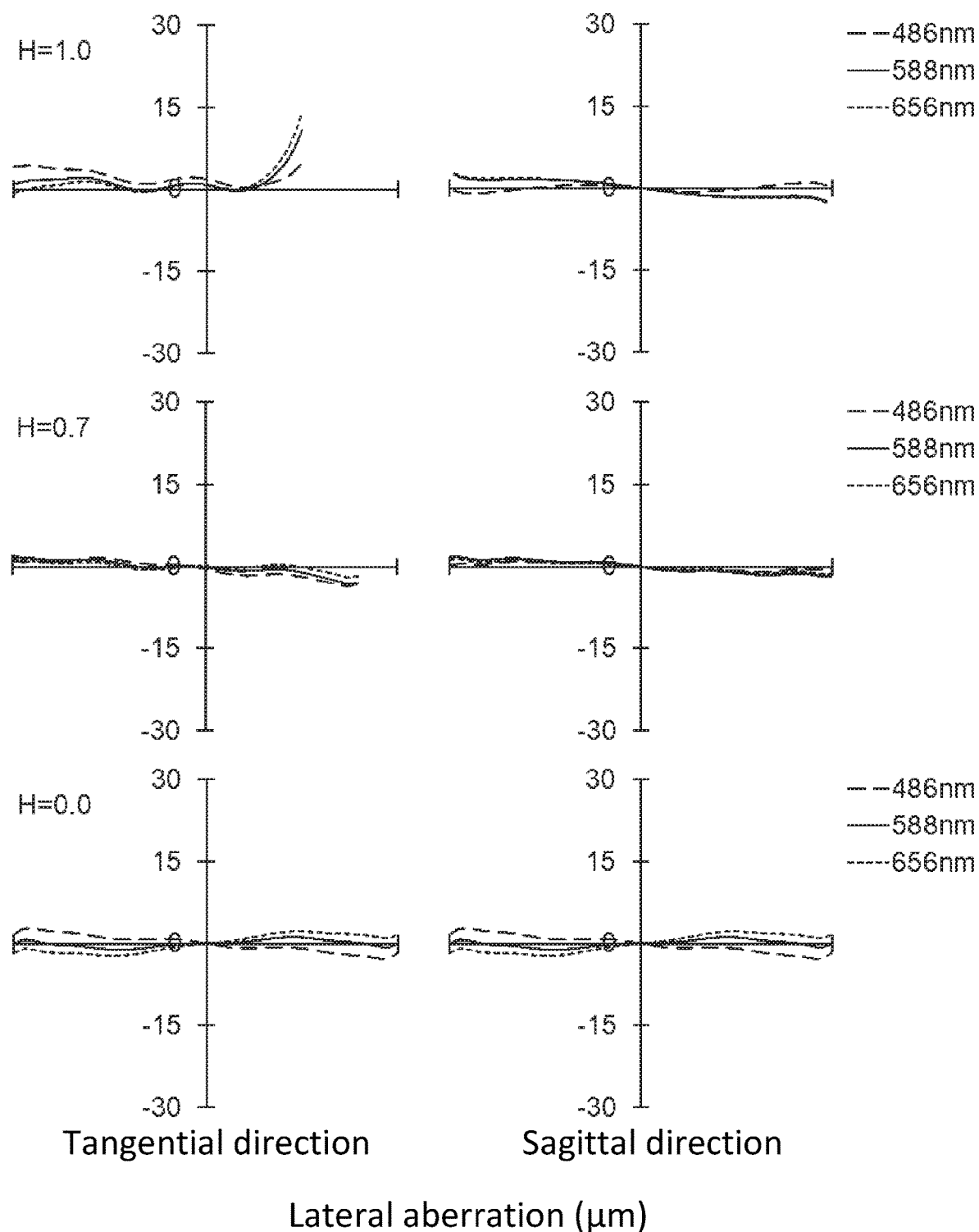
FIG. 20 is an aberration diagram showing a lateral aberration of the imaging lens of FIG. 19.
Figure 21:
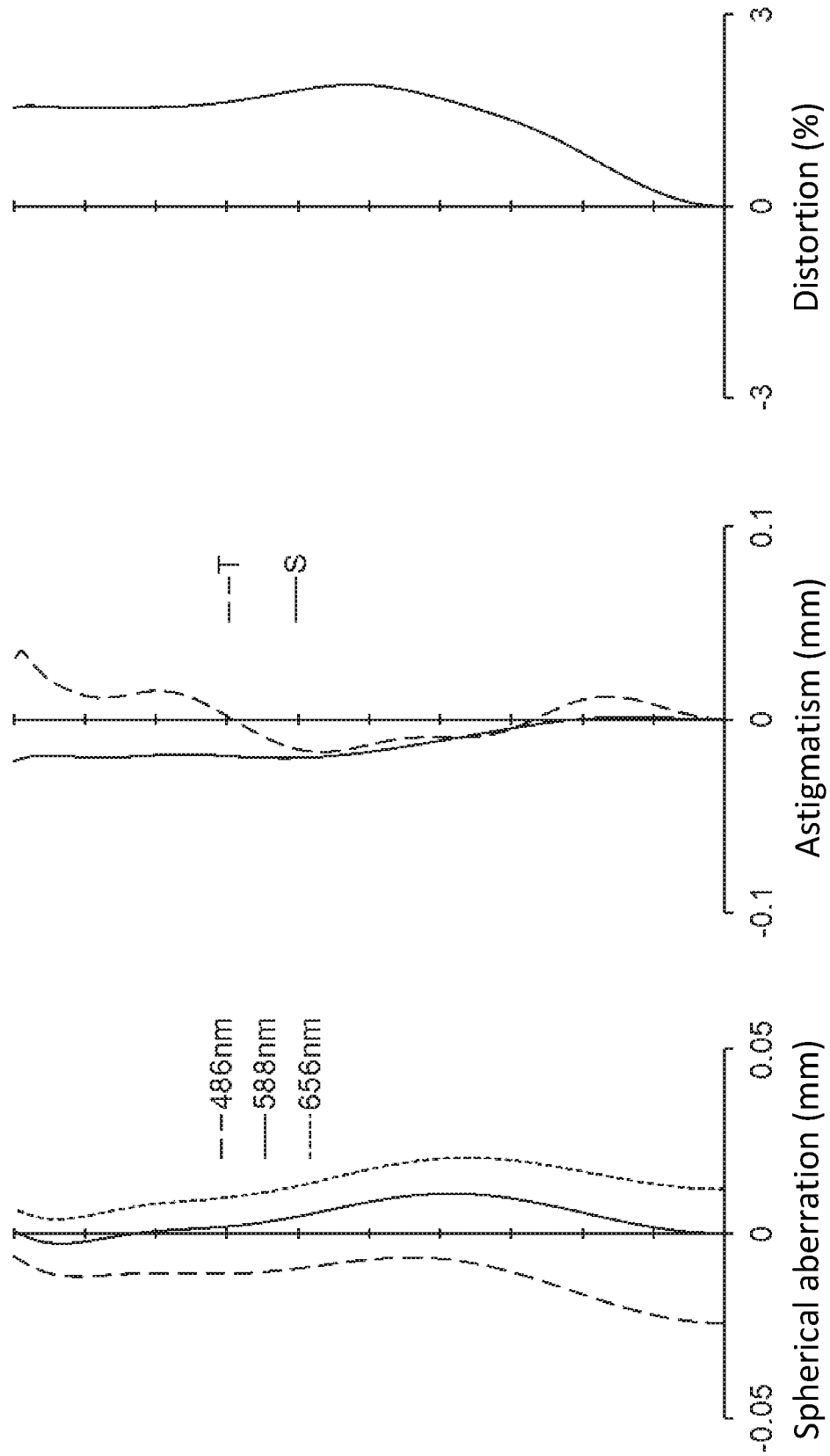
FIG. 21 is an aberration diagram showing a spherical aberration, astigmatism, and a distortion of the imaging lens of FIG. 19.
Figure 22:
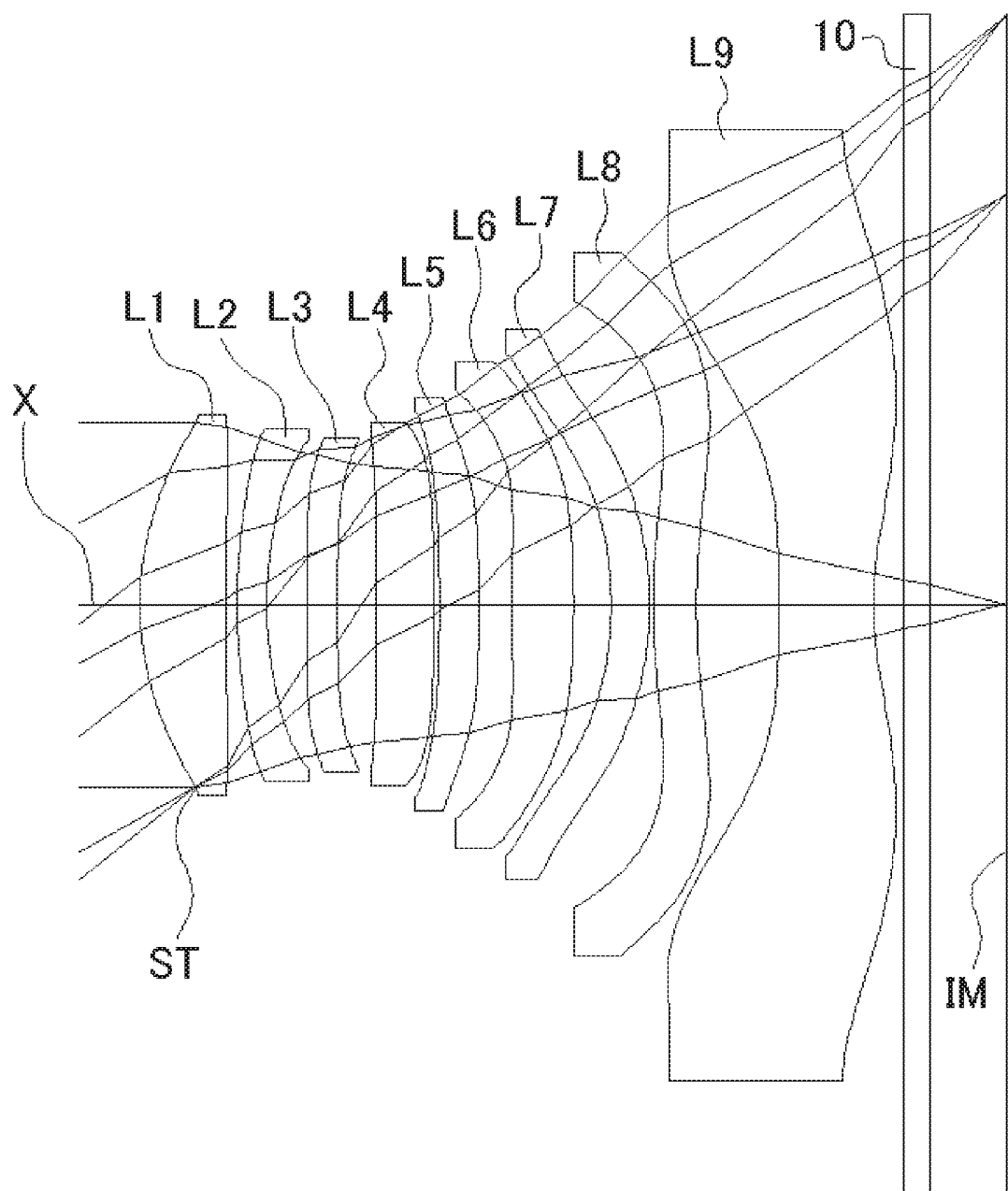
FIG. 22 shows a sectional view of a schematic configuration of an imaging lens in Numerical Data Example 8 of the present invention.

FIG. 20 shows a lateral aberration that corresponds to an image height H and FIG. 21 shows a spherical aberration (mm), astigmatism (mm), and a distortion (%), respectively. As shown in FIGS. 20 and 21, according to the imaging lens of Numerical Data Example 7, the aberrations can be also satisfactorily corrected.

Numerical Data Example 8

Basic Lens Data

TABLE 15 f = 5.89 mm Fno = 2.0 ω = 38.5°

| | i | r | d | nd | vd | [mm] |
|---|---|---|---|---|---|---|
| L1 | 1*(ST) | ∞ | ∞ | | | |
| | | 2.486 | 0.697 | 1.5443 | 55.9 | f1 = 5.138 |
| | 2* | 20.152 | 0.090 | | | |
| L2 | 3* | 4.082 | 0.243 | 1.6707 | 19.2 | f2 = −15.463 |
| | 4* | 2.859 | 0.324 | | | |
| L3 | 5* | 79.149 | 0.250 | 1.6707 | 19.2 | f3 = −98.754 |
| | 6* | 36.013 | 0.309 | | | |
| L4 | 7* | 34.000 | 0.471 | 1.5443 | 55.9 | f4 = 48.676 |
| | 8* | −119.441 | 0.047 | | | |
| L5 | 9* | −23.489 | 0.319 | 1.5443 | 55.9 | f5 = −98.295 |
| | 10* | −42.072 | 0.270 | | | |
| L6 | 11* | 12.758 | 0.501 | 1.5443 | 55.9 | f6 = 11.990 |
| | 12* | −13.176 | 0.305 | | | |
| L7 | 13* | −3.202 | 0.315 | 1.6707 | 19.2 | f7 = 22.069 |
| | 14* | −2.737 | 0.030 | | | |
| L8 | 15* | 6.229 | 0.350 | 1.5443 | 55.9 | f8 = −90.312 |
| | 16* | 5.419 | 0.663 | | | |
| L9 | 17* | 294.539 | 0.772 | 1.5443 | 55.9 | f9 = −4.845 |
| | 18* | 2.612 | 0.250 | | | |
| | 19 | ∞ | 0.210 | 1.5168 | 64.2 | |
| | 20 | ∞ | 0.622 | | | |
| (IM) | | ∞ | | | | | f123=7.323 mm
f456=10.757 mm
f789=−6.074 mm
f23=−13.343 mm
f89=−4.629 mm
T7=0.315 mm
T8=0.350 mm
D67=0.305 mm
D89=0.663 mm
TL=6.969 mm
Hmax=4.7 mm
Dep=2.972 mm

TABLE 16

Aspherical surface data

| i | k | A4 | A6 | A8 | A10 | A12 | A14 | A16 |
|---|---|---|---|---|---|---|---|---|
| 1 | 1.517E−01 | 9.800E−05 | −4.459E−03 | 1.811E−03 | −8.218E−04 | −1.503E−04 | 1.221E−04 | −3.482E−05 |
| 2 | 0.000E+00 | −2.324E−02 | 2.571E−02 | −1.678E−02 | 5.364E−03 | −5.919E−04 | −1.647E−04 | 2.823E−05 |
| 3 | −2.124E+01 | −2.734E−02 | 3.110E−02 | −1.066E−02 | 4.557E−03 | −1.297E−03 | 1.414E−04 | −2.919E−06 |
| 4 | −1.253E+01 | 1.000E−02 | −5.599E−03 | 1.773E−03 | −2.924E−03 | 7.515E−04 | −1.118E−03 | 3.424E−04 |
| 5 | 0.000E+00 | 1.942E−02 | 2.708E−02 | 7.012E−03 | 4.241E−03 | −2.792E−03 | −1.070E−03 | 4.916E−04 |
| 6 | 0.000E+00 | 3.103E−02 | 1.795E−02 | 7.714E−03 | 3.084E−03 | −2.004E−03 | −1.362E−03 | 5.002E−04 |
| 7 | 0.000E+00 | −1.691E−02 | −5.889E−03 | 2.098E−03 | −1.020E−04 | 7.933E−04 | −1.080E−03 | −7.442E−05 |
| 8 | 0.000E+00 | −1.588E−02 | −1.101E−02 | −1.157E−03 | 8.931E−04 | −1.358E−04 | −3.902E−05 | −3.046E−05 |
| 9 | 0.000E+00 | −2.072E−02 | −4.226E−03 | 2.110E−03 | 8.804E−05 | 1.663E−04 | −1.877E−05 | −5.095E−05 |
| 10 | 0.000E+00 | −5.517E−02 | −1.050E−03 | 2.105E−03 | 8.162E−04 | 1.682E−03 | −3.481E−05 | −2.726E−05 |
| 11 | 0.000E+00 | −4.976E−02 | −2.745E−03 | −4.044E−03 | 3.231E−04 | 5.257E−04 | 4.486E−05 | −4.194E−05 |
| 12 | 0.000E+00 | −5.632E−02 | 1.100E−02 | −2.063E−03 | −1.256E−03 | 1.117E−03 | −2.668E−04 | 1.954E−05 |
| 13 | 1.273E+00 | −4.936E−02 | 2.725E−02 | −1.150E−02 | 4.137E−03 | −6.790E−04 | 3.164E−05 | 2.081E−06 |
| 14 | −6.318E+00 | −3.865E−02 | 1.268E−02 | −7.562E−03 | 2.476E−03 | −3.165E−03 | 1.487E−04 | −4.455E−07 |
| 15 | 0.000E+00 | −9.864E−03 | −7.718E−03 | 5.913E−04 | 2.531E−04 | −7.652E−05 | 7.714E−06 | −2.488E−07 |
| 16 | 0.000E+00 | −2.321E−02 | 1.943E−03 | −7.057E−04 | 1.115E−04 | −7.753E−06 | −2.288E−08 | 2.538E−08 |
| 17 | 0.000E+00 | −7.594E−02 | 1.601E−02 | −1.767E−03 | 1.431E−04 | −8.638E−06 | 3.137E−07 | −4.652E−09 |
| 18 | −8.119E+00 | −4.207E−02 | 1.121E−02 | −2.070E−03 | 2.381E−04 | −1.598E−05 | 5.752E−07 | −8.570E−09 |

The values of the respective conditional expressions are as follows:
f1/f=0.87
f2/f1=−3.01
f2/f=−2.63
f23/f=−2.27
f2/f3=0.16
f3/f=−16.78
R7f/R7r=1.17
R8f/R8r=1.15
T8/17=1.11
D67/D89=0.46
D89/f=0.11
f89/f=−0.79
R9r/f=0.44
f9/f=−0.82
TL/f=1.18
TL/Hmax=1.49
f/Dep=1.98
f6/f=2.04
f7/f=3.75

Accordingly, the imaging lens of Numerical Data Example 8 satisfies the above-described conditional expressions.

Figure 23:
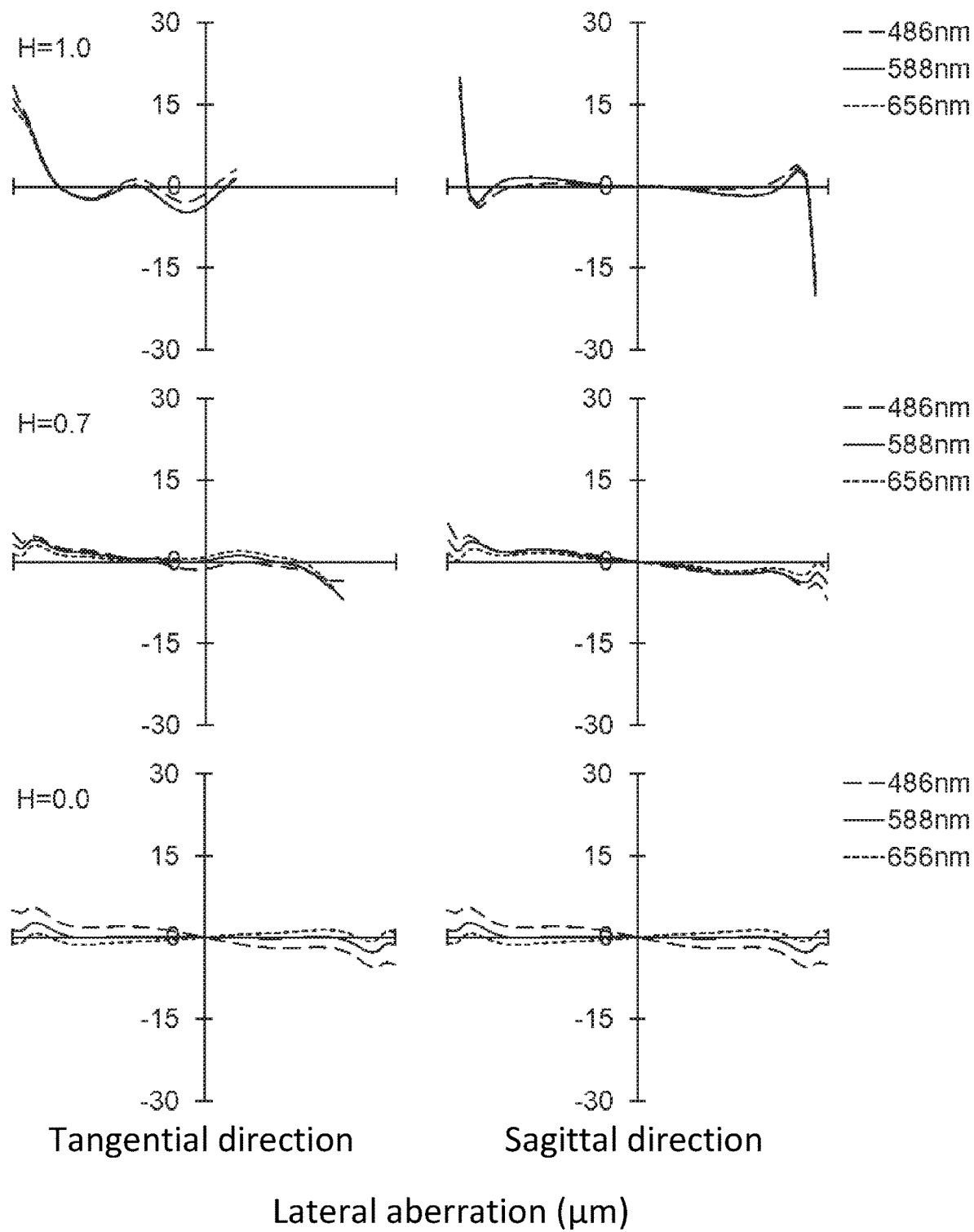
FIG. 23 is an aberration diagram showing a lateral aberration of the imaging lens of FIG. 22.
Figure 24:
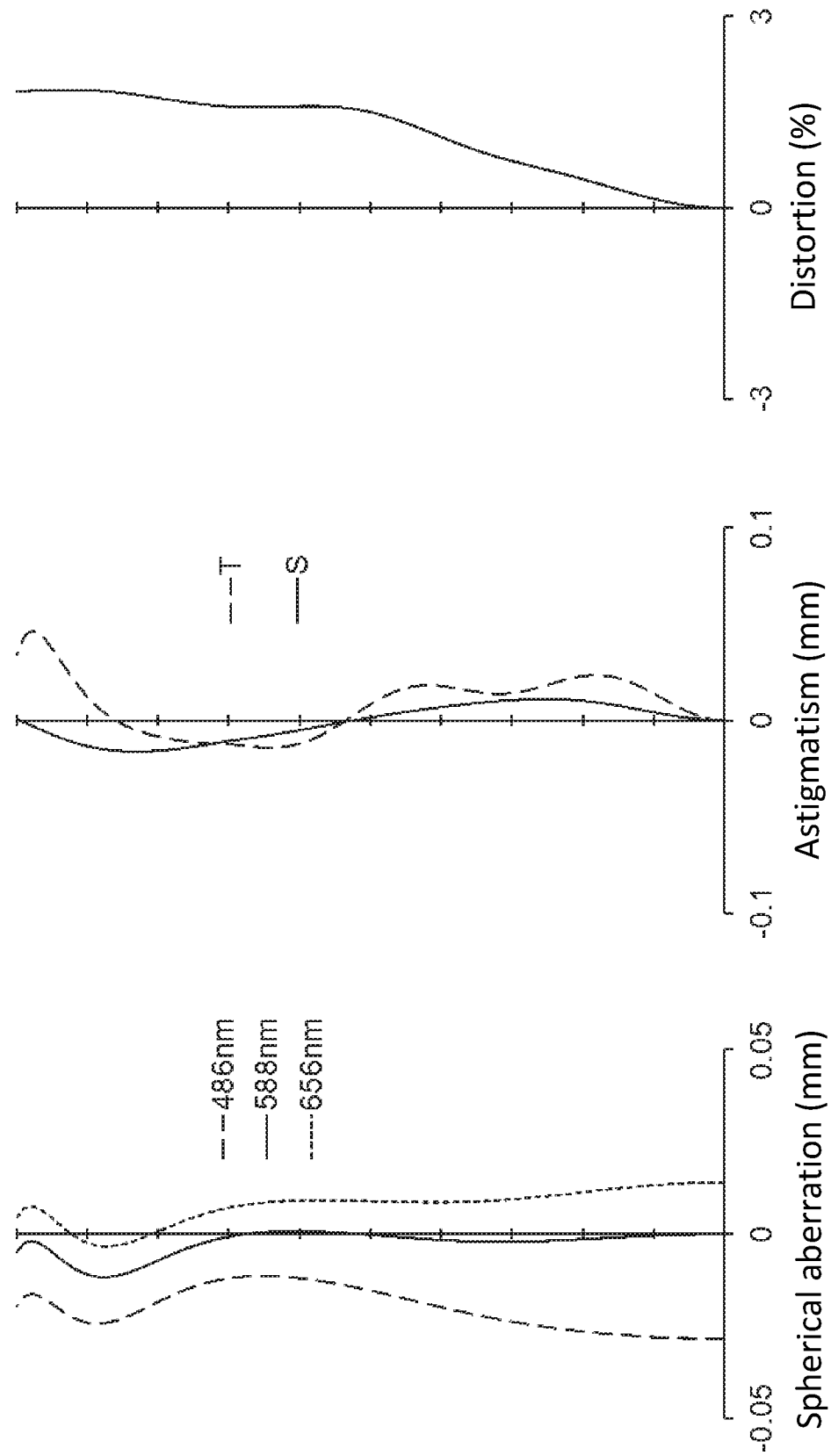
FIG. 24 is an aberration diagram showing a spherical aberration, astigmatism, and a distortion of the imaging lens of FIG. 22.
Figure 25:
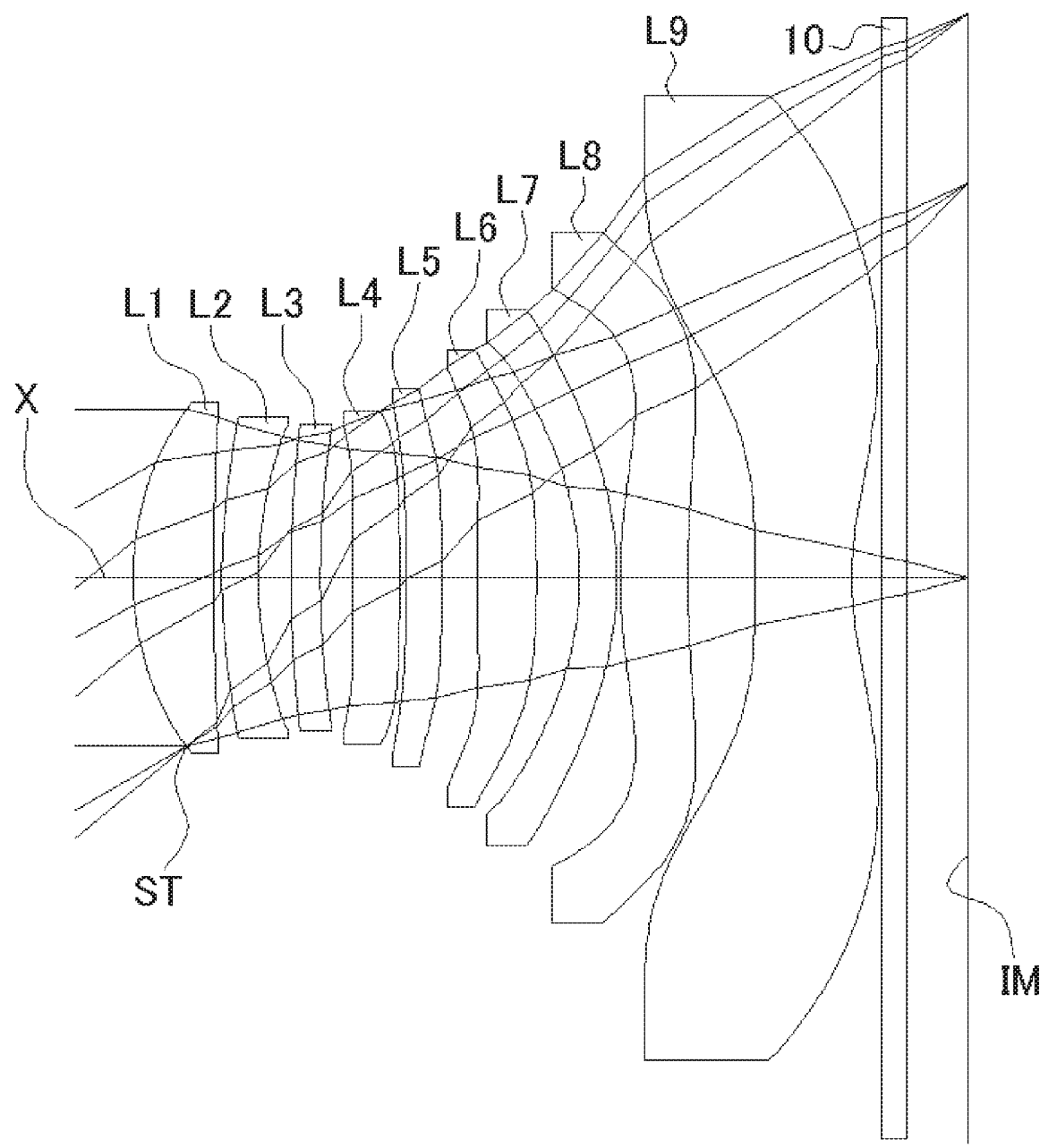
FIG. 25 shows a sectional view of a schematic configuration of an imaging lens in Numerical Data Example 9 of the present invention.

FIG. 23 shows a lateral aberration that corresponds to an image height H and FIG. 24 shows a spherical aberration (mm), astigmatism (mm), and a distortion (%), respectively. As shown in FIGS. 23 and 24, according to the imaging lens of Numerical Data Example 8, the aberrations can be also satisfactorily corrected.

Numerical Data Example 9

Basic Lens Data

TABLE 17 f = 5.66 mm Fno = 2.0 ω = 39.8°

| | i | r | d | nd | vd | [mm] |
|---|---|---|---|---|---|---|
| L1 | 1*(ST) | ∞ | ∞ | | | |
| | | 2.543 | 0.681 | 1.5443 | 55.9 | f1 = 5.224 |
| | 2* | 21.809 | 0.069 | | | |
| L2 | 3* | 4.848 | 0.308 | 1.6707 | 19.2 | f2 = −14.048 |
| | 4* | 3.120 | 0.276 | | | |

TABLE 17-continued f = 5.66 mm Fno = 2.0 ω = 39.8°

| | i | r | d | nd | vd | [mm] |
|---|---|---|---|---|---|---|
| L3 | 5* | 9.177 | 0.250 | 1.6707 | 19.2 | f3 = −100.881 |
| | 6* | 7.993 | 0.271 | | | |
| L4 | 7* | 34.805 | 0.400 | 1.5443 | 55.9 | f4 = 32.260 |
| | 8* | −35.294 | 0.058 | | | |
| L5 | 9* | −23.138 | 0.297 | 1.5443 | 55.9 | f5 = −42.426 |
| | 10* | 11601.980 | 0.302 | | | |
| L6 | 11* | 11.743 | 0.503 | 1.5443 | 55.9 | f6 = 10.980 |
| | 12* | −11.986 | 0.364 | | | |
| L7 | 13* | −2.840 | 0.315 | 1.6707 | 19.2 | f7 = −100.404 |
| | 14* | −3.097 | 0.030 | | | |
| L8 | 15* | 4.674 | 0.572 | 1.5443 | 55.9 | f8 = 15.063 |
| | 16* | 10.403 | 0.565 | | | |
| L9 | 17* | −49.558 | 0.822 | 1.5443 | 55.9 | f9 = −4.684 |
| | 18* | 2.703 | 0.250 | | | |
| | 19 | ∞ | 0.210 | 1.5168 | 64.2 | |
| | 20 | ∞ | 0.528 | | | |
| (IM) | | ∞ | | | | | f123=7.735 mm
f456=10.240 mm
f789=−7.065 mm
f23=−12.205 mm
f89=−8.144 mm
T7=0.315 mm
T8=0.572 mm
D67=0.364 mm
D89=0.565 mm
TL=6.997 mm
Hmax=4.7 mm
Dep=2.857 mm

TABLE 18

Aspherical surface data

| i | k | A4 | A6 | A8 | A10 | A12 | A14 | A16 |
|---|---|----|----|----|-----|-----|-----|-----|
| 1 | 2.623E−01 | −5.254E−05 | −1.981E−04 | 6.098E−04 | −5.456E−04 | 2.191E−04 | −9.993E−06 | −1.247E−05 |
| 2 | 0.000E+00 | −1.763E−02 | 2.267E−02 | −1.416E−02 | 4.946E−03 | −7.564E−04 | −4.393E−05 | 1.826E−05 |
| 3 | −1.812E+01 | −2.214E−02 | 2.365E−02 | −1.365E−02 | 4.920E−03 | −9.142E−04 | 1.779E−04 | −2.703E−05 |
| 4 | −1.166E+01 | 2.046E−02 | −1.425E−02 | 1.185E−02 | −5.555E−03 | 1.922E−03 | −3.979E−04 | 2.249E−04 |
| 5 | 0.000E+00 | −4.648E−03 | −1.729E−03 | 1.374E−04 | 1.324E−03 | 6.710E−05 | 1.067E−04 | 1.363E−05 |
| 6 | 0.000E+00 | −4.141E−03 | −2.456E−04 | 5.246E−04 | 2.301E−04 | 6.319E−05 | 1.417E−06 | −1.200E−05 |
| 7 | 0.000E+00 | −2.050E−02 | −9.789E−03 | −6.377E−05 | −5.770E−04 | 2.480E−04 | 1.324E−04 | 5.591E−06 |
| 8 | 0.000E+00 | −5.582E−03 | −1.213E−02 | −1.595E−03 | 1.736E−04 | 1.806E−04 | 7.797E−05 | −7.358E−05 |
| 9 | 0.000E+00 | −1.553E−02 | −2.465E−03 | 1.647E−03 | 1.050E−03 | 4.780E−05 | −9.053E−07 | −2.889E−05 |
| 10 | 0.000E+00 | −4.681E−02 | 2.783E−04 | 1.561E−03 | 4.865E−04 | 5.250E−05 | −3.748E−05 | 5.843E−06 |
| 11 | 0.000E+00 | −3.991E−02 | −1.715E−04 | −2.561E−03 | 2.754E−06 | 3.199E−04 | 4.159E−05 | −1.716E−05 |
| 12 | 0.000E+00 | −5.096E−02 | 1.052E−02 | −2.115E−03 | −1.284E−03 | 1.128E−03 | −2.686E−04 | 2.123E−05 |
| 13 | 6.523E−01 | −1.043E−02 | 2.163E−02 | −1.217E−02 | 4.168E−03 | −6.784E−04 | 2.912E−05 | 2.137E−06 |
| 14 | −4.420E+00 | −1.797E−02 | 1.526E−02 | −8.569E−03 | 2.349E−03 | −3.048E−04 | 1.714E−05 | −3.867E−07 |
| 15 | 0.000E+00 | −2.018E−02 | −9.813E−05 | −1.255E−03 | 3.262E−04 | −5.540E−05 | 5.482E−06 | −2.301E−07 |
| 16 | 0.000E+00 | −4.844E−03 | −9.053E−04 | −5.428E−04 | 1.127E−04 | −7.996E−06 | −1.856E−08 | 2.539E−08 |
| 17 | 0.000E+00 | −6.872E−02 | 1.529E−02 | −1.782E−03 | 1.446E−04 | −8.474E−06 | 3.134E−07 | −5.346E−09 |
| 18 | −4.694E+00 | −4.450E−02 | 1.154E−02 | −2.091E−03 | 2.371E−04 | −1.594E−05 | 5.788E−07 | −8.713E−09 |

The values of the respective conditional expressions are as follows:

f1/f=0.92
f2/f1=−2.69
f2/f=−2.48
f23/f=−2.16
f2/f3=0.14
f3/f=−17.83
R7f/R7r=0.92
R8f/R8r=0.45
T8/T7=1.81
D67/D89=0.64
D89/f=0.10
f89/f=−1.44
R9r/f=0.48
f9/f=−0.83
TL/f=1.24
TL/Hmax=1.49
f/Dep=1.98
f6/f=1.94
f8/f=2.66

Accordingly, the imaging lens of Numerical Data Example 9 satisfies the above-described conditional expressions.

Figure 26:
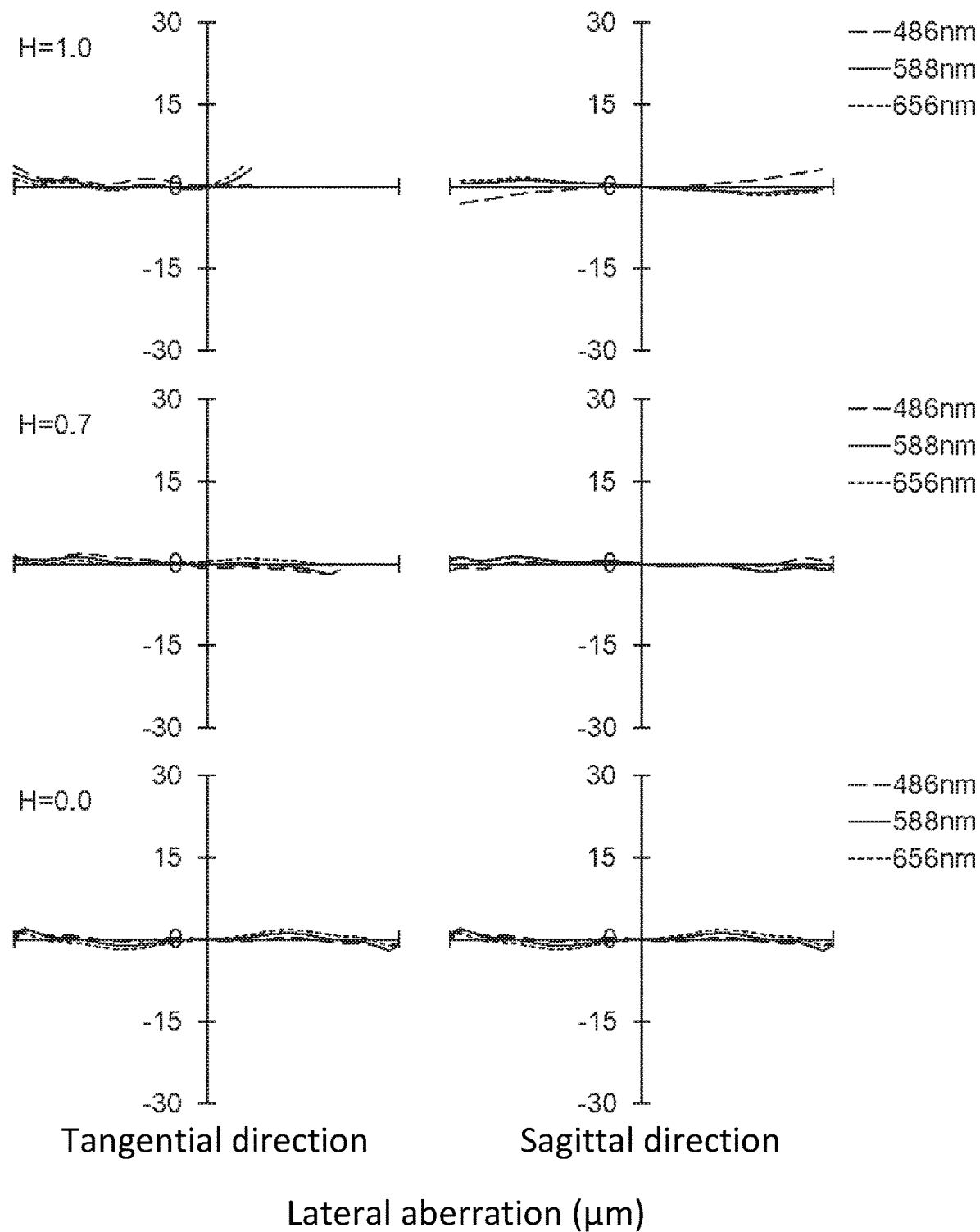
FIG. 26 is an aberration diagram showing a lateral aberration of the imaging lens of FIG. 25.
Figure 27:
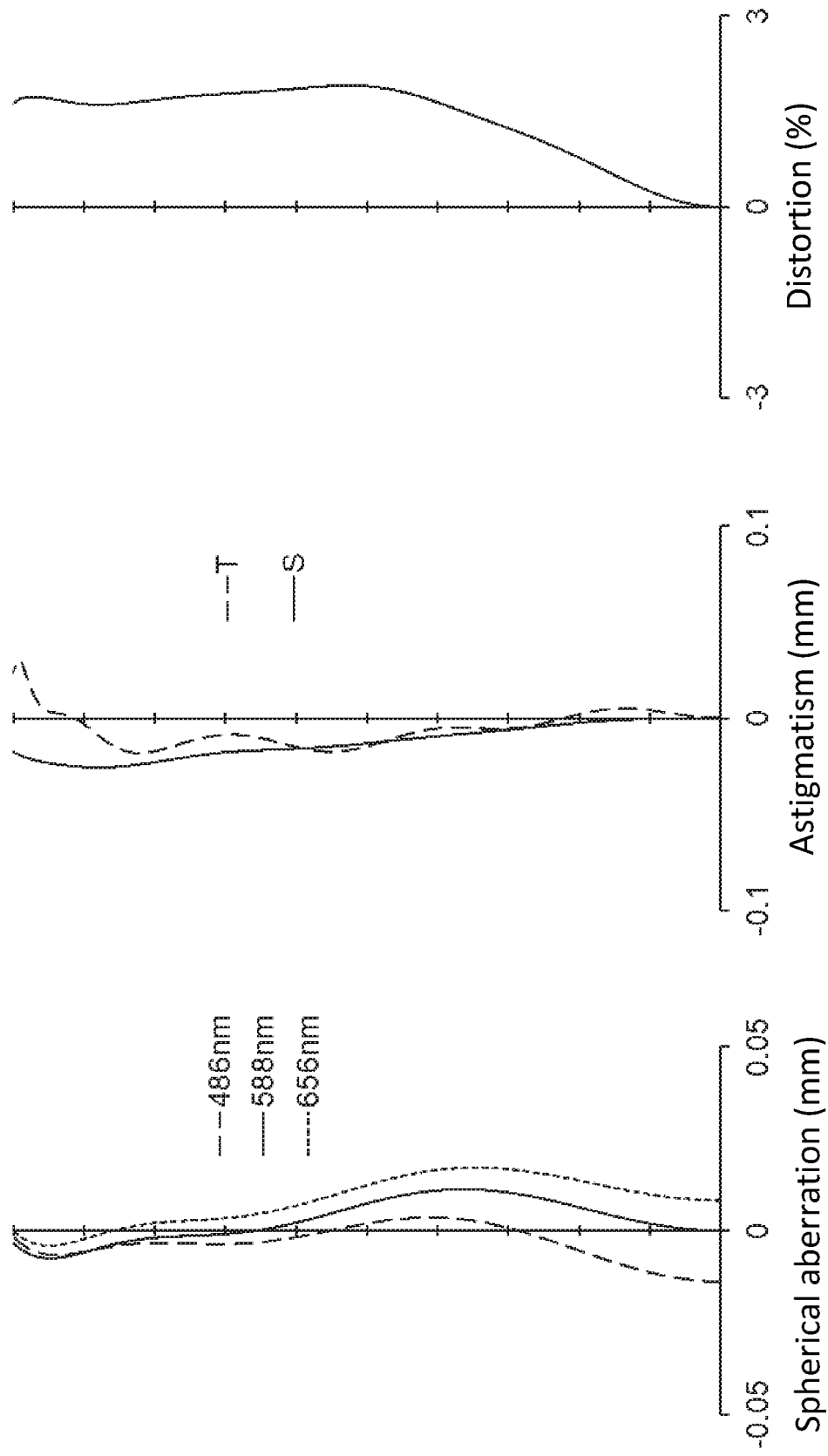
FIG. 27 is an aberration diagram showing a spherical aberration, astigmatism, and a distortion of the imaging lens of FIG. 25.
Figure 28:
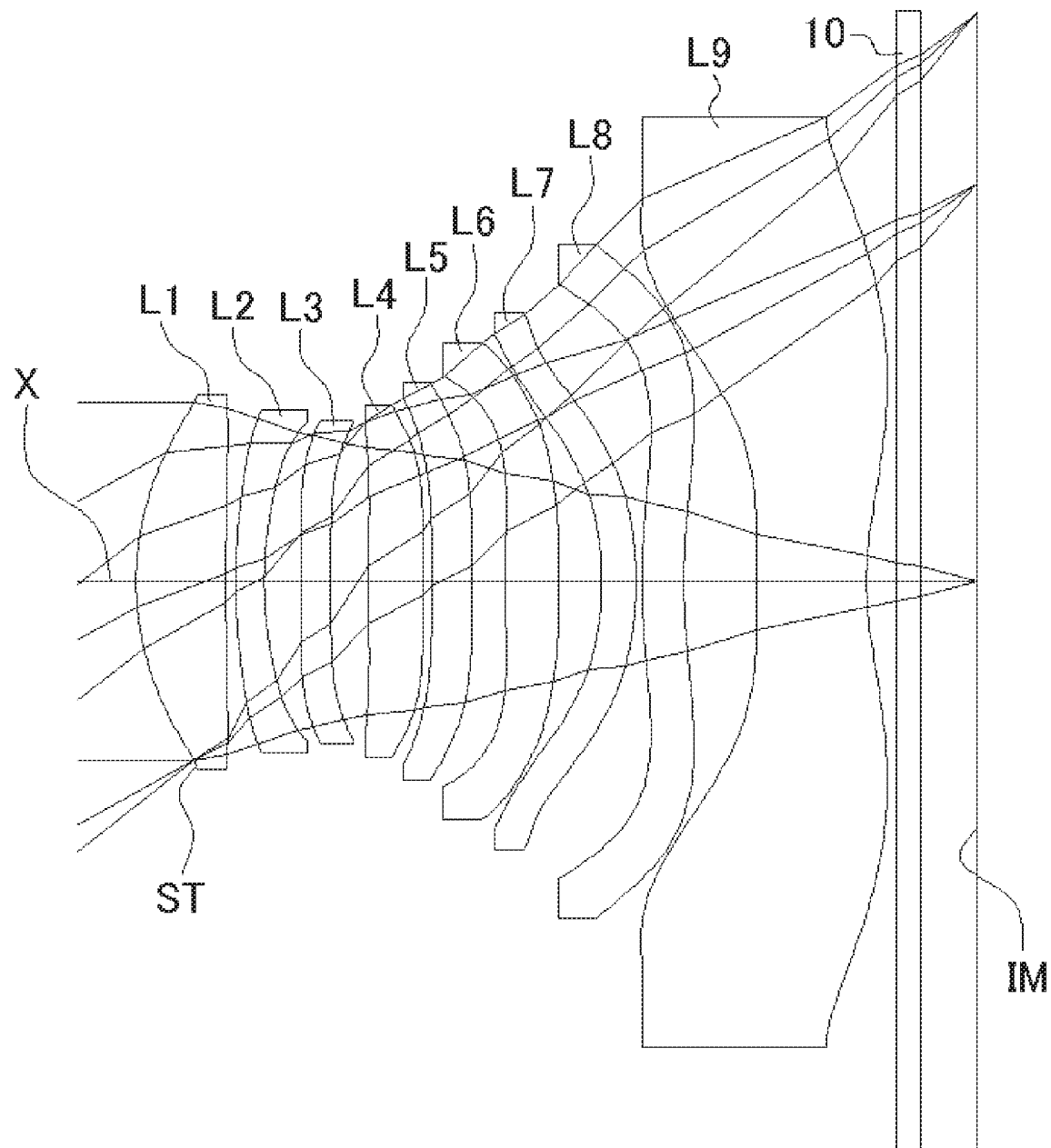
FIG. 28 shows a sectional view of a schematic configuration of an imaging lens in Numerical Data Example 10 of the present invention.

FIG. 26 shows a lateral aberration that corresponds to an image height H and FIG. 27 shows a spherical aberration (mm), astigmatism (mm), and a distortion (%), respectively. As shown in FIGS. 26 and 27, according to the imaging lens of Numerical Data Example 9, the aberrations can be also satisfactorily corrected.

Numerical Data Example 10

Basic Lens Data

TABLE 19 f = 5.98 mm Fno = 2.0 ω = 38.2°

| | i | r | d | nd | vd | [mm] |
|---|---|---|---|----|----|------|
| L1 | 1*(ST) | 2.418 | 0.752 | 1.5443 | 55.9 | f1 = 4.987 |
|  | 2* | 19.698 | 0.081 | | | |
| L2 | 3* | 4.078 | 0.240 | 1.6707 | 19.2 | f2 = −15.867 |
|  | 4* | 2.879 | 0.310 | | | |
| L3 | 5* | −44.959 | 0.250 | 1.6707 | 19.2 | f3 = −57.625 |
|  | 6* | 275.986 | 0.318 | | | |
| L4 | 7* | 22.632 | 0.459 | 1.5443 | 55.9 | f4 = 35.719 |
|  | 8* | −136.952 | 0.074 | | | |
| L5 | 9* | −27.854 | 0.337 | 1.5443 | 55.9 | f5 = −100.327 |
|  | 10* | −57.094 | 0.278 | | | |
| L6 | 11* | 14.144 | 0.451 | 1.5443 | 55.9 | f6 = 10.713 |
|  | 12* | −9.810 | 0.356 | | | |
| L7 | 13* | −2.867 | 0.288 | 1.6707 | 19.2 | f7 = −100.443 |
|  | 14* | −3.116 | 0.050 | | | |
| L8 | 15* | 5.686 | 0.350 | 1.5443 | 55.9 | f8 = −100.278 |
|  | 16* | 5.038 | 0.609 | | | |
| L9 | 17* | 37.394 | 0.925 | 1.5443 | 55.9 | f9 = −5.575 |
|  | 18* | 2.782 | 0.250 | | | |
|  | 19 | ∞ | 0.210 | 1.5168 | 64.2 | |
|  | 20 | ∞ | 0.473 | | | |
| (IM) |  | ∞ | | | | | f123=7.209 mm
f456=9.124 mm
f789=−4.801 mm
f23=−12.449 mm
f89=−5.327 mm
T7=0.288 mm
T8=0.350 mm
D67=0.356 mm
D89=0.609 mm
TL=6.993 mm
Hmax=4.7 mm
Dep=3.020 mm

TABLE 20

Aspherical surface data

| i | k | A4 | A6 | A8 | A10 | A12 | A14 | A16 |
|---|---|---|---|---|---|---|---|---|
| 1 | 1.692E−01 | −9.885E−04 | −2.383E−03 | 9.891E−04 | −9.266E−04 | −9.577E−05 | 1.955E−04 | −5.803E−05 |
| 2 | 0.000E+00 | −3.003E−02 | 3.738E−02 | −3.047E−02 | 1.609E−02 | −5.313E−03 | 8.738E−04 | −5.852E−05 |
| 3 | −2.164E+01 | −3.221E−02 | 3.069E−02 | −8.889E−03 | 4.696E−03 | −1.666E−03 | 4.574E−05 | 5.530E−05 |
| 4 | −9.345E+00 | −4.380E−02 | −3.804E−04 | 2.041E−02 | −4.171E−03 | 3.848E−03 | −1.169E−03 | 4.521E−04 |
| 5 | 0.000E+00 | 4.632E−02 | −6.528E−03 | 9.725E−03 | 3.926E−03 | −3.907E−03 | −4.360E−04 | 4.414E−04 |
| 6 | 0.000E+00 | 5.141E−02 | −6.300E−04 | 4.347E−03 | 2.157E−03 | 1.388E−03 | −3.468E−03 | 9.951E−04 |
| 7 | 0.000E+00 | −2.524E−02 | −5.482E−03 | 4.551E−03 | −1.146E−03 | 2.075E−04 | 4.119E−04 | −1.143E−04 |
| 8 | 0.000E+00 | −3.744E−02 | −1.162E−02 | −4.595E−03 | 3.567E−03 | 3.278E−05 | −2.869E−05 | −4.915E−05 |
| 9 | 0.000E+00 | −2.778E−02 | −1.043E−02 | 1.666E−03 | 5.376E−03 | 4.018E−03 | 1.787E−04 | −9.982E−05 |
| 10 | 0.000E+00 | −4.973E−02 | −3.544E−03 | 3.234E−03 | 1.595E−04 | −2.310E−04 | −3.828E−05 | 2.081E−05 |
| 11 | 0.000E+00 | −3.758E−02 | −5.607E−03 | −4.732E−03 | 2.533E−04 | 6.225E−04 | 3.274E−05 | −5.463E−05 |
| 12 | 0.000E+00 | −2.913E−02 | 7.776E−03 | −4.370E−03 | −6.348E−04 | 1.119E−03 | −2.943E−04 | 2.354E−05 |
| 13 | 6.870E−01 | −6.137E−02 | 2.734E−02 | −9.958E−03 | 4.133E−03 | −7.290E−04 | 2.834E−05 | 2.980E−06 |
| 14 | −1.938E+00 | −4.662E−02 | 1.116E−02 | −5.938E−03 | 2.518E−03 | −3.785E−04 | 1.613E−05 | 1.499E−07 |
| 15 | 0.000E+00 | −2.107E−02 | −4.638E−03 | 8.480E−04 | 1.078E−04 | −7.181E−05 | 8.673E−06 | −2.519E−07 |
| 16 | 0.000E+00 | −3.457E−02 | 4.179E−03 | −7.238E−04 | 5.924E−05 | −4.153E−06 | 2.673E−07 | 1.739E−09 |
| 17 | 0.000E+00 | −8.485E−02 | 1.706E−02 | −1.786E−03 | 1.417E−04 | −8.674E−06 | 3.105E−07 | −4.162E−09 |
| 18 | −8.023E+00 | −4.193E−02 | 1.124E−02 | −2.065E−03 | 2.358E−04 | −1.585E−05 | 5.737E−07 | −8.598E−09 |

The values of the respective conditional expressions are as follows:

f1/f=0.83
f2/f1=−3.18
f2/f=−2.65
f23/f=−2.08
f2/f3=0.28
f3/f=−9.64
R7f/R7r=0.92
R8f/R8r=1.13
T8/T7=1.21
D67/D89=0.58
D89/f=0.10
f89/f=−0.89
R9r/f=0.47
f9/f=−0.93
TL/f=1.17
TL/Hmax=1.49
f/Dep=1.98
f6/f=1.79

Accordingly, the imaging lens of Numerical Data Example 10 satisfies the above-described conditional expressions.

Figure 29:
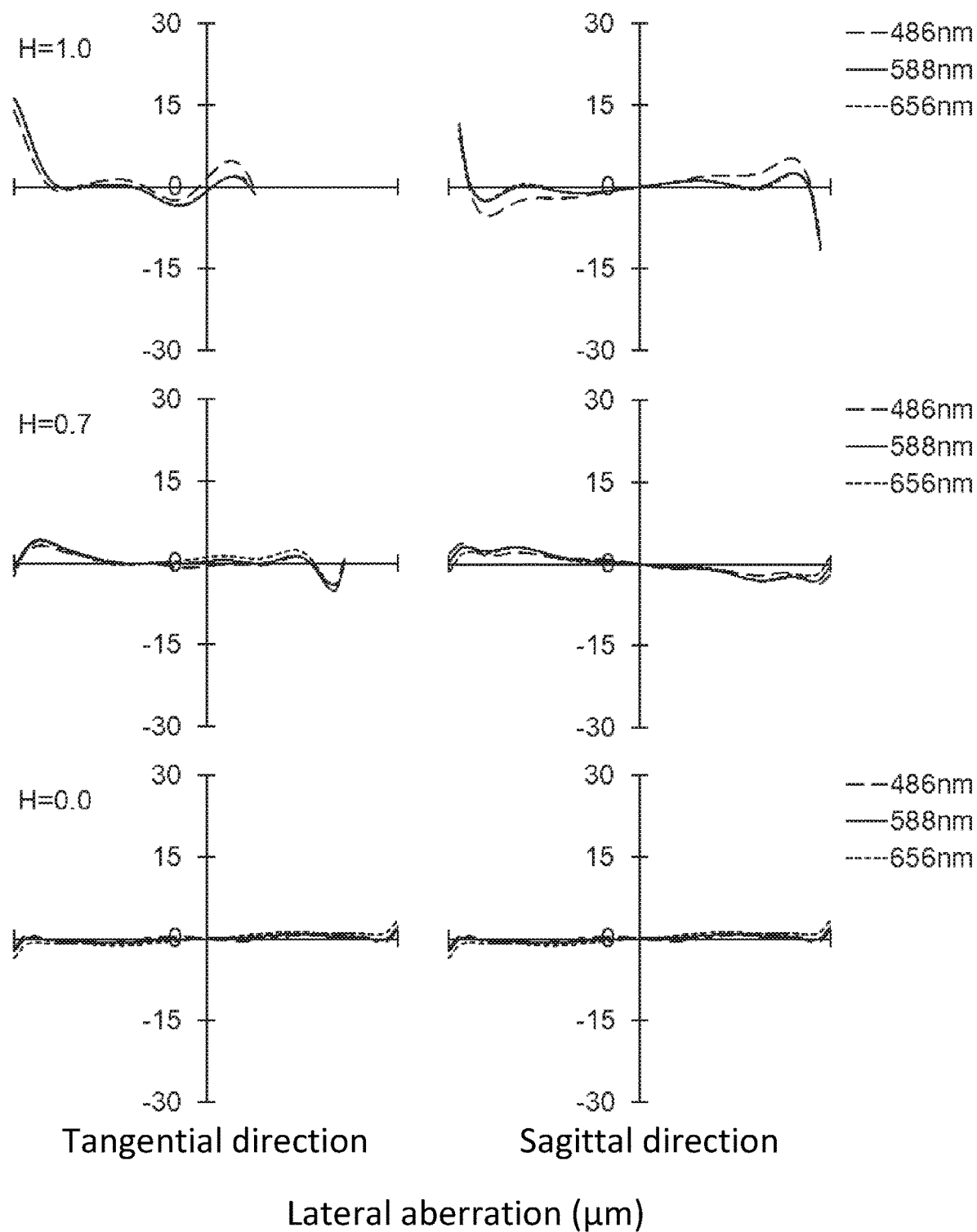
FIG. 29 is an aberration diagram showing a lateral aberration of the imaging lens of FIG. 28.
Figure 30:
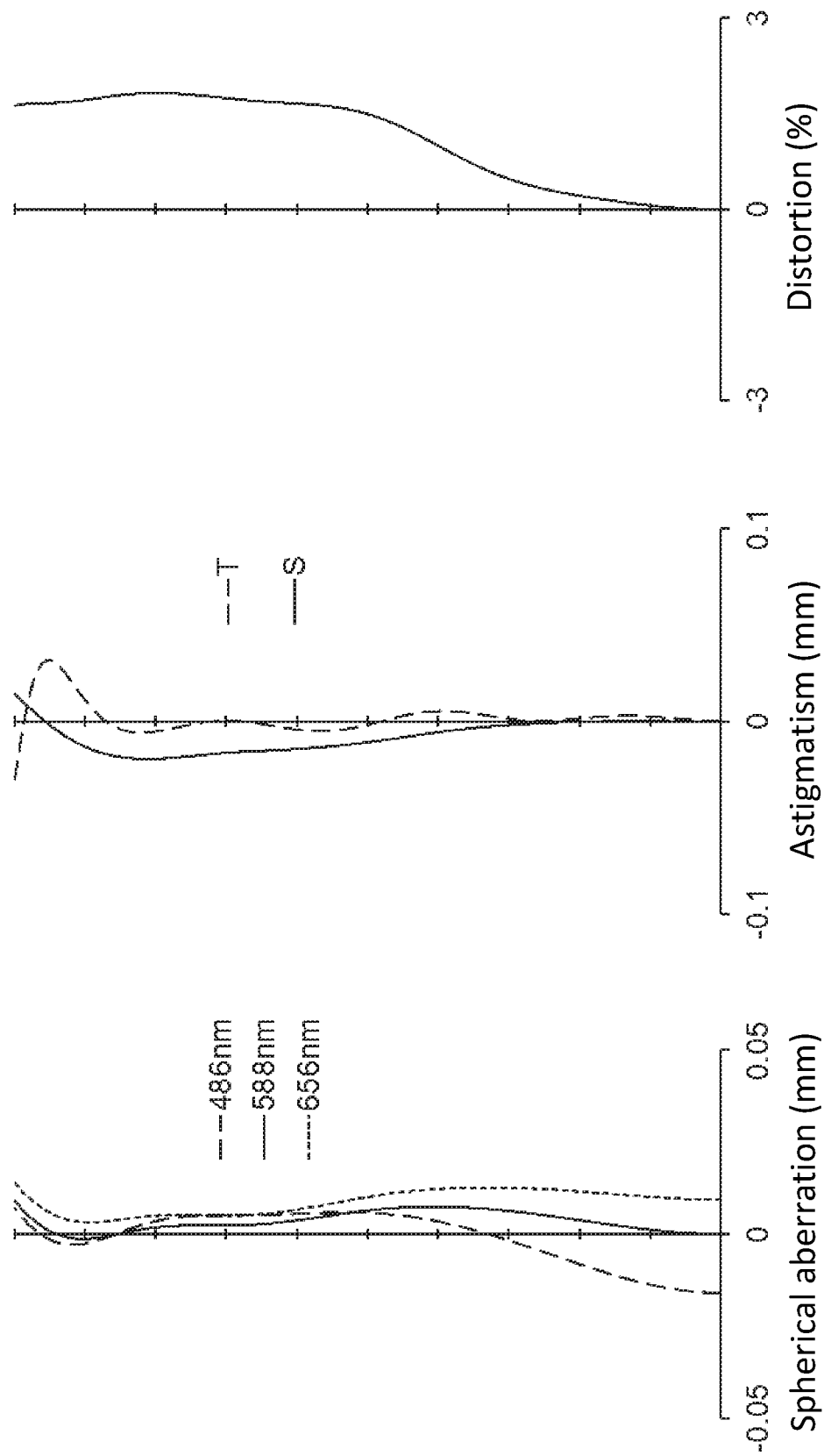
FIG. 30 is an aberration diagram showing a spherical aberration, astigmatism, and a distortion of the imaging lens of FIG. 28.
Figure 31:
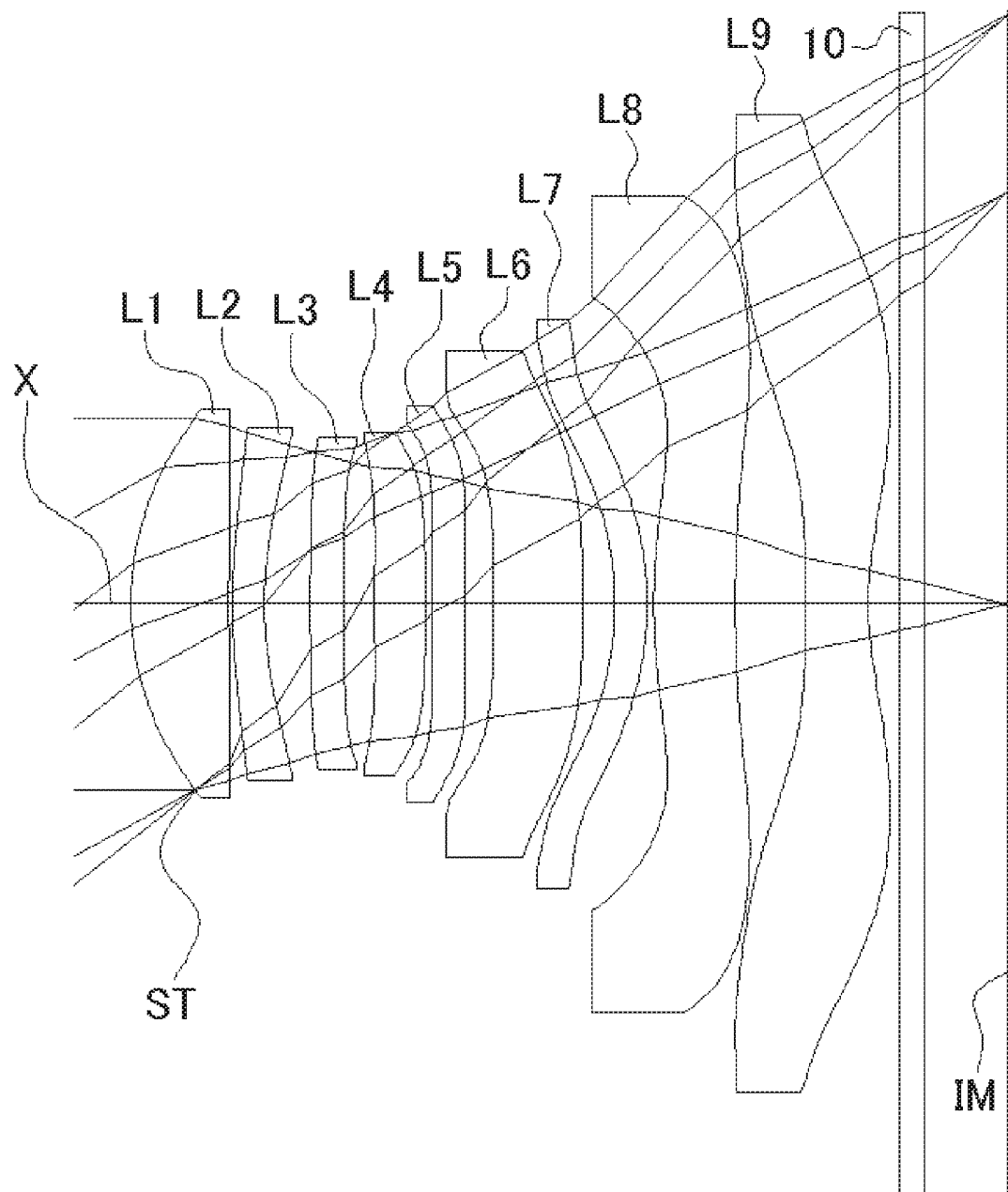
FIG. 31 shows a sectional view of a schematic configuration of an imaging lens in Numerical Data Example 11 of the present invention.

FIG. 29 shows a lateral aberration that corresponds to an image height H and FIG. 30 shows a spherical aberration (mm), astigmatism (mm), and a distortion (%), respectively. As shown in FIGS. 29 and 30, according to the imaging lens of Numerical Data Example 10, the aberrations can be also satisfactorily corrected.

Numerical Data Example 11

Basic Lens Data

TABLE 21 f = 5.98 mm Fno = 2.0 ω = 38.2°

| | i | r | d | nd | vd | [mm] |
|---|---|---|---|---|---|---|
| L1 | 1*(ST) | ∞ | ∞ | | | |
| | 2* | 2.386 | 0.793 | 1.5443 | 55.9 | f1 = 4.856 |
| L2 | 3* | 21.681 | 0.031 | | | |
| | 4* | 4.805 | 0.259 | 1.6707 | 19.2 | f2 = −14.472 |
| | | 3.144 | 0.372 | | | |

TABLE 21-continued f = 5.98 mm Fno = 2.0 ω = 38.2°

| | i | r | d | nd | vd | [mm] |
|---|---|---|---|---|---|---|
| L3 | 5* | 49.604 | 0.270 | 1.6707 | 19.2 | f3 = −80.521 |
| | 6* | 25.799 | 0.251 | | | |
| L4 | 7* | 22.357 | 0.413 | 1.5443 | 55.9 | f4 = 24.085 |
| | 8* | −31.487 | 0.056 | | | |
| L5 | 9* | −128.543 | 0.268 | 1.5443 | 55.9 | f5 = −100.323 |
| | 10* | 95.004 | 0.231 | | | |
| L6 | 11* | −27.879 | 0.721 | 1.5443 | 55.9 | f6 = −100.378 |
| | 12* | −57.447 | 0.260 | | | |
| L7 | 13* | −3.091 | 0.264 | 1.6707 | 19.2 | f7 = 26.611 |
| | 14* | −2.725 | 0.055 | | | |
| L8 | 15* | 5.029 | 0.661 | 1.5443 | 55.9 | f8 = 14.638 |
| | 16* | 13.003 | 0.566 | | | |
| L9 | 17* | −99.572 | 0.512 | 1.5443 | 55.9 | f9 = −4.775 |
| | 18* | 2.674 | 0.250 | | | |
| | 19 | ∞ | 0.210 | 1.5168 | 64.2 | |
| | 20 | ∞ | 0.674 | | | |
| (IM) | | ∞ | | | | | f123=6.981 mm
f456=45.863 mm
f789=−13.556 mm
f23=−12.217 mm
f89=−8.425 mm
T7=0.264 mm
T8=0.661 mm
D67=0.260 mm
D89=0.566 mm
TL=7.044 mm
Hmax=4.7 mm
Dep=3.019 mm

TABLE 22

Aspherical surface data

| i | k | A4 | A6 | A8 | A10 | A12 | A14 | A16 |
|---|---|---|---|---|---|---|---|---|
| 1 | −2.478E−01 | 1.672E−03 | 8.460E−04 | −2.214E−03 | 2.232E−03 | −1.291E−03 | 3.922E−04 | −5.444E−05 |
| 2 | 0.000E+00 | −4.078E−02 | 5.744E−02 | −5.922E−02 | 4.376E−02 | −2.070E−02 | 5.438E−03 | −6.013E−04 |
| 3 | −8.718E+00 | −4.056E−02 | 2.619E−02 | −1.470E−02 | 8.725E−03 | −4.446E−03 | 1.369E−03 | −1.647E−04 |
| 4 | −8.954E+00 | 1.930E−02 | −3.676E−02 | 3.780E−02 | −3.128E−02 | 1.674E−02 | −4.904E−03 | 6.318E−04 |
| 5 | 0.000E+00 | 1.788E−02 | −7.358E−02 | −3.670E−03 | 2.862E−03 | 5.423E−03 | −3.985E−03 | 6.815E−04 |
| 6 | 0.000E+00 | 1.201E−02 | −3.302E−03 | 4.291E−03 | −6.777E−03 | 1.213E−02 | −4.738E−03 | 3.147E−04 |
| 7 | 0.000E+00 | −5.074E−02 | 3.055E−02 | −5.034E−02 | 3.753E−02 | −1.648E−02 | 6.541E−03 | −1.447E−03 |
| 8 | 0.000E+00 | −1.767E−02 | −2.087E−02 | −1.677E−02 | 1.276E−02 | 2.375E−04 | −1.449E−03 | 9.538E−05 |
| 9 | 0.000E+00 | 4.357E−02 | −7.688E−02 | 2.368E−02 | −1.254E−02 | 3.842E−04 | −5.582E−04 | −4.745E−05 |
| 10 | 0.000E+00 | 1.950E−02 | −4.806E−02 | 8.474E−03 | 1.101E−03 | 1.936E−04 | −5.811E−04 | 1.593E−04 |
| 11 | 0.000E+00 | −3.284E−02 | 4.450E−03 | −1.375E−02 | 1.761E−04 | 1.361E−03 | 3.857E−04 | −1.398E−04 |
| 12 | 0.000E+00 | −9.148E−02 | 4.263E−02 | −1.177E−02 | −5.886E−04 | 1.414E−03 | −3.502E−04 | 2.847E−05 |
| 13 | 9.996E−02 | −5.575E−02 | 3.385E−02 | −9.831E−03 | 2.768E−03 | −5.122E−04 | 4.905E−05 | −2.242E−06 |
| 14 | −2.831E+00 | −1.661E−02 | 2.476E−03 | −2.270E−03 | 1.792E−03 | −3.559E−04 | 1.896E−05 | 3.063E−07 |
| 15 | 0.000E+00 | −8.883E−03 | −1.238E−02 | 3.741E−03 | −7.348E−04 | 5.811E−05 | 4.997E−06 | −7.860E−07 |
| 16 | 0.000E+00 | 8.890E−03 | −4.315E−03 | 2.446E−04 | 7.856E−05 | −1.499E−05 | 9.926E−07 | −2.424E−08 |
| 17 | 0.000E+00 | −6.408E−02 | 1.744E−02 | −1.969E−03 | 8.481E−05 | 1.574E−06 | −2.449E−07 | 5.566E−09 |
| 18 | −9.129E+00 | −3.843E−02 | 9.946E−03 | −1.856E−03 | 2.171E−04 | −1.523E−05 | 5.898E−07 | −9.641E−09 |

The values of the respective conditional expressions are as follows:

f1/f=0.81
f2/f1=−2.98
f2/f=−2.42
f23/f=−2.04
f2/f3=0.18
f3/f=−13.47
R7f/R7r=1.13
R8f/R8r=0.39
T8/17=2.51
D67/D89=0.46
D89/f=0.09
f89/f=−1.41
R9r/f=0.45
f9/f=−0.80
TL/f=1.18
TL/Hmax=1.50
f/Dep=1.98
f7/f=4.45
f8/f=2.45

Accordingly, the imaging lens of Numerical Data Example 11 satisfies the above-described conditional expressions.

Figure 32:
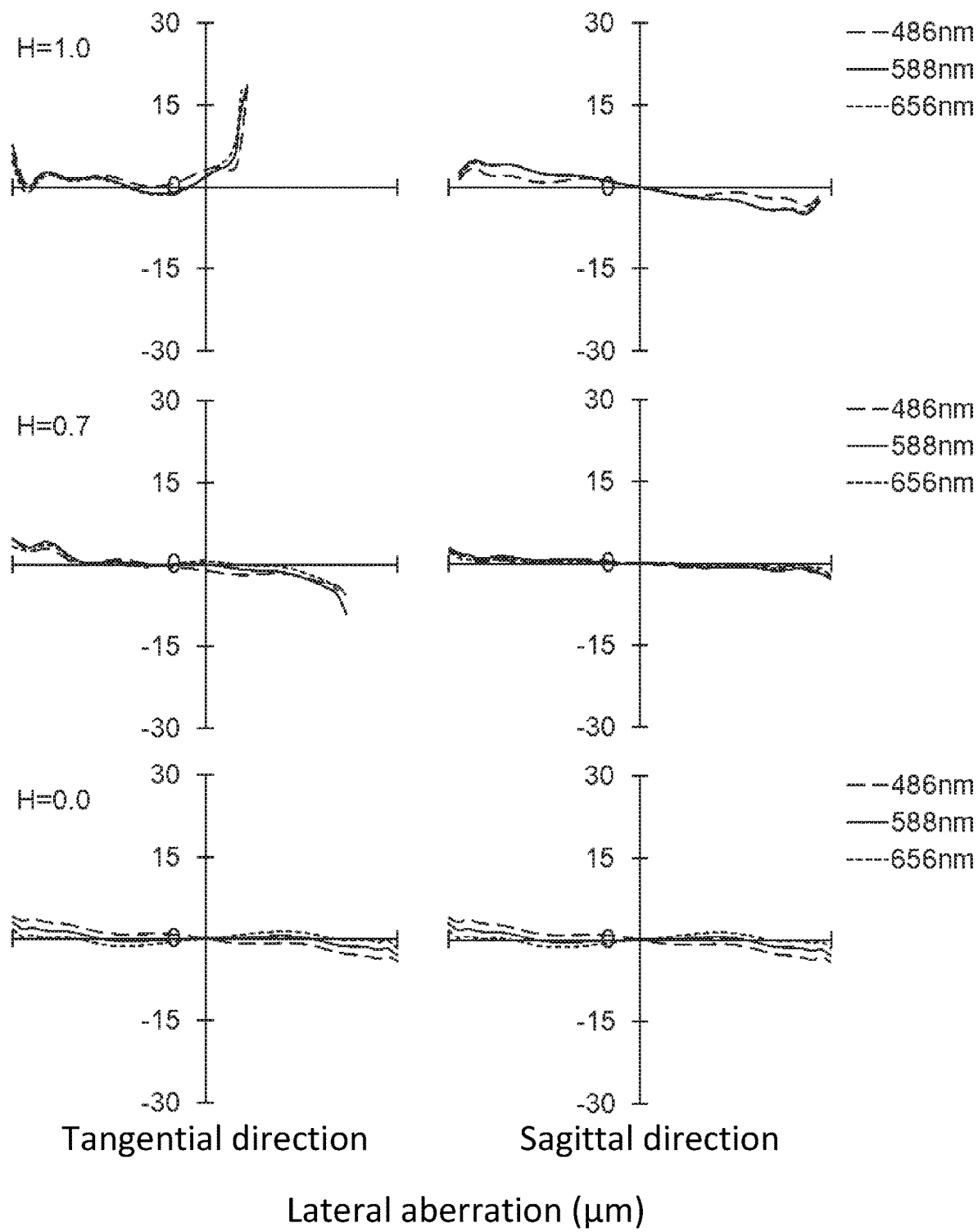
FIG. 32 is an aberration diagram showing a lateral aberration of the imaging lens of FIG. 31.
Figure 33:
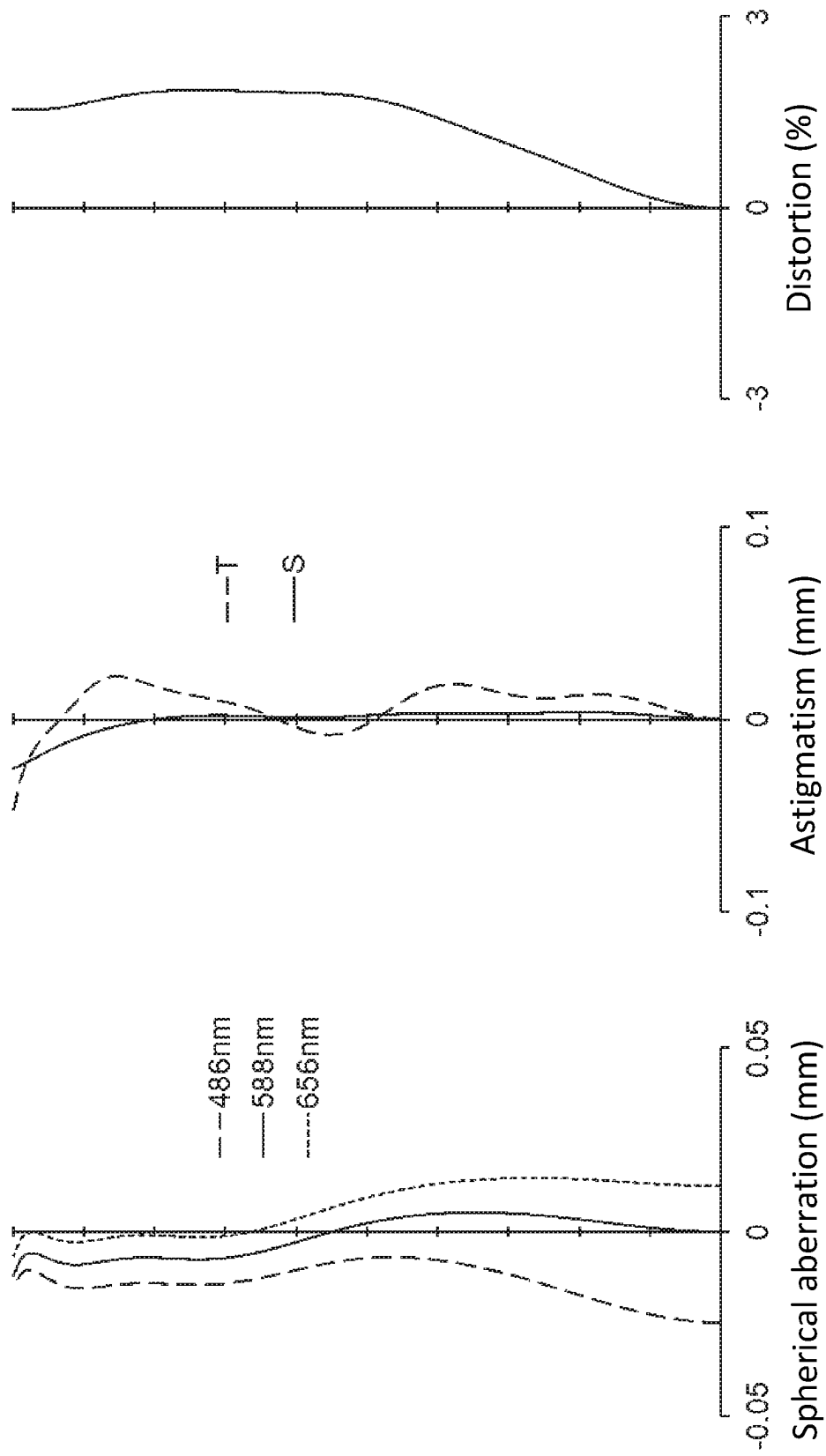
FIG. 33 is an aberration diagram showing a spherical aberration, astigmatism, and a distortion of the imaging lens of FIG. 31.
Figure 34:
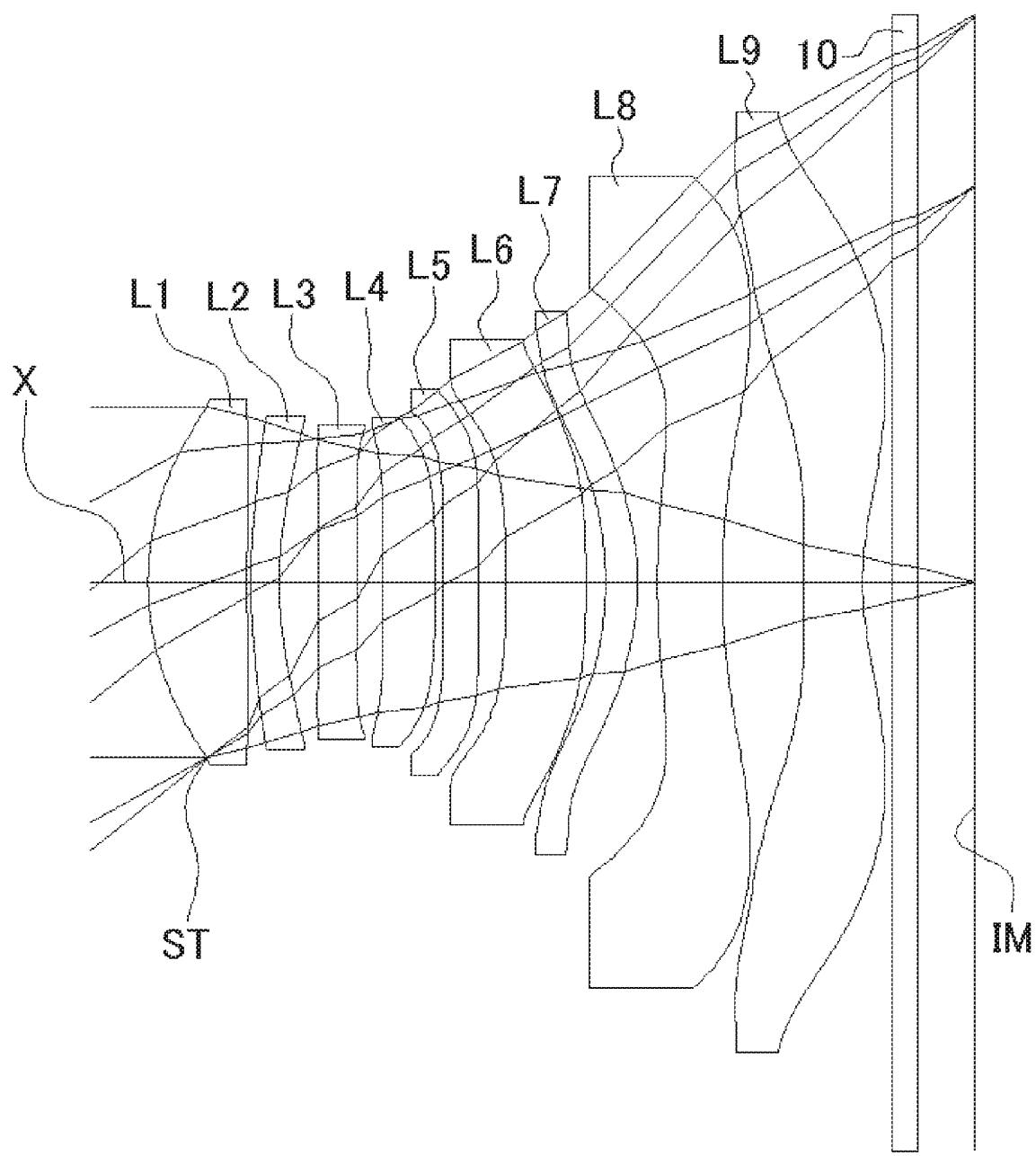
FIG. 34 shows a sectional view of a schematic configuration of an imaging lens in Numerical Data Example 12 of the present invention.

FIG. 32 shows a lateral aberration that corresponds to an image height H and FIG. 33 shows a spherical aberration (mm), astigmatism (mm), and a distortion (%), respectively. As shown in FIGS. 32 and 33, according to the imaging lens of Numerical Data Example 11, the aberrations can be also satisfactorily corrected.

Numerical Data Example 12

Basic Lens Data

TABLE 23 f = 5.86 mm Fno = 2.0 ω = 38.8°

| | i | r | d | nd | vd | [mm] |
|---|---|---|---|---|---|---|
| L1 | 1*(ST) | ∞ | ∞ | | | |
| | | 2.332 | 0.834 | 1.5443 | 55.9 | f1 = 4.738 |
| | 2* | 21.277 | 0.032 | | | |
| L2 | 3* | 4.970 | 0.240 | 1.6707 | 19.2 | f2 = −15.864 |
| | 4* | 3.322 | 0.335 | | | |

TABLE 23-continued f = 5.86 mm Fno = 2.0 ω = 38.8°

| | i | r | d | nd | vd | [mm] |
|---|---|---|---|---|---|---|
| L3 | 5* | −22.365 | 0.320 | 1.6707 | 19.2 | f3 = −66.078 |
| | 6* | −45.408 | 0.220 | | | |
| L4 | 7* | 30.294 | 0.443 | 1.5443 | 55.9 | f4 = 20.786 |
| | 8* | −17.965 | 0.067 | | | |
| L5 | 9* | −36.155 | 0.298 | 1.5443 | 55.9 | f5 = −100.550 |
| | 10* | −106.845 | 0.231 | | | |
| L6 | 11* | −12.368 | 0.675 | 1.5443 | 55.9 | f6 = −100.326 |
| | 12* | −16.297 | 0.165 | | | |
| L7 | 13* | −3.274 | 0.270 | 1.6707 | 19.2 | f7 = 12.413 |
| | 14* | −2.428 | 0.168 | | | |
| L8 | 15* | 7.661 | 0.547 | 1.5443 | 55.9 | f8 = −100.406 |
| | 16* | 6.550 | 0.692 | | | |
| L9 | 17* | 50.183 | 0.492 | 1.5443 | 55.9 | f9 = −4.817 |
| | 18* | 2.483 | 0.250 | | | |
| | 19 | ∞ | 0.210 | 1.5168 | 64.2 | |
| | 20 | ∞ | 0.481 | | | |
| (IM) | | ∞ | | | | | f123=6.646 mm
f456=35.830 mm
f789=−8.922 mm
f23=−12.818 mm
f89=−4.663 mm
T7=0.270 mm
T8=0.547 mm
D67=0.165 mm
D89=0.692 mm
TL=6.900 mm
Hmax=4.7 mm
Dep=2.961 mm

TABLE 24

Aspherical surface data

| i | k | A4 | A6 | A8 | A10 | A12 | A14 | A16 |
|---|---|---|---|---|---|---|---|---|
| 1 | −2.800E−01 | 1.359E−03 | 5.994E−04 | −2.405E−03 | 2.151E−03 | −1.316E−03 | 3.865E−04 | −5.565E−05 |
| 2 | 0.000E+00 | −4.211E−02 | 5.699E−02 | −5.942E−02 | 4.369E−02 | −2.071E−02 | 5.444E−03 | −6.036E−04 |
| 3 | −6.873E+00 | −3.935E−02 | 2.681E−02 | −1.435E−02 | 8.818E−03 | −4.466E−03 | 1.350E−03 | −1.531E−04 |
| 4 | −9.388E+00 | 1.982E−02 | −3.654E−02 | 3.762E−02 | −3.135E−02 | 1.677E−02 | −4.867E−03 | 6.250E−04 |
| 5 | 0.000E+00 | 1.648E−02 | −7.727E−03 | −3.725E−03 | 2.866E−03 | 5.438E−03 | −3.987E−03 | 6.621E−04 |
| 6 | 0.000E+00 | 1.390E−02 | −2.129E−03 | 4.734E−03 | −6.634E−03 | 1.213E−02 | −4.789E−03 | 2.670E−04 |
| 7 | 0.000E+00 | −4.691E−02 | 3.043E−02 | −5.078E−02 | 3.734E−02 | −1.655E−02 | 6.494E−03 | −1.497E−03 |
| 8 | 0.000E+00 | −2.127E−02 | −2.184E−02 | −1.719E−02 | 1.256E−02 | 1.585E−04 | −1.463E−03 | 1.025E−04 |
| 9 | 0.000E+00 | 3.848E−02 | −7.850E−02 | 2.359E−02 | −1.208E−02 | 3.756E−03 | −5.813E−04 | −6.583E−05 |
| 10 | 0.000E+00 | 1.701E−02 | −4.777E−03 | 8.332E−03 | 1.016E−03 | 1.642E−04 | −5.900E−04 | 1.561E−04 |
| 11 | 0.000E+00 | −3.564E−02 | 4.091E−03 | −1.370E−02 | 1.939E−04 | 1.363E−03 | 3.862E−04 | −1.394E−04 |
| 12 | 0.000E+00 | −8.897E−02 | 4.270E−02 | −1.185E−02 | −6.043E−04 | 1.413E−03 | −3.496E−04 | 2.876E−05 |
| 13 | 1.714E−01 | −5.703E−02 | 3.376E−02 | −9.804E−03 | 2.774E−03 | −5.119E−04 | 4.893E−05 | −2.273E−06 |
| 14 | −3.380E+00 | −1.463E−02 | 2.625E−03 | −2.288E−03 | 1.788E−03 | −3.565E−04 | 1.897E−05 | 3.161E−07 |
| 15 | 0.000E+00 | 2.595E−03 | −1.325E−02 | 3.640E−03 | −7.460E−04 | 5.799E−05 | 5.211E−06 | −7.371E−07 |
| 16 | 0.000E+00 | 5.465E−03 | −4.187E−03 | 2.416E−04 | 7.806E−05 | −1.498E−05 | 9.966E−07 | −2.389E−08 |
| 17 | 0.000E+00 | −6.553E−02 | 1.742E−02 | −1.968E−03 | 8.482E−05 | 1.574E−06 | −2.448E−07 | 5.601E−09 |
| 18 | −8.420E+00 | −3.936E−02 | 9.918E−03 | −1.856E−03 | 2.171E−04 | −1.523E−05 | 5.900E−07 | −9.628E−09 |

The values of the respective conditional expressions are as follows:

f1/f=0.81
f2/f1=−3.35
f2/f=−2.71
f23/f=−2.19
f2/f3=0.24
f3/f=−11.27
R7f/R7r=1.35
R8f/R8r=1.17
T8/T7=2.02
D67/D89=0.24
D89/f=0.12
f89/f=−0.80
R9r/f=0.42
f9/f=−0.82
TL/f=1.18
TL/Hmax=1.47
f/Dep=1.98
f7/f=2.12

Accordingly, the imaging lens of Numerical Data Example 12 satisfies the above-described conditional expressions.

Figure 35:
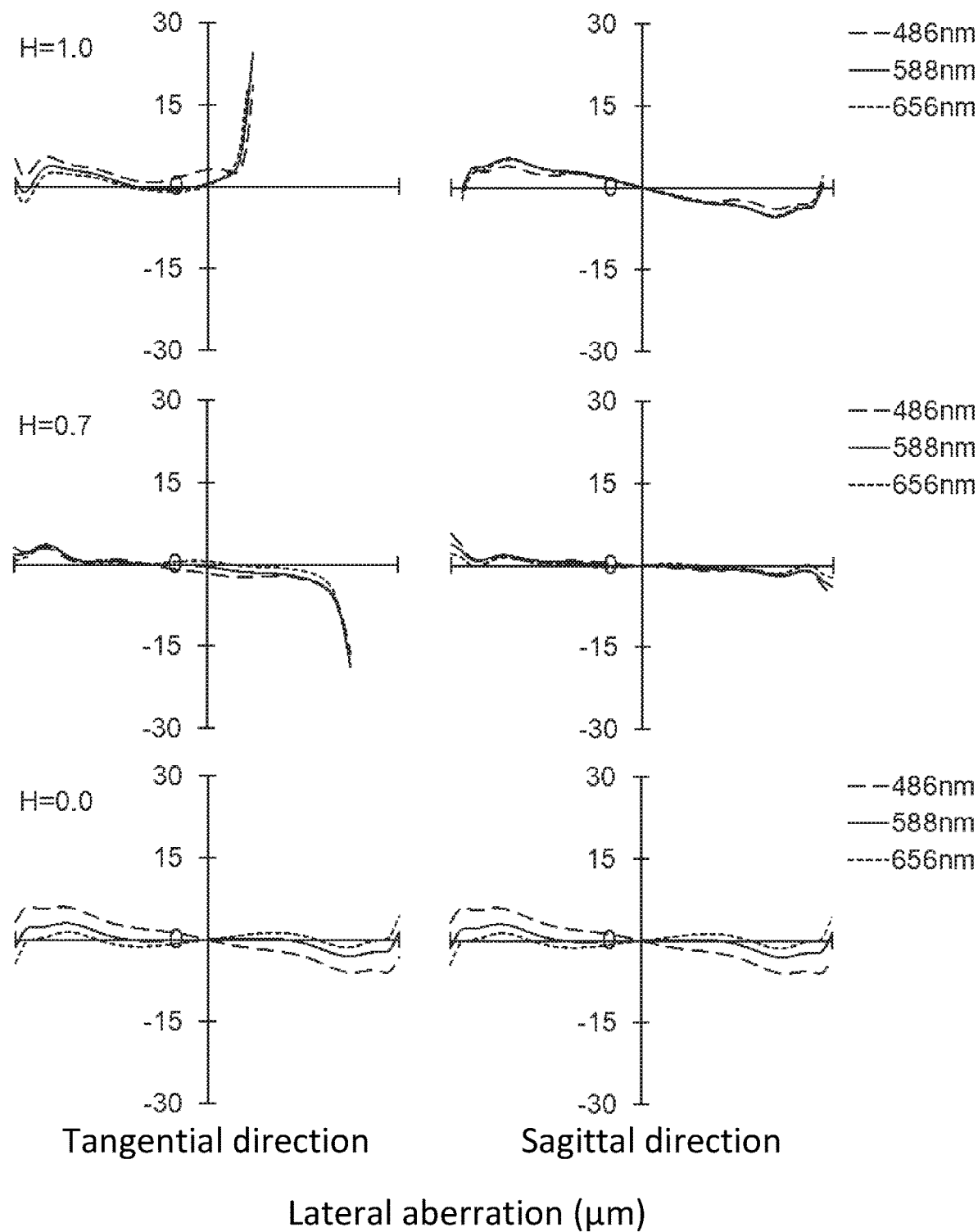
FIG. 35 is an aberration diagram showing a lateral aberration of the imaging lens of FIG. 34.
Figure 36:
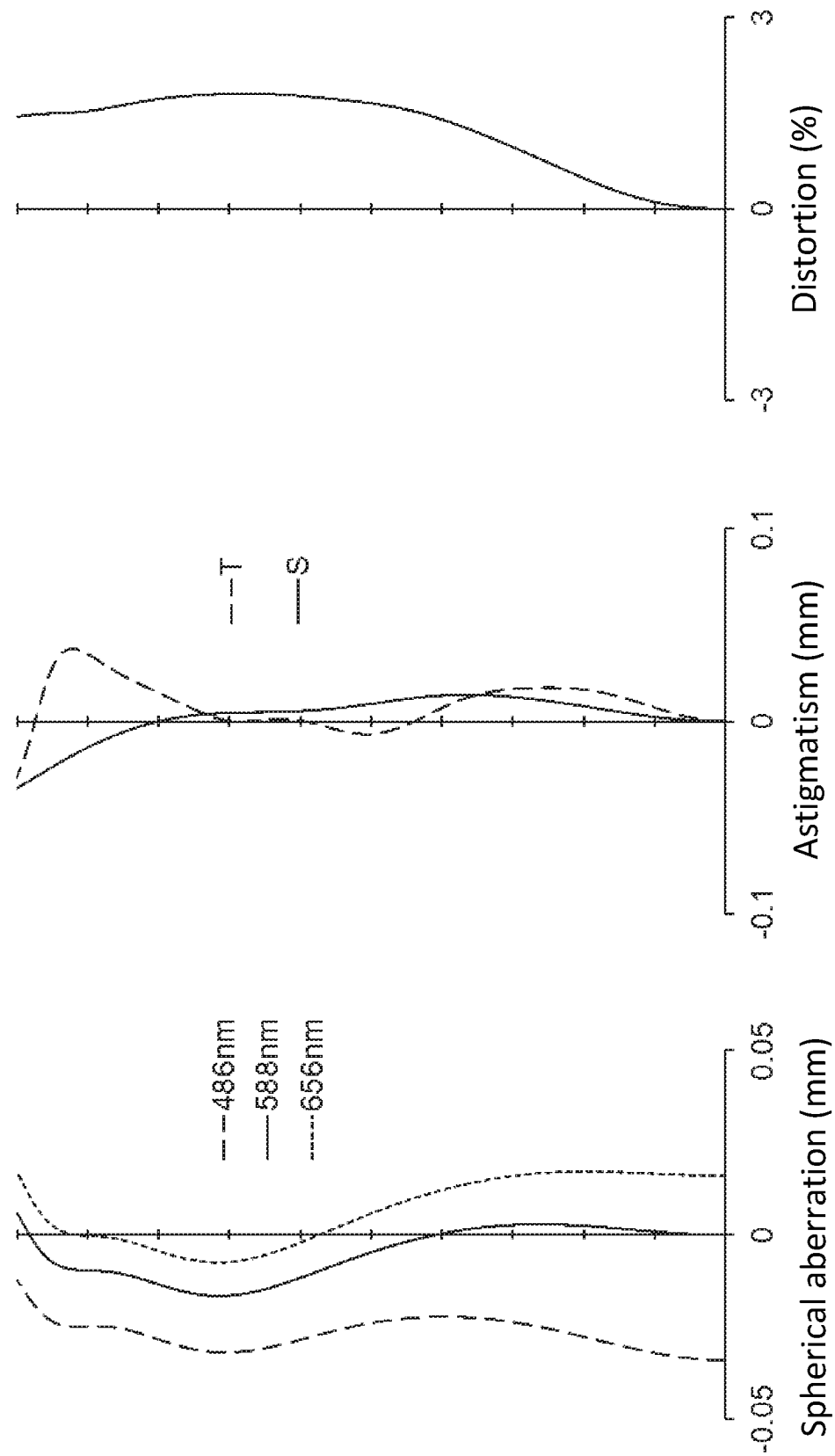
FIG. 36 is an aberration diagram showing a spherical aberration, astigmatism, and a distortion of the imaging lens of FIG. 34.
Figure 37:
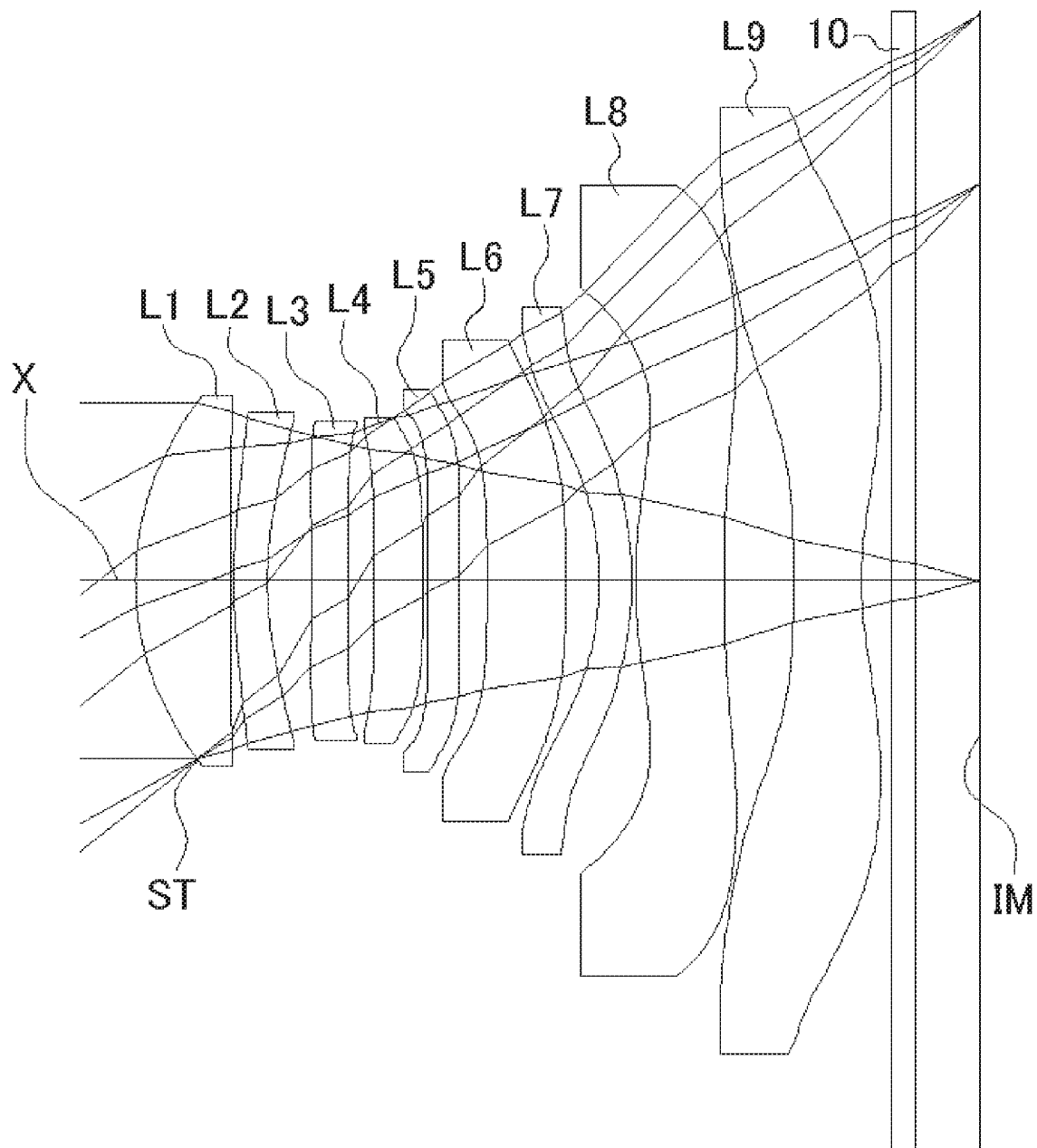
FIG. 37 shows a sectional view of a schematic configuration of an imaging lens in Numerical Data Example 13 of the present invention.

FIG. 35 shows a lateral aberration that corresponds to an image height H and FIG. 36 shows a spherical aberration (mm), astigmatism (mm), and a distortion (%), respectively. As shown in FIGS. 35 and 36, according to the imaging lens of Numerical Data Example 12, the aberrations can be also satisfactorily corrected.

Numerical Data Example 13

Basic Lens Data

TABLE 25 f = 5.94 mm Fno = 2.0 ω = 38.4°

| | i | r | d | nd | vd | [mm] |
|---|---|---|---|---|---|---|
| L1 | 1*(ST) | ∞ | ∞ | | | |
| | | 2.372 | 0.799 | 1.5443 | 55.9 | f1 = 4.825 |
| | 2* | 21.538 | 0.031 | | | |
| L2 | 3* | 4.865 | 0.283 | 1.6707 | 19.2 | f2 = −14.118 |
| | 4* | 3.139 | 0.371 | | | |

TABLE 25-continued f = 5.94 mm Fno = 2.0 ω = 38.4°

| | i | r | d | nd | vd | [mm] |
|---|---|---|---|---|---|---|
| L3 | 5* | −36.520 | 0.312 | 1.6707 | 19.2 | f3 = −100.900 |
| | 6* | −79.604 | 0.206 | | | |
| L4 | 7* | 19.817 | 0.423 | 1.5443 | 55.9 | f4 = 19.523 |
| | 8* | −22.740 | 0.036 | | | |
| L5 | 9* | 128.932 | 0.265 | 1.5443 | 55.9 | f5 = −100.354 |
| | 10* | 38.340 | 0.239 | | | |
| L6 | 11* | −33.483 | 0.660 | 1.5443 | 55.9 | f6 = −100.333 |
| | 12* | −87.145 | 0.283 | | | |
| L7 | 13* | −2.945 | 0.276 | 1.6707 | 19.2 | f7 = −100.524 |
| | 14* | −3.196 | 0.034 | | | |
| L8 | 15* | 4.415 | 0.745 | 1.5443 | 55.9 | f8 = 11.350 |
| | 16* | 14.547 | 0.584 | | | |
| L9 | 17* | −46.045 | 0.574 | 1.5443 | 55.9 | f9 = −5.097 |
| | 18* | 2.965 | 0.250 | | | |
| | 19 | ∞ | 0.210 | 1.5168 | 64.2 | |
| | 20 | ∞ | 0.540 | | | |
| (IM) | | ∞ | | | | | f123=6.898 mm
f456=31.561 mm
f789=−10.385 mm
f23=−12.398 mm
f67=−50.848 mm
f89=−12.449 mm
T7=0.276 mm
T8=0.745 mm
D67=0.283 mm
D89=0.584 mm
TL=7.049 mm
Hmax=4.7 mm
Dep=2.999 mm

TABLE 26

Aspherical surface data

| i | k | A4 | A6 | A8 | A10 | A12 | A14 | A16 |
|---|---|---|---|---|---|---|---|---|
| 1 | −2.421E−01 | 1.731E−03 | 9.044E−04 | −2.210E−03 | 2.231E−03 | −1.291E−03 | 3.927E−04 | −5.413E−05 |
| 2 | 0.000E+00 | −4.075E−02 | 5.747E−02 | −5.921E−02 | 4.376E−02 | −2.070E−02 | 5.438E−03 | −6.018E−04 |
| 3 | −8.854E+00 | −4.059E−02 | 2.621E−02 | −1.469E−02 | 8.722E−03 | −4.451E−03 | 1.366E−03 | −1.649E−04 |
| 4 | −8.824E+00 | 1.944E−02 | −3.671E−02 | 3.782E−02 | −3.125E−02 | 1.675E−02 | −4.899E−03 | 6.300E−04 |
| 5 | 0.000E+00 | 1.848E−02 | −7.135E−03 | −3.576E−03 | 2.912E−03 | 5.449E−03 | −3.972E−03 | 6.878E−04 |
| 6 | 0.000E+00 | 1.156E−02 | −3.329E−03 | 4.303E−03 | −6.773E−03 | 1.213E−02 | −4.727E−03 | 3.288E−04 |
| 7 | 0.000E+00 | −5.041E−02 | 3.039E−02 | −5.048E−02 | 3.748E−02 | −1.650E−02 | 6.531E−03 | −1.456E−03 |
| 8 | 0.000E+00 | −1.724E−02 | −2.088E−02 | −1.683E−02 | 1.272E−02 | 2.213E−04 | −1.452E−03 | 9.781E−05 |
| 9 | 0.000E+00 | 4.269E−02 | −7.706E−02 | 2.364E−02 | −1.263E−03 | 3.782E−04 | −5.628E−04 | −5.053E−05 |
| 10 | 0.000E+00 | 1.930E−02 | −4.819E−02 | 8.429E−03 | 1.086E−03 | 1.900E−04 | −5.815E−04 | 1.594E−04 |
| 11 | 0.000E+00 | −3.328E−02 | 4.499E−03 | −1.375E−02 | 1.714E−04 | 1.359E−03 | 3.851E−04 | −1.399E−04 |
| 12 | 0.000E+00 | −9.138E−02 | 4.247E−02 | −1.179E−02 | −5.911E−04 | 1.414E−03 | −3.501E−04 | 2.853E−05 |
| 13 | 4.360E−02 | −5.480E−02 | 3.400E−02 | −9.820E−03 | 2.768E−03 | −5.126E−04 | 4.889E−05 | −2.287E−06 |
| 14 | −2.437E+00 | −1.744E−02 | 2.376E−03 | −2.276E−03 | 1.792E−03 | −3.557E−04 | 1.902E−05 | 3.226E−07 |
| 15 | 0.000E+00 | −1.364E−02 | −1.194E−02 | 3.726E−03 | −7.391E−04 | 5.795E−05 | 5.037E−06 | −7.767E−07 |
| 16 | 0.000E+00 | 9.156E−03 | −4.305E−03 | 2.435E−04 | 7.840E−05 | −1.499E−05 | 9.941E−07 | −2.404E−08 |
| 17 | 0.000E+00 | −6.407E−02 | 1.745E−02 | −1.968E−03 | 8.483E−05 | 1.573E−06 | −2.450E−07 | 5.547E−09 |
| 18 | −9.004E+00 | −3.806E−02 | 9.927E−03 | −1.857E−03 | 2.171E−04 | −1.523E−05 | 5.898E−07 | −9.630E−09 |

The values of the respective conditional expressions are as follows:

f1/f=0.81
f2/f1=−2.93
f2/f=−2.38
f23/f=−2.09
f2/f3=0.14
f3/f=−16.99
R7f/R7r=0.92
R8f/R8r=0.30
T8/T7=2.70
D67/D89=0.48
D89/f=0.10
f89/f=−2.10
R9r/f=0.50
f9/f=−0.86
TL/f=1.19
TL/Hmax=1.50
f/Dep=1.98
f67/f=−8.56
f8/f=1.91

Accordingly, the imaging lens of Numerical Data Example 13 satisfies the above-described conditional expressions.

Figure 38:
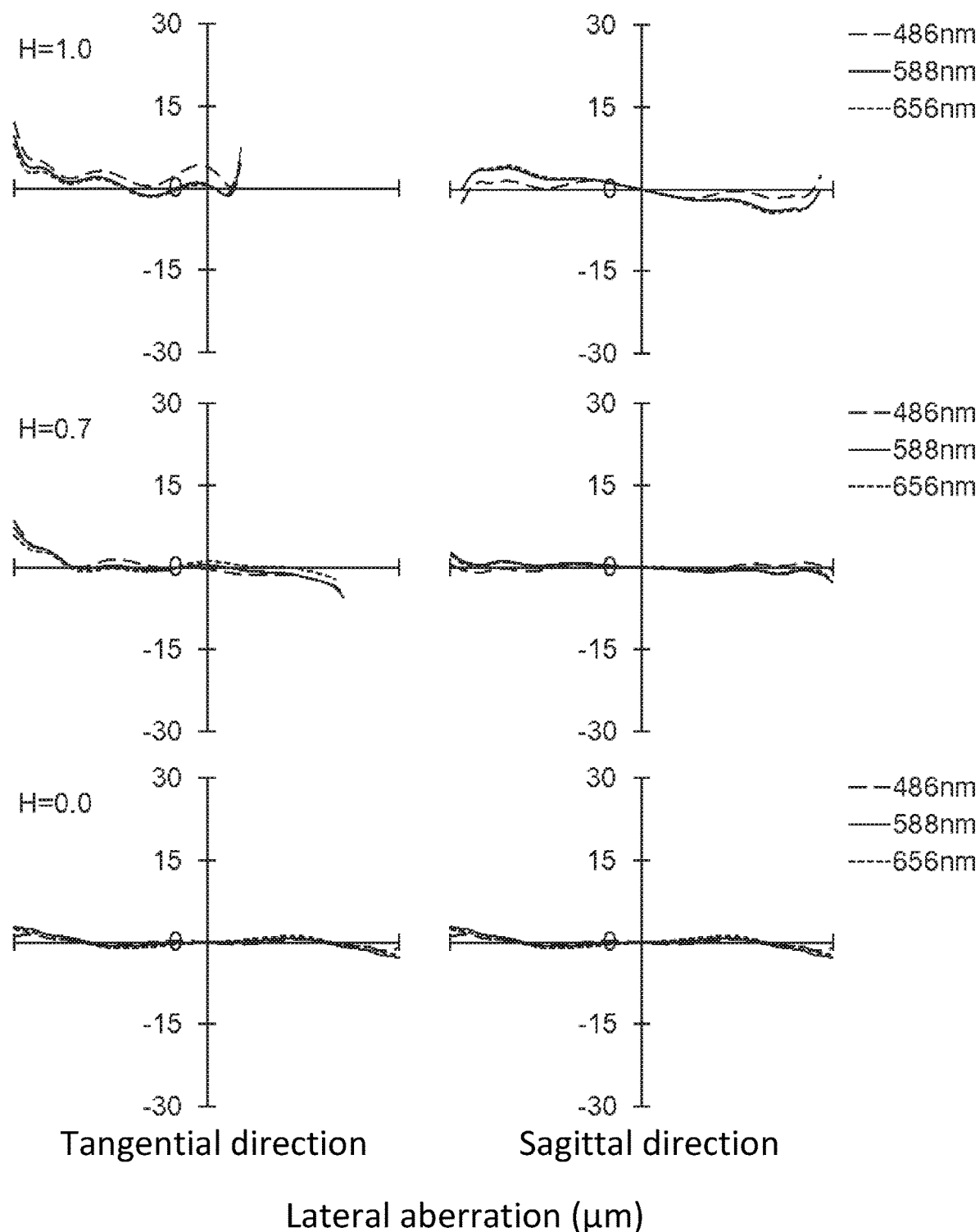
FIG. 38 is an aberration diagram showing a lateral aberration of the imaging lens of FIG. 37.
Figure 39:
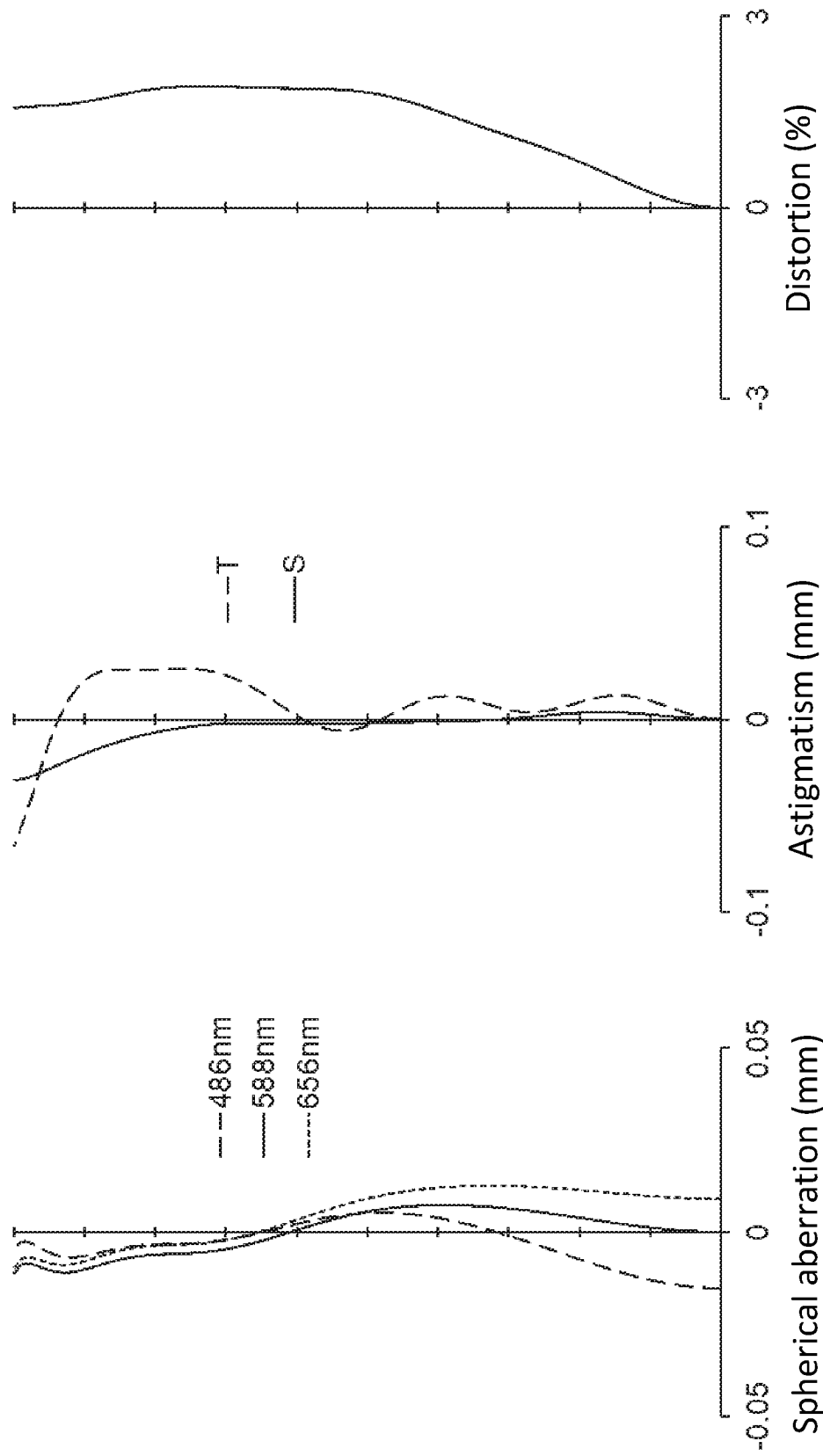
FIG. 39 is an aberration diagram showing a spherical aberration, astigmatism, and a distortion of the imaging lens of FIG. 37.

FIG. 38 shows a lateral aberration that corresponds to an image height H and FIG. 39 shows a spherical aberration (mm), astigmatism (mm), and a distortion (%), respectively. As shown in FIGS. 38 and 39, according to the imaging lens of Numerical Data Example 13, the aberrations can be also satisfactorily corrected.

According to the embodiment of the invention, the imaging lenses have very wide angles of view (2ω) of 65° or greater. More specifically, the imaging lenses of Numerical Data Examples 1 through 13 have angles of view (2ω) of 76.2° to 80.2°. According to the imaging lens of the embodiment, it is possible to take an image over a wider range than that taken by a conventional imaging lens.

In recent years, with advancement in digital-zoom technology to enlarge any range of an image obtained through an imaging lens, an imaging element with a higher pixel count has been often applied in combination with an imaging lens of higher resolution. In case of an imaging element with a high pixel count, a light-receiving area per pixel often decreases, so that an image tends to be dark. According to the imaging lenses of Numerical Data Examples 1 through 13, the Fnos are as small as 2.0. According to the imaging lenses of the embodiment, it is achievable to take a sufficiently bright image even with the above-described imaging element with a higher pixel count.

Accordingly, when the imaging lens of the above-described embodiment is applied in an imaging optical system such as cameras built in mobile devices (e.g., cellular phones, smartphones, and mobile information terminals), digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices (e.g., cellular phones, smartphones, and mobile information terminals), digital still cameras, security cameras, onboard cameras, and network cameras.

The disclosure of Japanese Patent Application No. 2019-012070, filed on Jan. 28, 2019, is incorporated in the application by reference.

While the present invention has been explained with reference to the specific embodiment of the present invention, the explanation is illustrative and the present invention is limited only by the appended claims.

What is claimed is:
1. An imaging lens comprising:
a first lens having positive refractive power;
a second lens having negative refractive power;
a third lens having negative refractive power;
a fourth lens having positive refractive power;
a fifth lens;
a sixth lens;
a seventh lens;
an eighth lens; and
a ninth lens having negative refractive power, arranged in this order from an object side to an image plane side,
wherein said ninth lens is formed in a shape so that a surface thereof on the image plane side has an aspherical shape having an inflection point,
the first lens to the ninth lens are arranged with air intervals between adjacent ones of the first lens to the ninth lens, and
all of the nine lenses that compose the imaging lens are made of plastic materials.

2. The imaging lens according to claim 1, wherein said second lens has a focal length f2 and said third lens has a focal length f3 so that the following conditional expression is satisfied:

$$0.1 < f2/f3 < 1.2.$$

3. The imaging lens according to claim 1, wherein said eighth lens is disposed away from the ninth lens by a distance D89 so that the following conditional expression is satisfied:

$$0.05 < D89/f < 0.15,$$

where f is a focal length of a whole lens system.

4. The imaging lens according to claim 1, wherein said ninth lens is formed in the shape so that the surface thereof on the image plane side has a paraxial curvature radius R9r so that the following conditional expression is satisfied:

$$0.2 < R9r/f < 0.6,$$

where f is a focal length of a whole lens system.

5. The imaging lens according to claim 1, wherein said ninth lens has a focal length f9 so that the following conditional expression is satisfied:

$$-2 < f9/f < -0.2,$$

where f is a focal length of a whole lens system.

* * * * *